(12) United States Patent     (10) Patent No.: US 8,577,092 B2
Kim et al.     (45) Date of Patent: *Nov. 5, 2013

(54) MULTIMEDIA DEVICE, MULTIPLE IMAGE SENSORS HAVING DIFFERENT TYPES AND METHOD FOR CONTROLLING THE SAME

(75) Inventors: Taehyeong Kim, Pyeongtaek-si (KR); Yongwon Cho, Pyeongtaek-si (KR); Sangki Kim, Pyeongtaek-si (KR); Mingoo Kang, Pyeongtaek-si (KR); Soungmin Im, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 136 days.

This patent is subject to a terminal disclaimer.

(21) Appl. No.: 13/220,729

(22) Filed: Aug. 30, 2011

(65) Prior Publication Data

US 2012/0114194 A1     May 10, 2012

(51) Int. Cl.
*G06K 9/00*     (2006.01)

(52) U.S. Cl.
USPC .......................................... 382/115; 715/745

(58) Field of Classification Search
None
See application file for complete search history.

(56) References Cited

U.S. PATENT DOCUMENTS

| | | | |
|---|---|---|---|
| 7,466,898 B2* | 12/2008 | Ohashi | 386/241 |
| 7,623,687 B2* | 11/2009 | Bronstein et al. | 382/118 |
| 2002/0194586 A1 | 12/2002 | Gutta et al. | 725/10 |
| 2004/0104806 A1* | 6/2004 | Yui et al. | 340/5.74 |
| 2007/0033607 A1 | 2/2007 | Bryan | 725/10 |
| 2009/0110248 A1* | 4/2009 | Masuda et al. | 382/118 |
| 2009/0138805 A1 | 5/2009 | Hildreth | 715/745 |
| 2011/0069940 A1* | 3/2011 | Shimy et al. | 386/296 |

FOREIGN PATENT DOCUMENTS

GB     2 447 246 A     9/2008
WO     WO 97/21188 A1     6/1997

OTHER PUBLICATIONS

European Search Report dated Jul. 12, 2012 issued in Application No. 11 18 3936.

* cited by examiner

*Primary Examiner* — Samir Ahmed
*Assistant Examiner* — Siamak Harandi
(74) *Attorney, Agent, or Firm* — KED & Associates LLP

(57) ABSTRACT

A method for controlling a multimedia device, which uses a plurality of heterogeneous image sensors, comprises the steps of identifying at least one user located in the periphery of the multimedia device under the control of a first image sensor for extracting depth data and a second image sensor for extracting color data; accessing a memory that stores a preference channel per user; extracting information on the preference channel corresponding to the identified user, from the accessed memory; performing a control operation for switching to the preference channel based on the extracted information; and monitoring change of a user located in front of the multimedia device.

10 Claims, 53 Drawing Sheets

FIG. 5

| father | face vector1 |
|---|---|
| mother | face vector2 |
| son | face vector3 |
| daughter | face vector4 |
| ⋮ | |
| USER N | face vectorN |

< Color Image >

FIG. 17

| time | MON | TUE | WED | THU | FRI | SAT | SUN |
|---|---|---|---|---|---|---|---|
| | 0 6 ... 24 | 6 9 ... 24 | ... 24 | ... 24 | ... 24 | ... 24 | ... 24 |
| user A | | program a | | program b | | program c program d | program e |
| ... | | | | ... | | | |

FIG. 19

| time | MON | TUE | WED | THU | FRI | SAT | SUN |
|---|---|---|---|---|---|---|---|
| | 0 6 … 24 | 6 9 … 24 | … 24 | … 24 | … 24 | … 24 | … 24 |
| user A | | program a | | program b | | program c / program d | program e |
| user B | | program a | program f | | program g | | |
| … | | | | | | | |

FIG. 21

| time | MON | TUE | WED | THU | FRI | SAT | SUN |
|---|---|---|---|---|---|---|---|
| | 0 6 ... 24 | 6 9...24 | ...24 | ...24 | ...24 | ...24 | ...24 |
| user A | | program a | | program b | | program c, program d | program e |
| user B | | program a | program f | | program g | | |
| user A + B | program h | | | | | | |
| ... | | | | | | | | favorite list per user { user A, user B } family favorite list { user A + B, ... }

MULTIMEDIA DEVICE, MULTIPLE IMAGE SENSORS HAVING DIFFERENT TYPES AND METHOD FOR CONTROLLING THE SAME

This application claims the benefit of the Korean Patent Application Nos. 10-2010-0111953, filed on Nov. 11, 2010, 10-2010-0111955 filed on Nov. 11, 2010 which are hereby incorporated by reference as if fully set forth herein.

BACKGROUND OF THE INVENTION

1. Field of the Invention

The present invention relates to a technology related to a multimedia device, and more particularly, to a technology controlling a multimedia device by using a plurality of heterogeneous image sensors.

2. Discussion of the Related Art

Many discussions about a technology of video call using a camera built in a PC or notebook computer have been made. Also, with the recent rapid development of electrics and electronics technologies, methods that can fulfill various functions and conditions desired by users have been discussed. Moreover, a camera interacting with a multimedia device has been suggested for studies and application for various functions in addition to simple functions according to the related art such as video call. For example, various attempts for application of a camera interacting with a multimedia device to a face recognition field of a user and control of the multimedia device based on gesture recognition of a user have been made. However, such a control based on recognition of a user using a camera according to the related art causes a problem in that recognition of a required level has not been made due to the condition where the multimedia device is provided, unexpected movement of the user, etc.

SUMMARY OF THE INVENTION

Accordingly, the present invention is directed to a multimedia device, multiple image sensors having different types and a method for controlling the same, which substantially obviate ones or more problems due to limitations and disadvantages of the related art.

One embodiment of the present invention is to provide a solution for exactly recognizing users located in the periphery of a multimedia device by using a plurality of heterogeneous image sensors.

Another embodiment of the present invention is to provide a design method that can improve a recognition distance and throughput by solving problems occurring in a recognition procedure provided by a camera interacting with a multimedia device.

Still another embodiment of the present invention is to provide preference channel services in various manners depending on that a single user or a plurality of users have been recognized, and to improve a processing speed.

Further still another embodiment of the present invention is to provide a technique of automatically storing a preference broadcast program per user by using a plurality of heterogeneous image sensors.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a multimedia device, which uses a plurality of heterogeneous image sensors, comprises the steps of identifying at least one user located in the periphery of the multimedia device under the control of a first image sensor for extracting depth data and a second image sensor for extracting color data; accessing a memory that stores a preference channel per user; extracting information on the preference channel corresponding to the identified user, from the accessed memory; performing a control operation for switching to the preference channel based on the extracted information; and monitoring change of a user located in front of the multimedia device.

In another aspect of the present invention, a multimedia device, which uses a plurality of heterogeneous image sensors, comprises a broadcast network interface receiving broadcast data; a face recognition module identifying at least one user by using information generated under the control of a first image sensor for extracting depth data and a second image sensor for extracting color data; a memory storing a preference channel per user; an extractor extracting information on a preference channel corresponding to the at least one user by accessing the memory; a display module displaying a guide message indicating the corresponding preference channel; and a controller performing a control operation for switching to the corresponding preference channel if a signal selecting the corresponding preference channel is applied.

In still another aspect of the present invention, a method for controlling a multimedia device, which uses a plurality of heterogeneous image sensors, comprises the steps of outputting a broadcast program received through a broadcast network; identifying at least one user located in the periphery of the multimedia device under the control of a first image sensor for extracting depth data and a second image sensor for extracting color data; if the identified user leaves a certain range from the multimedia device while the broadcast program is being output, storing the broadcast program from the time when the identified user leaves a certain range; if the left user is re-recognized under the control of the first image sensor and the second image sensor, displaying a message guiding whether to output the stored broadcast program; and performing a control operation to output the stored broadcast program.

In further still another aspect of the present invention, a multimedia device, which uses a plurality of heterogeneous image sensors, comprises a broadcast network interface receiving broadcast data currently in service; a face recognition module identifying at least one user by using information generated under the control of a first image sensor for extracting depth data and a second image sensor for extracting color data; a memory storing a preference channel per user; an extractor extracting information on a preference channel corresponding to the at least one user by accessing the memory; and a controller controlling the memory to store a broadcast program of the preference channel if a channel of the broadcast data currently in service is not identical with the preference channel corresponding to the identified user.

According to one embodiment of the present invention, a solution for exactly recognizing users located in the periphery of a multimedia device by using a plurality of heterogeneous image sensors is provided.

Also, according to another embodiment of the present invention, a design method is provided, which can improve a recognition distance and throughput at the same time by solving problems occurring in a recognition procedure provided by a camera interacting with a multimedia device.

Moreover, according to still another embodiment of the present invention, preference channel services are provided in various manners depending on that a single user or a plurality of users have been recognized, and a processing speed is improved.

According to further still another embodiment of the present invention, a technique of automatically storing a preference broadcast program per user by using a plurality of image sensors is provided.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating a face vector stored in a database illustrated in FIG. 4;

FIG. 17 is a diagram illustrating an example of a database that stores data acquired by FIG. 16;

FIG. 19 is a diagram illustrating an example of a database that stores data acquired by FIG. 18;

FIG. 21 is a diagram illustrating an example of a database that stores data acquired by FIG. 20;

FIG. 34 to FIG. 36 are diagrams illustrating a process of automatically storing a broadcast program in a multimedia device according to another embodiment of the present invention when a single viewer who is watching the broadcast program returns to the original position after leaving the position for a while;

FIG. 37 to FIG. 40 are diagrams illustrating a process of automatically storing a broadcast program in a multimedia device according to another embodiment of the present invention when some of a plurality of viewers who are watching the broadcast program return to the original position after leaving the position for a while;

DETAILED DESCRIPTION OF THE INVENTION

Figure 1:
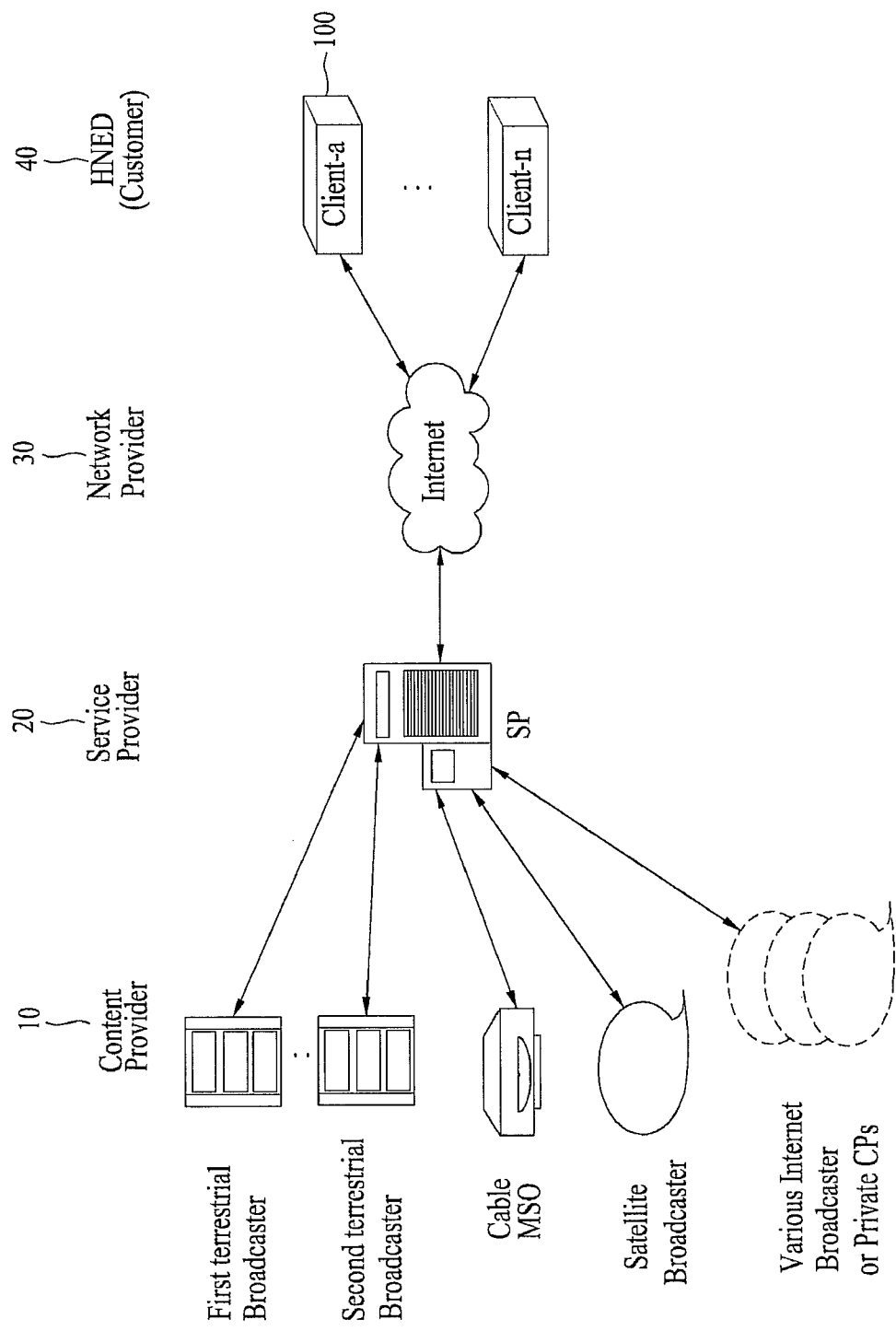
FIG. 1 is a brief diagram illustrating an example of a whole system that includes a multimedia device according to one embodiment of the present invention.

FIG. 1 is a brief diagram illustrating an example of a whole system that includes a multimedia device according to one embodiment of the present invention. Although the multimedia device of FIG. 1 may correspond to a connected TV, for example, it is to be understood that the scope of the present invention is not limited to the connected TV and should be defined basically by claims.

As illustrated in FIG. 1, the whole system that includes a multimedia device according to one embodiment of the present invention includes a content provider (CP) 10, a service provider (SP) 20, a network provider (NP) 30, and a home network end user (HNED) 40. The HNED 40 corresponds to, for example, a client 100 which is a multimedia device according to the embodiment of the present invention.

The content provider 10 manufactures various contents and provides them. Examples of the content provider 10 include a terrestrial broadcaster, a cable system operator (SO), a multiple system operator (MSO), a satellite broadcaster, and an Internet broadcaster, as illustrated in FIG. 1. Also, the content provider 10 may provide various applications in addition to broadcast contents.

The service provider 20 can provide contents provided by the content provider 10 by service-packaging them. For example, the service provider 20 of FIG. 1 can package first terrestrial broadcasting, second terrestrial broadcasting, cable MSO, satellite broadcasting, various kinds of Internet broadcasting, application, etc. and provide the packaged one to a user.

The network provider 30 may provide a network for providing a service to the client 100. The client 100 may construct a home network end user (HNED) to receive a service.

In the mean time, the client 100 may provide contents through the network. In this case, the client 100 may be a content provider contrary to the above. The content provider 10 may receive contents from the client 100. In this case, it is advantageous in that bidirectional content service or data service is available.

Figure 2:
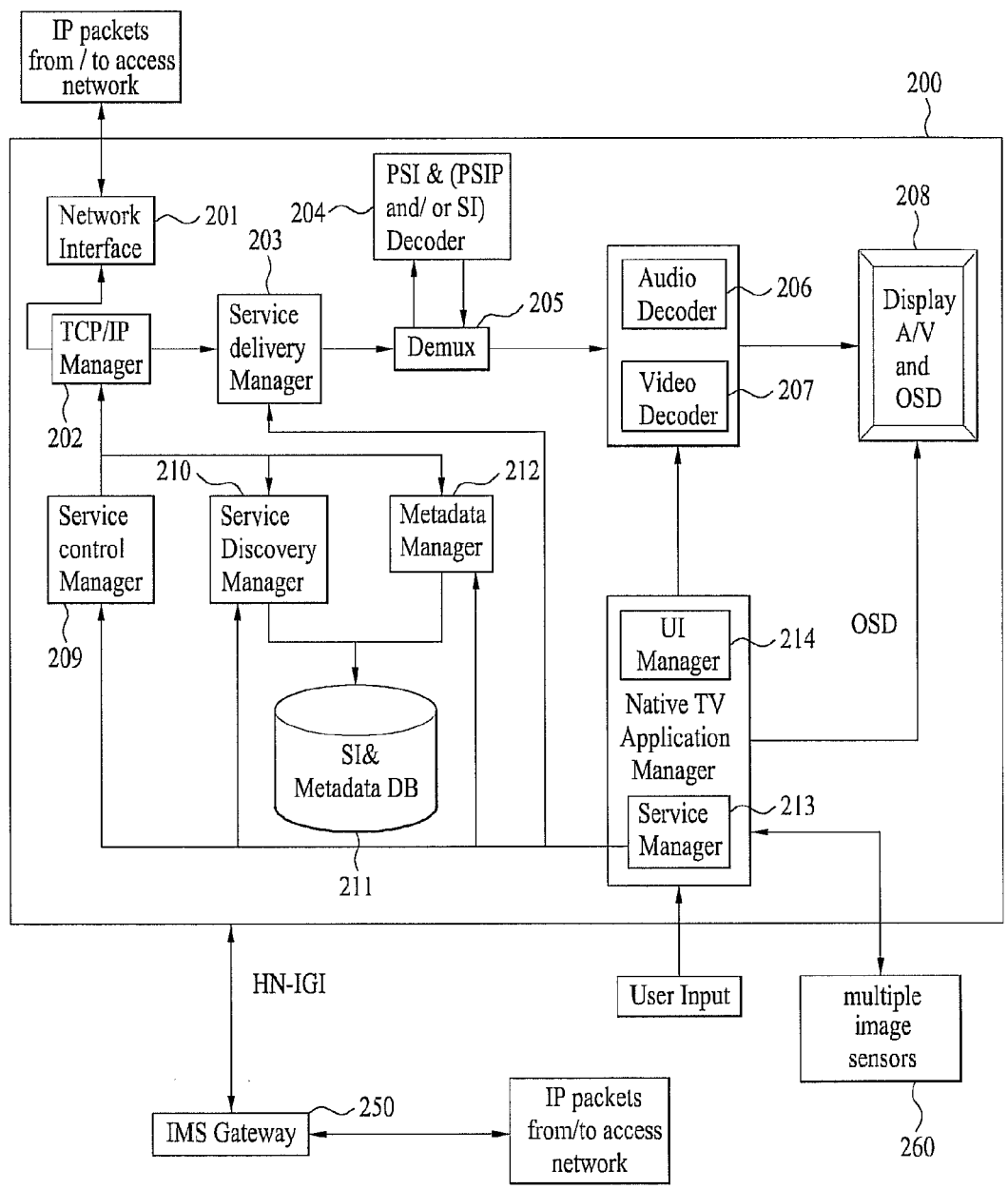
FIG. 2 is a detailed diagram illustrating an example of a multimedia device illustrated in FIG. 1.

FIG. 2 is a detailed diagram illustrating an example of a multimedia device illustrated in FIG. 1.

The multimedia device according to one embodiment of the present invention includes a network interface 201, a TCP/IP manager 202, a service delivery manager 203, a demultiplexer (Demux) 205, a PSI& (PSIP and/or SI) decoder 204, an audio decoder 206, a video decoder 207, a display A/V and OSD module 208, a service control manager 209, a service discovery manager 210, a metadata manager 212, an SI&Metadata DB 211, a UI manager 214, and a service manager 213. Moreover, a plurality of heterogeneous image sensors 260 are connected with the multimedia device 200, by a connection mode of a USB mode, for example. Also, although the plurality of heterogeneous image sensors 260 are designed as separate modules in FIG. 2, the plurality of heterogeneous images sensors 260 may be designed in such a manner that they are housed in the multimedia device 200.

The network interface 201 receives packets from a network, and transmits the packets to the network. In other words, the network interface 201 receives services, contents, etc. from the service provider through the network.

The TCP/IP manager 202 is involved in packets received in the multimedia device 200 and packets transmitted from the multimedia device 200, i.e., packet transfer from the source to the destination. The service delivery manager 203 takes the role of control of received service data. For example, if the service delivery manager 203 controls real-time streaming data, it can use RTP/RTCP. If the service delivery manager 203 transmits the real-time streaming data by using RTP, it parses the received packets in accordance with RTP and transmits the parsed packets to the demultiplexer 205 or stores the parsed packets in the SI&Metadata DB 211 under the control of the service manager 213. The service delivery manager 203 feeds the received information back to a server, which provides a service, by using RTCP.

The demultiplexer 205 demultiplexes the received packets to audio, video and PSI (Program Specific Information) data and then transmits the demultiplexed data to the audio decoder 206, the video decoder 207, and the PSI&(PSIP and/or SI) decoder 204, respectively.

The PSI&(PSIP and/or SI) decoder 204 receives and decodes PSI section, PSIP (Program and Service Information Protocol) section or SI (Service Information) section, which is demultiplexed by the demultiplexer 205.

Also, the PSI&(PSIP and/or SI) decoder 204 decodes the received sections to make a database for service information, and stores the database for service information in the SI&Metadata DB 211.

The audio/video decoders 206/207 decode the video data and the audio data, which are received from the demultiplexer 205.

The UI manager 214 provides a graphic user interface (GUI) for the user by using an on screen display (OSD), etc. and performs a receiving operation based on a key input from the user. For example, if a key input signal for channel selection is input from the user, the UI manager 214 transmits the key input signal to the service manager 213.

The service manager 213 controls managers related to the service, such as the service delivery manager 203, the service discovery manager 210, the service control manager 209, and the metadata manager 212.

Also, the service manager 213 makes a channel map and selects a channel by using the channel map in accordance with the key input signal received from the UI manager 214. The service discovery manager 210 provides information required to select the service provider that provides services. If a signal related to channel selection is received from the service manager 213, the service discovery manager 210 discovers a corresponding service by using the received information.

The service control manager 209 takes the role of selection and control of the service. For example, if the user selects a live broadcasting service like the existing broadcasting mode, the service control manager 209 uses IGMP or RTSP. If the user selects a video on demand (VOD) service, the service control manager 209 selects and controls the service by using RTSP. The metadata manager 212 manages metadata related to the service and stores the metadata in the SI&Metadata DB 211.

The SI&Metadata DB 211 stores the service information decoded by the PSI&(PSIP and/or SI) decoder 204, the metadata managed by the metadata manager 212, and the information required to select the service provider provided by the service discovery manager 210. Also, the SI&Metadata DB 211 may store setup data for the system.

In the mean time, the IG 250 is a gateway where functions required to access IMS based IPTV services are collected.

The plurality of heterogeneous image sensors 260 illustrated in FIG. 2 are designed to take a single image or a plurality of images of a person or object located in the periphery of the multimedia device 200. In more detail, the plurality of heterogeneous image sensors 260 are designed to operate the single image or the plurality of images continuously, periodically, at a selected time, or at a specific condition only, as described later in more detail.

Figure 3:
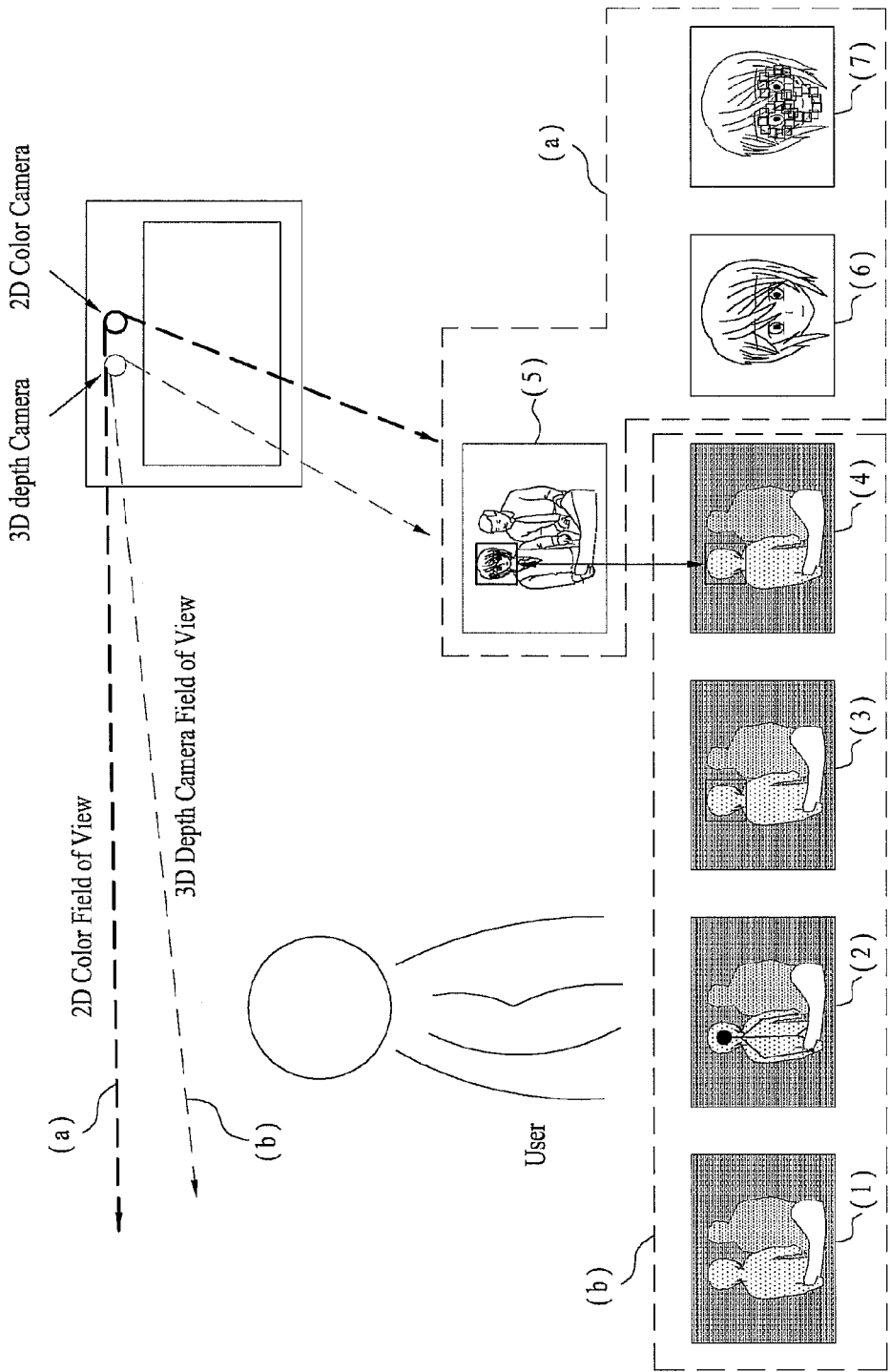
FIG. 3 is a diagram illustrating a multimedia device based on a plurality of heterogeneous images sensors and camera-taking screens according to one embodiment of the present invention.

FIG. 3 is a diagram illustrating a multimedia device based on a plurality of heterogeneous images sensors and camera-taking screens according to one embodiment of the present invention. Hereinafter, the multimedia device based on a plurality of heterogeneous image sensors according to one embodiment of the present invention and camera-taking screens will be described with reference to FIG. 3.

Generally, the first image sensors related to depth data processing include a field not suitable for long-distance face recognition due to limited resolution (for example, maximum VGA level) and a recognition distance (for example, 3.5 m). Also, the second image sensors related to color data processing have drawbacks in that they have a slow recognition speed and are not robust to light condition. Accordingly, in order to solve the drawbacks of the image sensors, the multimedia device according to one embodiment of the present invention is designed to interact with a hybrid type image sensor module that is a hybrid type of the first image sensor and the second image sensor.

An IR camera or depth camera is used as the first image sensor. In more detail, a time of flight (TOF) type IR camera or depth camera and a structured light type IR camera or depth camera have been discussed. The TOF type IR camera or depth camera calculates distance information by using the time difference resulting from emission of infrared rays. The structured light type IR camera or depth camera calculates distance information by emitting infrared rays to a specific pattern and analyzing a modified pattern. The first image sensor is advantageous in view of depth data recognition and processing speed, and easily senses object, person, etc. even at a dark place. However, the first image sensor has a drawback in that it has low resolution at a long distance.

Moreover, a color camera or RGB camera is used as the second image sensor. In more detail, a stereo camera type color camera or RGB camera and a mono camera type color camera or RGB camera have been discussed. The stereo camera type color camera or RGB camera detects and traces the hand or face based on image time comparison information taken through two cameras. The mono camera type color camera or RGB camera detects and traces the hand or face based on shape and color information taken through one camera. The second image sensor is advantageous in that it has more improved resolution than that of the first image sensor, whereas the second image sensor has drawbacks in that it is vulnerable to peripheral lighting and it is difficult to recognize the corresponding object at a dark place. In particular, the second image sensor has a drawback in that it is difficult to recognize exact depth.

In order to solve the aforementioned problems, as illustrated in FIG. 3, the multimedia device according to one embodiment of the present invention is designed to have both the first image sensor and the second image sensor. The image sensors may be designed in such a manner that they are embedded in the multimedia device, or may be designed as separate hardware modules. First of all, as illustrated in (b) of FIG. 3, the first image sensor takes images that include users located in the periphery of the multimedia device. Detailed taking-images are illustrated in (1), (2), (3) and (4) of FIG. 3 in due order.

In the mean time, if image-taking and data analysis of the first image sensor are completed, as illustrated in (a) of FIG. 3, the second image sensor takes images of a face of a specific user. Detailed taking-images are illustrated in (5), (6), and (7) of FIG. 3 in due order.

The first image sensor of the plurality of heterogeneous image sensors according to one embodiment of the present invention takes first images located in the periphery of the multimedia device and extracts depth data from the taken first images. As illustrated in (1) of FIG. 3, the first image sensor can be designed in such a manner that a field of each object is displayed at different contrast ratios depending on the distance.

Moreover, the first image sensor can recognize a face of at least one user by using the extracted depth data. In other words, the first image sensor extracts body information (for example, face, hand, foot, joint, etc.) of the user by using the database, etc., as illustrated in (2) of FIG. 3, and acquires location coordinates and distance information of a face of a specific user as illustrated in (3) of FIG. 3. In more detail, the first image sensor is designed to calculate values x, y, and z which are location information on the face of the user, wherein the x means the location on a horizontal axis of the face in the taken first image, the y means the location on a vertical axis of the face in the taken first image, and the z means the distance between the face of the user and the first image sensor.

Also, among the plurality of heterogeneous image sensors according to one embodiment of the present invention, the second image sensor for extracting color images takes second images of the recognized face of the user, and is illustrated in (5) of FIG. 3.

In the mean time, if the first image sensor and the second image sensor illustrated in FIG. 3 are designed to adjoin each other, an error due to the difference in physical location may be disregarded. However, according to another embodiment of the present invention, the second image sensor is designed to compensate for the coordinate information or distance information acquired by the first image sensor by using the information on the difference in physical location and to take the user by using the compensated coordinate information or distance information. Also, if the first image sensor and the second image sensor are designed to be arranged horizontally from the ground, the information on the difference in physical location can be set based on a horizontal frame. The second image sensor, as illustrated in (7) of FIG. 3, extracts feature information from the taken second image. The feature information is data corresponding to a specific part (for example, mouse, nose, eye, etc.) for identifying a plurality of users who use the multimedia device. Moreover, the second image sensor may zoom in a zone corresponding to the face of the user based on the coordinate values (the values x, y, and z) obtained through image-taking of the first image sensor. This means a procedure of switching from (5) of FIG. 3 to (6) of FIG. 3.

If image-taking and analysis of the first image sensor and the second image sensor are completely performed, the multimedia device according to one embodiment of the present invention accesses a memory that stores data corresponding to the extracted feature information, and extracts information for identifying a specific user stored in the memory.

If the information for identifying a specific user exists in the memory, the multimedia device provides a service previously set for the specific user.

On the other hand, if the information for identifying a specific user does not exist in the memory, the multimedia device is designed to display a guide message for storing the recognized user information in the memory.

As described above, according to one embodiment of the present invention, the first image sensor is designed to detect user location information or coordinate information on the face of the user while the second image sensor is designed to recognize the face by using the data acquired by the first image sensor.

Moreover, according to another embodiment of the present invention, the second image sensor is designed in such a manner that it is operated only in case of a specific condition. For example, if the distance information acquired by the operation of the first image sensor between the user and the first image sensor is less than a first reference value, or if a recognition rate on the face of the user, which is acquired by the operation of the first image sensor, is more than a second reference value, the face of the user located in the periphery of the multimedia device is detected and recognized by the first image sensor only. On the other hand, if the distance information acquired by the operation of the first image sensor exceeds the first reference value, or if the recognition rate on the face of the user, which is acquired by the operation of the first image sensor, is less than the second reference value, the second image sensor is additionally used to recognize the face of the user.

According to still another embodiment of the present invention, the second image sensor is designed to perform zoom-in by using the distance information acquired by the first image sensor in the procedure of recognizing the face of the user and to take the face only by using face coordinate information acquired by the first image sensor.

Accordingly, the different types of heterogeneous image sensors are used as above, it is advantageous in that it enables long-distance face recognition and data processing speed is more improved than that of the related art.

Figure 4:
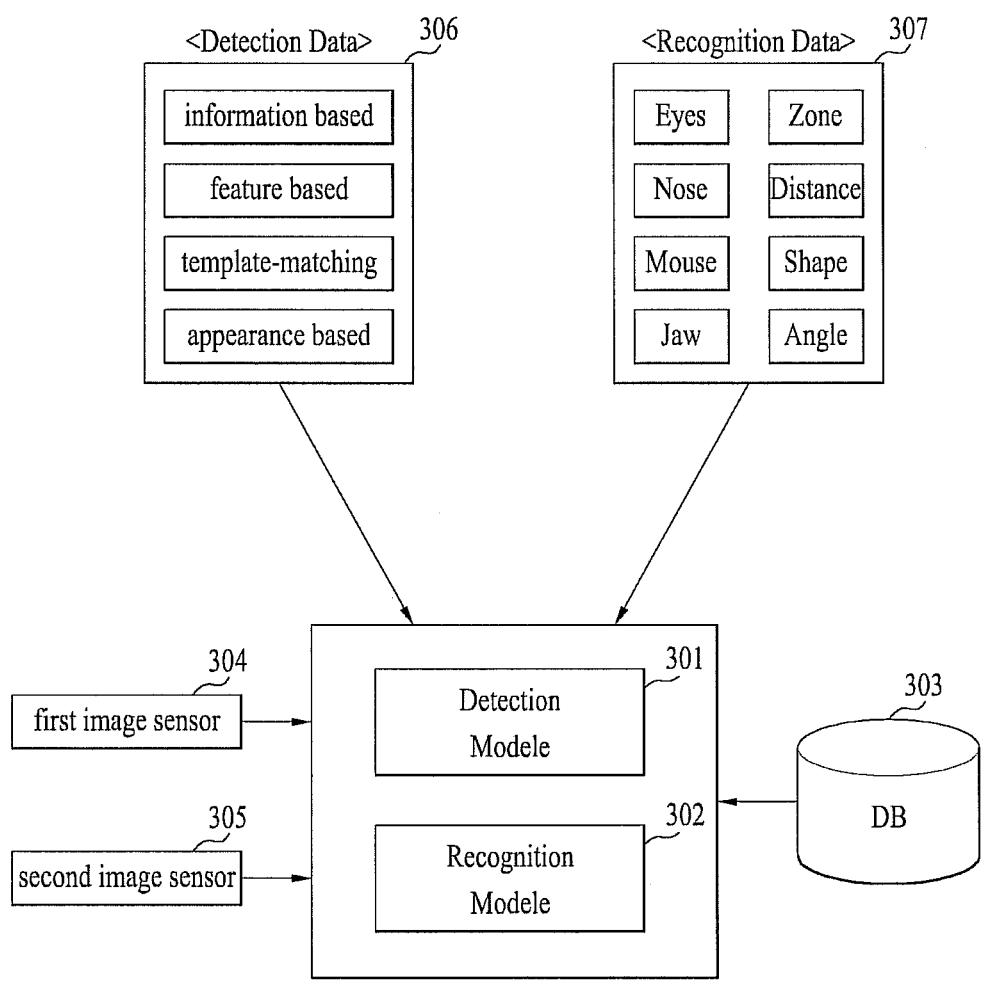
FIG. 4 is a diagram illustrating a procedure of using detection data and recognition data in a plurality of heterogeneous image sensors and a multimedia device according to one embodiment of the present invention.

FIG. 4 is a diagram illustrating a procedure of using detection data and recognition data in a plurality of heterogeneous image sensors and a multimedia device according to one embodiment of the present invention.

Face detection is performed by a process different from that of face recognition. The face detection includes a process of detecting a face zone within one image, whereas the face recognition is a process of recognizing whether the detected face corresponds to which specific user. In particular, the procedure of performing face detection by using the first image sensor and the procedure of performing face recognition by using the second image sensor in accordance with one embodiment of the present invention will be described with reference to FIG. 4.

As illustrated in FIG. 4, the multimedia device according to one embodiment of the present invention includes a detection module 301, a recognition module 302, a database (DB) 303, a first image sensor 304, and a second image sensor 305. The multimedia device uses detection data 306 and recognition data 307 if necessary. The detection data 306, for example, may be generated based on knowledge-based detection techniques, feature-based detection techniques, template matching techniques, and appearance-based detection techniques. Also, the recognition data 307, for example, include data for identifying a specific user, such as eyes, nose, mouse, jaw, zone, distance, shape, and angle.

Moreover, the detection module 301 determines the presence of the face of the user by using the image data received from the first image sensor 304. Also, in a procedure of estimating the zone where the face of the user is located, data related to the aforementioned knowledge-based detection techniques, feature-based detection techniques, template matching techniques, and appearance-based detection techniques are used.

The recognition module 302 identifies whether the recognized user is a specific user by using the image data received from the second image sensor 305. At this time, the recognition module 302 compares the received image data with face vector information stored in the DB 303 based on the aforementioned recognition data 307. This will be described in more detail with reference to FIG. 5.

FIG. 5 is a diagram illustrating a face vector stored in a database illustrated in FIG. 4.

As illustrated in FIG. 5, face vectors of users who uses the multimedia device according to one embodiment of the present invention are stored in the database. The face vectors, for example are a data set of feature information appearing on the faces of the users, and are used to identify each of the specific users.

Figure 6:
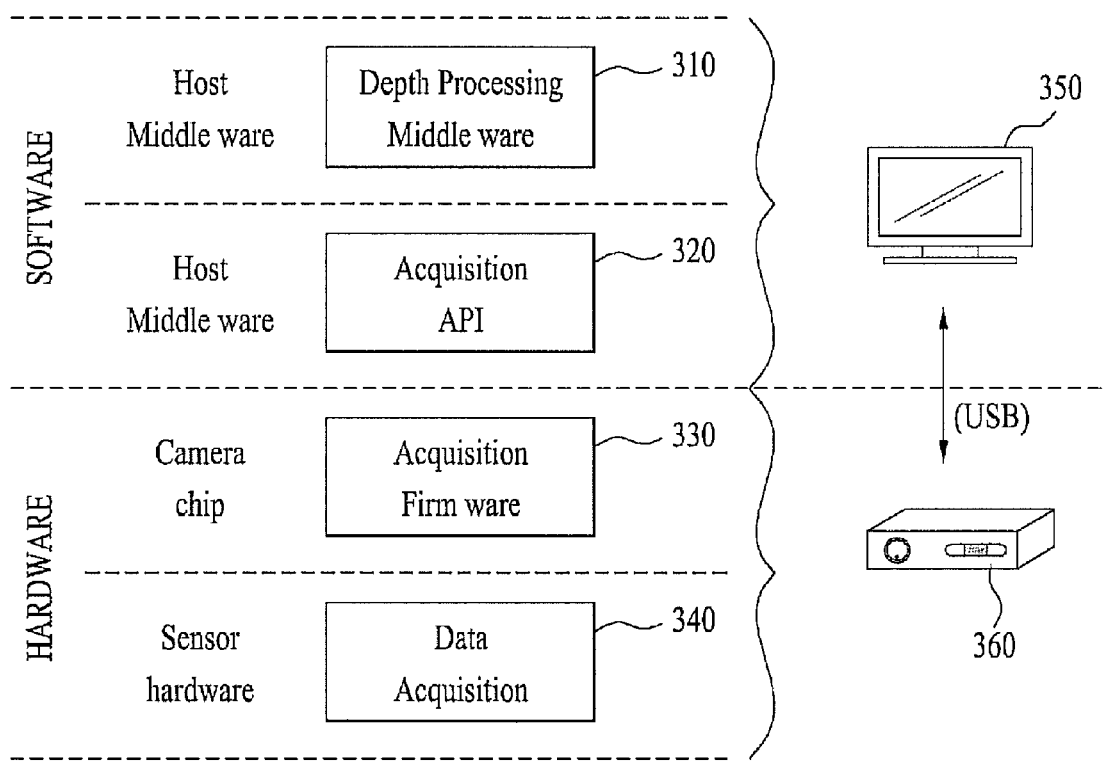
FIG. 6 is a diagram illustrating an operation of a plurality of heterogeneous image sensors, which interact with a multimedia device according to one embodiment of the present invention, in accordance with a hardware field and a software field.

FIG. 6 is a diagram illustrating an operation of a plurality of heterogeneous image sensors, which interact with a multimedia device according to one embodiment of the present invention, in accordance with a hardware field and a software field.

As illustrated in FIG. 6, the operation of the multimedia device, which is performed through images input by the plurality of heterogeneous image sensors, will be described depending on a hardware field 360 of the image sensor and a software field 350 of the multimedia device that processes the data received from the image sensor.

Although the hardware field 360 is illustrated as a separate module in FIG. 6, it may be embedded in the multimedia device that processes the software field 350.

First of all, the hardware field 360 includes a data collection field 340 and a firmware field 330.

The data collection field 340 receives original data recognized by the multimedia device from the image sensor, and includes an IR light projector, a depth image sensor, a color image sensor (RGB image sensor), a microphone, and a camera chip.

Also, the firmware field 330 serves to connect the hardware field with the software field. Also, the firmware field 330 may be used as a host application required by a specific application, and performs downsampling and mirroring.

Accordingly, the data collection field 340 and the firmware field 330 interact with each other. The data collection field 340 and the firmware field 330 can control the hardware field 360 through their interaction. Also, the firmware field can be driven by a camera chip.

Also, the software field 350 includes an application programming interface (API) field 320, and a middleware field 310.

The API field 320 can be implemented by the controller of the multimedia device. Also, if a camera module is configured as an external device separately from the multimedia device, the API field can be implemented by a personal computer, a game console, a set-top box, etc.

Also, the API field 320 could be a simple API that allows the multimedia device to drive the sensor of the hardware field.

The middleware field 310 is a recognition algorithm field and can include a depth processing middleware. Also, the middleware field can provide an application together with an explicit user control API even if the user inputs gesture through either his(her) hand or his(her) whole body. Also, the middleware field can include an algorithm that performs an operation for searching for the location of the hand of the user, an operation for tracing the location of the user, an operation for extracting skeleton features of the user, and an operation for respectively recognizing the user and background from the input image. The algorithm can be operated by using depth information, color information, IR information, and audio information, which are acquired from the hardware field.

Figure 7:
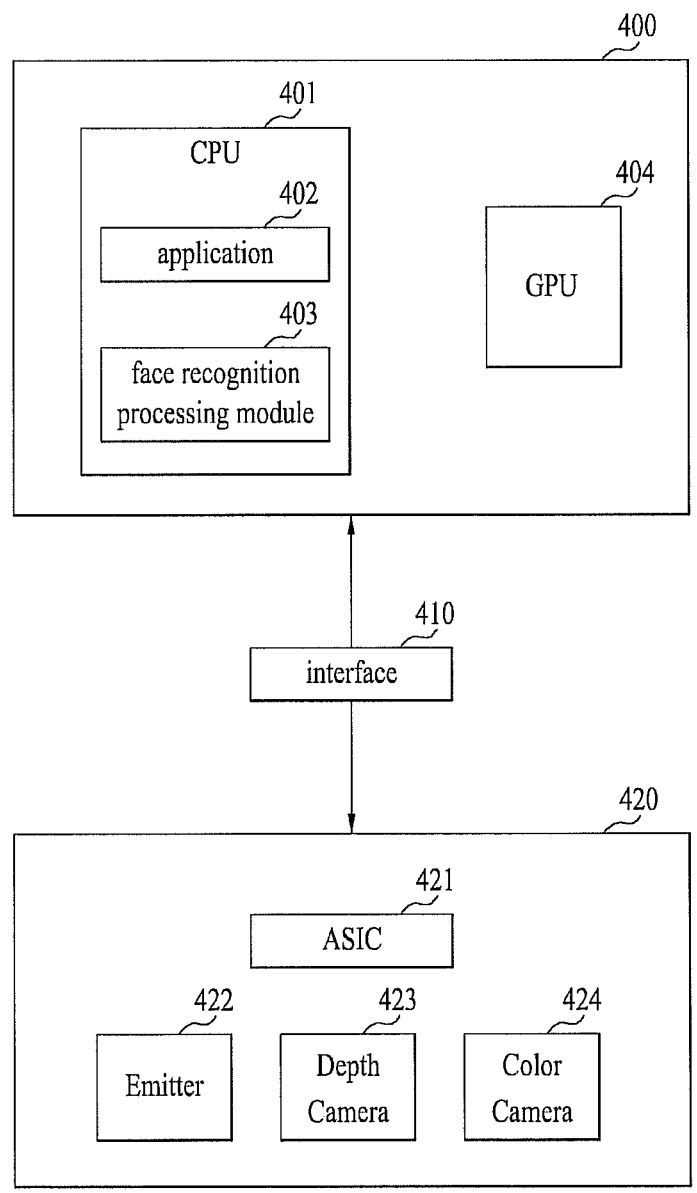
FIG. 7 is a diagram illustrating a plurality of heterogeneous image sensors and a multimedia device according to one embodiment of the present invention.

FIG. 7 is a diagram illustrating a plurality of heterogeneous image sensors and a multimedia device according to one embodiment of the present invention. Hereinafter, the plurality of heterogeneous image sensors and the multimedia device according to one embodiment of the present invention will be described with reference to FIG. 7. Although the plurality of heterogeneous image sensors and the multimedia device according to one embodiment of the present invention are separately illustrated in FIG. 7, the multiple cameras may be designed in such a manner that they are embedded in the multimedia device.

As illustrated in FIG. 7, the multimedia device 400 according to one embodiment of the present invention is designed to include modules such as a central processing unit (CPU) 401 and a graphic processing unit 404, wherein the CPU 401 includes an application 402 and a face recognition processing module 403. In the mean time, a plurality of heterogeneous image sensors 420 according to one embodiment of the present invention are designed to include modules such as an application specific integrated circuit (ASIC) 421, an emitter 422, a first image sensor 423, and a second image sensor 424. The multimedia device 400 is connected with the plurality of heterogeneous image sensors 420 through a wire or wireless interface 410. For example, a universal serial bus (USB) interface may be used as the wire or wireless interface 410. It is to be understood that the modules of FIG. 7 are only exemplary and the scope of the present invention should be defined basically by claims.

The emitter 422 emits light to at least one user located in the periphery of the multimedia device 400. The first image sensor 423 takes a first image by using the emitted light, extracts depth data from the taken first image, and detects a face of the at least one user by using the extracted depth data.

Also, the second image sensor 424 takes a second image on the face of the detected user and extracts feature information from the taken second image.

The extracted feature information is transmitted to the face recognition processing module 403 of the multimedia device through the interface 410. Although not illustrated in FIG. 7, the face recognition processing module 403 is designed to include a receiver, a memory, an extractor, and a controller.

The receiver of the face recognition processing module 403 receives feature information transmitted through the plurality of hetero image sensors 420 and the interface 410. Moreover, the memory of the face recognition processing module 403 stores feature information on at least one user and ID corresponding to the feature information.

Accordingly, the extractor of the face recognition processing module 403 extracts the ID corresponding to the received feature information from the memory, and the controller of the face recognition processing module 403 is designed to automatically perform previously set functions corresponding to the ID.

In the mean time, if the face recognition processing module is designed to be performed by the CPU of the multimedia device as illustrated in FIG. 7, it is advantageous in that the design cost of the camera is lowered, and it is also advantageous in view of extensibility such as recognition of various faces and addition of functions.

Figure 8:
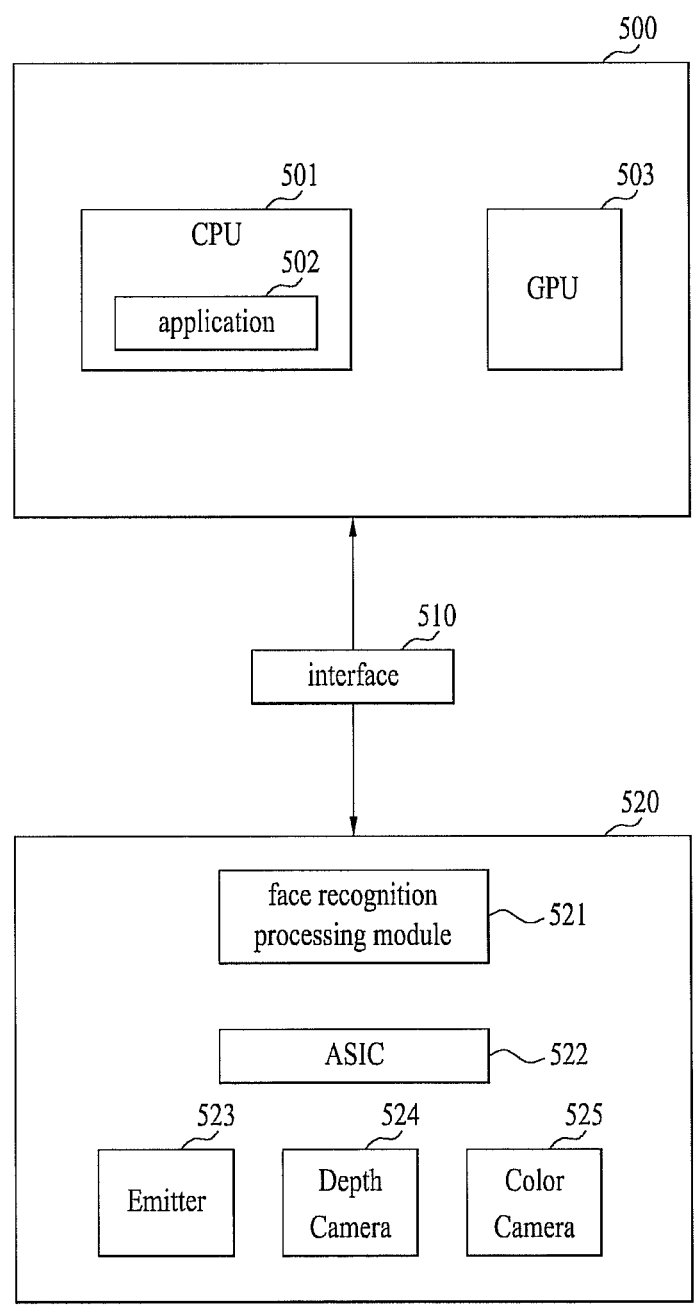
FIG. 8 is a diagram illustrating a plurality of heterogeneous image sensors and a multimedia device according to another embodiment of the present invention.

FIG. 8 is a diagram illustrating a plurality of heterogeneous image sensors and a multimedia device according to another embodiment of the present invention. Hereinafter, the plurality of heterogeneous image sensors and the multimedia device according to another embodiment of the present invention will be described with reference to FIG. 8. Although the plurality of heterogeneous image sensors and the multimedia device according to one embodiment of the present invention are separately illustrated in FIG. 8, the multiple cameras may be designed in such a manner that they are embedded in the multimedia device.

As illustrated in FIG. 8, the multimedia device 500 according to one embodiment of the present invention is designed to include modules such as a central processing unit (CPU) 501 and a graphic processing unit 503, wherein the CPU 501 includes an application 502. In the mean time, a plurality of heterogeneous image sensors 520 according to one embodiment of the present invention are designed to include modules such as a face recognition processing module 521, an application specific integrated circuit (ASIC) 522, an emitter 523, a first image sensor 524, and a second image sensor 525. The multimedia device 500 is connected with the plurality of heterogeneous image sensors 520 through a wire or wireless interface 510. For example, a universal serial bus (USB) interface may be used as the wire or wireless interface 510. It is to be understood that the modules of FIG. 8 are only exemplary and the scope of the present invention should be defined basically by claims.

FIG. 8 is different from FIG. 7 in that the face recognition module 521 is built in the plurality of heterogeneous image sensors 520. The other repeated description will be omitted.

In the mean time, as illustrated in FIG. 8, if the face recognition processing module is designed to be performed by the plurality of heterogeneous image sensors 520, various types of cameras can be designed through an independent platform.

Figure 9:
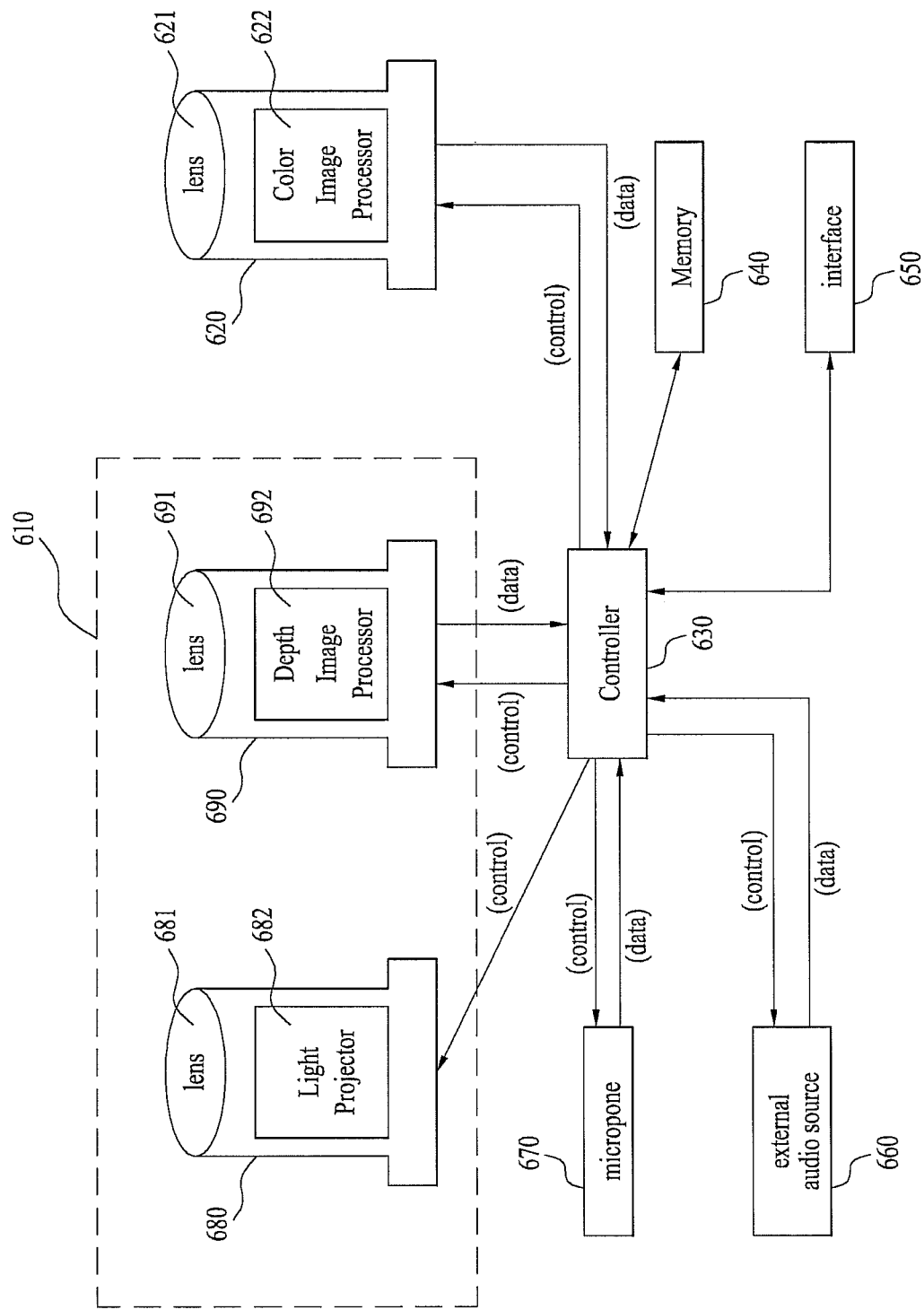
FIG. 9 is a detailed diagram illustrating a plurality of heterogeneous image sensors according to one embodiment of the present invention.

FIG. 9 is a detailed diagram illustrating a plurality of heterogeneous image sensors according to one embodiment of the present invention. Hereinafter, the plurality of heterogeneous image sensors according to one embodiment of the present invention will be described with reference to FIG. 9.

As illustrated in FIG. 9, the plurality of heterogeneous image sensors according to one embodiment of the present invention include a first image sensor group 610, a second image sensor 620, a controller 630, a memory 640, and an interface 650, and are designed to receive audio data from a microphone 670 and an external audio source 660 under the control of the controller 630.

The memory 640, for example, may be designed as a flash memory. The interface 650 is designed as a USB interface and is connected with an external multimedia device. In the mean time, the first image sensor group 610 includes am emitter 680 and a first image sensor 690. The emitter can be designed as an infra-red (IR) emitter, for example.

Moreover, a light projector 682 of the emitter 680 projects a lens 681 to emit light to at least one user located in the periphery of the multimedia device, under the control of the controller 630.

Also, under the control of the controller 630, the first image sensor 690 takes a first image by using the light received through a lens 691, extracts depth data from the taken first image, and transmits the extracted data to the controller 630.

The controller 630 detects a face of the at least one user by using the transmitted depth data, and controls the second image sensor 620.

The second image sensor 620 takes a second image on the face of the detected user applied through a lens 621, under the control of the controller 630. Moreover, the second image sensor 620 transmits feature information extracted from the taken second image to the controller 630.

The controller 630 is designed to transmit the extracted feature information to the multimedia device by using the interface 650. Accordingly, the multimedia device that has received the feature information can quickly identify which user of users stored in the DB is the one corresponding to the taken image.

Figure 10:
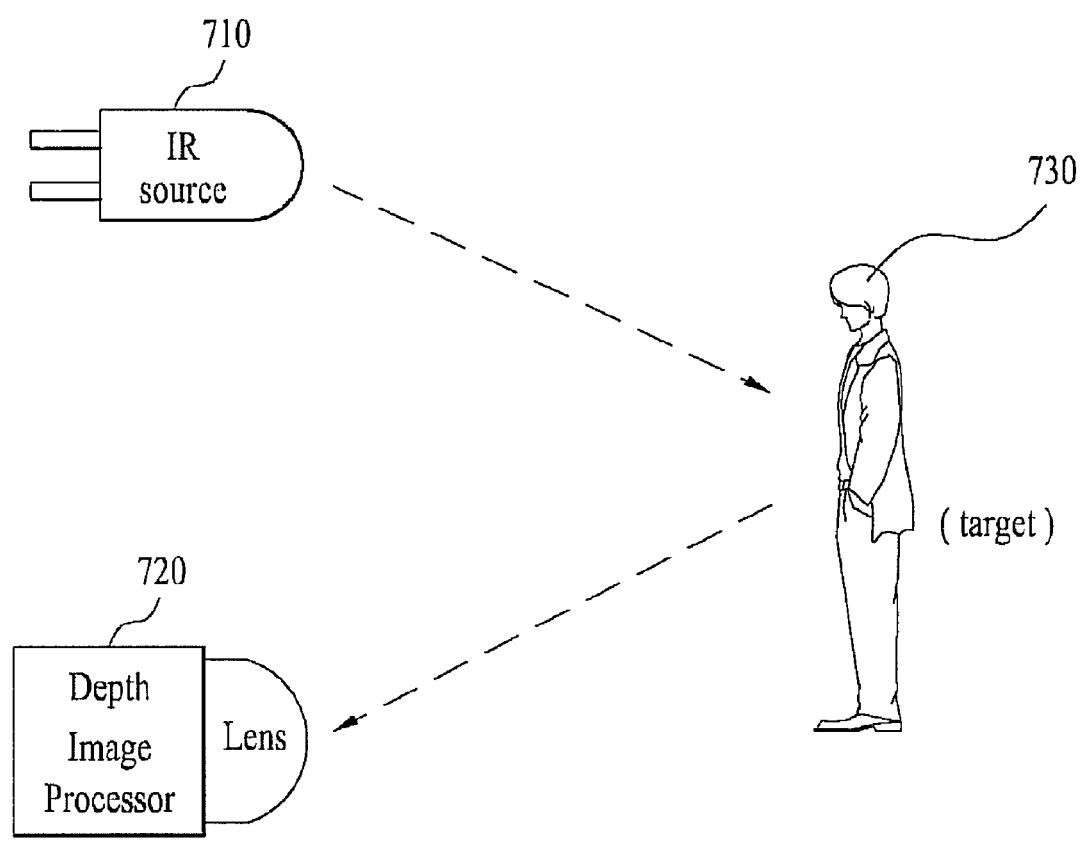
FIG. 10 is a diagram illustrating an example of a first image sensor of a plurality of heterogeneous image sensors according to one embodiment of the present invention.

FIG. 10 is a diagram illustrating an example of a first image sensor of a plurality of heterogeneous image sensors according to one embodiment of the present invention. Hereinafter, the example of a first image sensor of a plurality of heterogeneous image sensors according to one embodiment of the present invention will be described with reference to FIG. 10. An IR source 710 illustrated in FIG. 10 may correspond to the emitter 680 of FIG. 9, and a depth image processor 720 illustrated in FIG. 10 may correspond to the first image sensor 690 of FIG. 9. Accordingly, the description of FIG. 9 and FIG. 10 may complementarily be applied to this embodiment. Also, the camera illustrated in FIG. 10 may be designed in accordance with the aforementioned structured light type.

As illustrated in FIG. 10, the IR source 710 is designed to continuously project a coded pattern image to a target user 730. The depth image processor 720 estimates the location of the user by using information of an initial pattern image distorted by the target user 730.

Figure 11:
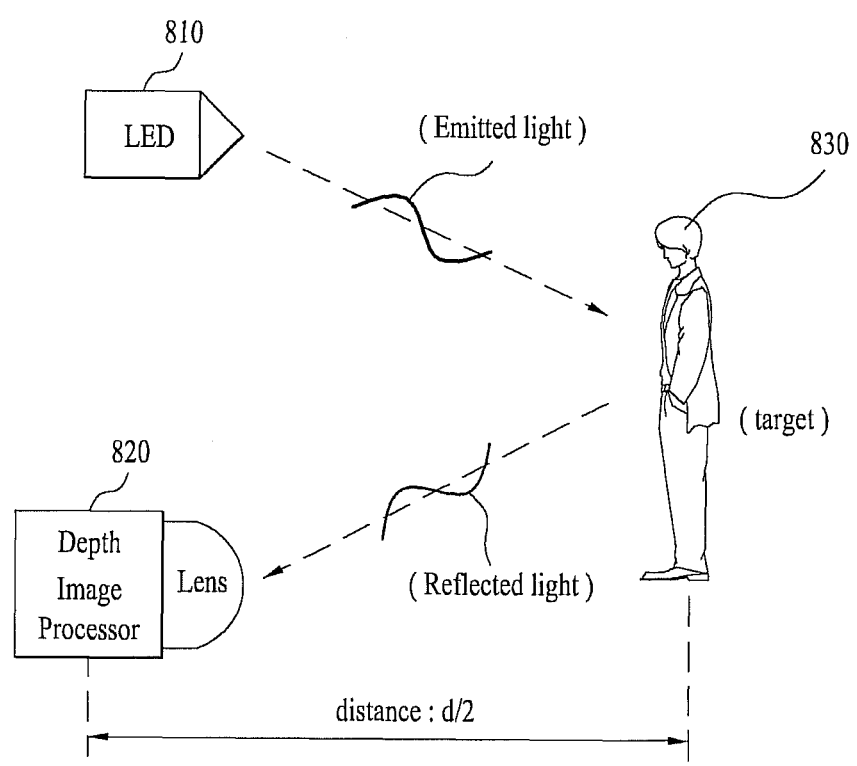
FIG. 11 is a diagram illustrating another example of a first image sensor of a plurality of heterogeneous image sensors according to one embodiment of the present invention.

FIG. 11 is a diagram illustrating another example of a first image sensor of a plurality of heterogeneous image sensors according to one embodiment of the present invention. Hereinafter, the another example of a first image sensor of a plurality of heterogeneous image sensors according to one embodiment of the present invention will be described with reference to FIG. 11. An LED 810 illustrated in FIG. 11 may correspond to the emitter 680 of FIG. 9, and a depth image processor 820 illustrated in FIG. 11 may correspond to the first image sensor 690 of FIG. 9. Accordingly, the description of FIG. 9 and FIG. 11 may complementarily be applied to this embodiment. Also, the camera illustrated in FIG. 11 may be designed in accordance with the aforementioned TOF type.

As illustrated in FIG. 11, the light emitted by the LED 810 is transmitted to a target user 830. The light reflected by the target user 830 is transmitted to the depth image processor 820. The modules illustrated in FIG. 11 calculate the location of the target user 830 by using information on the time difference, unlike FIG. 10. This will be described in more detail with reference to FIG. 12.

Figure 12:
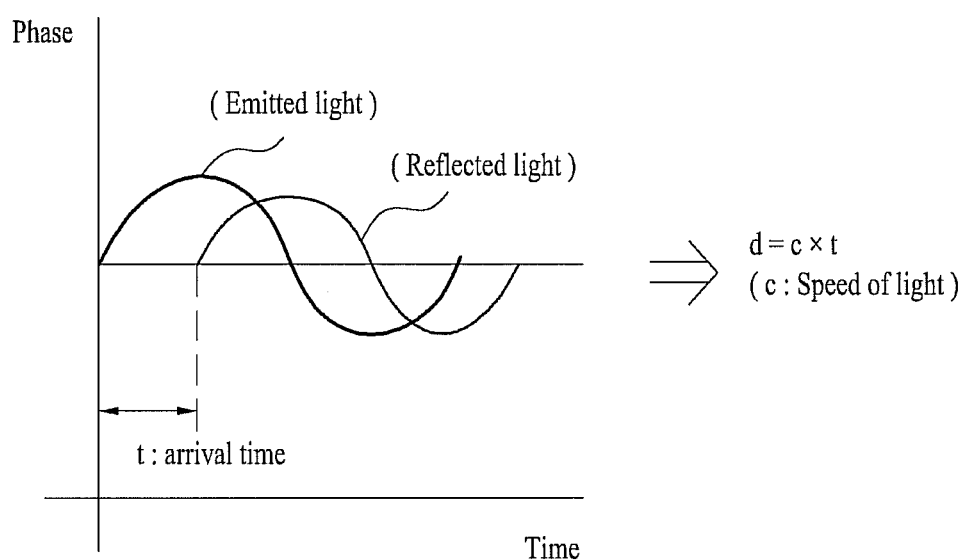
FIG. 12 is a diagram illustrating a method of calculating a distance by using a first image sensor illustrated in FIG. 11.

FIG. 12 is a diagram illustrating a method of calculating a distance by using a first image sensor illustrated in FIG. 11. Hereinafter, the method of calculating a distance by using a first image sensor illustrated in FIG. 11 will be described with reference to FIG. 12.

As illustrated in a left graph of FIG. 12, a value t which is the arrival time can be obtained through the time difference between the emitted light and the reflected light.

Also, as illustrated in an equation at the right side of FIG. 12, the distance between the LED 810 and the target user 830 and the distance between the target user 830 and the depth image processor 820 are calculated by multiplication of the speed of light and the value t. Accordingly, the distance between the LED 810 or the depth image processor 820 and the target user 830 is estimated as 1/d.

Figure 13:
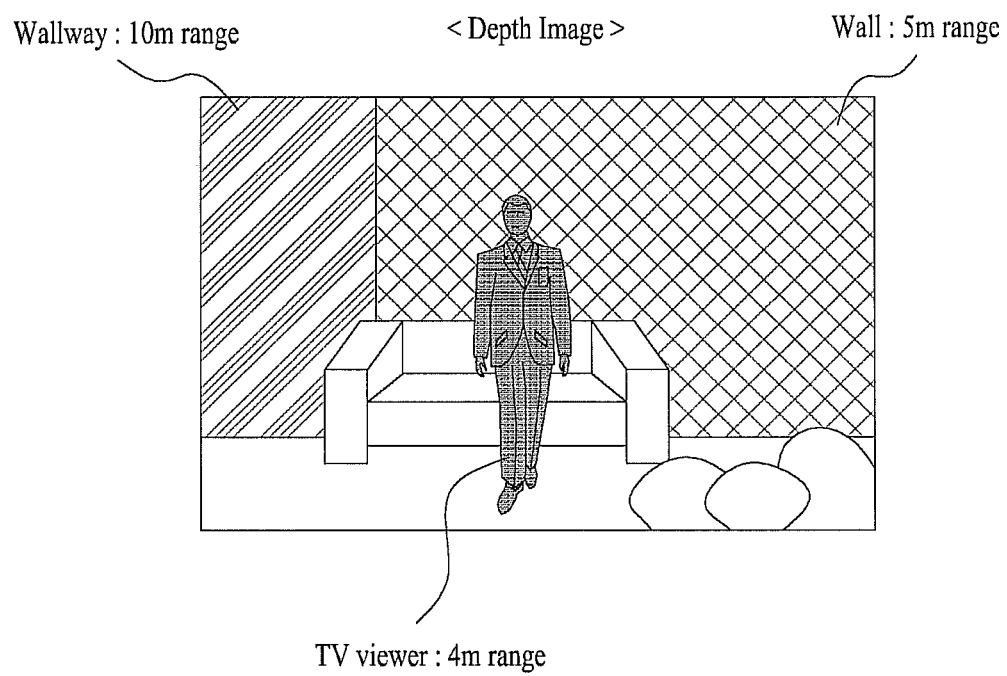
FIG. 13 is a diagram illustrating an image taken by a first image sensor of a plurality of heterogeneous image sensors according to one embodiment of the present invention.

FIG. 13 is a diagram illustrating an image taken by a first image sensor of a plurality of heterogeneous image sensors according to one embodiment of the present invention. Hereinafter, the detailed image taken by a first image sensor of a plurality of heterogeneous image sensors according to one embodiment of the present invention will be described with reference to FIG. 13.

As illustrated in FIG. 13, color information such as RGB is not expressed from the image taken by the first image sensor. However, the image taken by the first image sensor is advantageous in that a rough location of an individual object can be identified quickly through differential contrast depending on the distance.

For example, as illustrated in FIG. 13, the farthest hall way is expressed by the darkest contrast, and it is noted that the hall way is away at the distance of 10 m range from the first image sensor. Moreover, a wall located at an intermediate distance level is expressed by contrast of a middle tone, and it is noted that the wall is away at the distance of 5 m range from the first image sensor. A TV viewer located at the relatively closest distance is expressed by contrast of the brightest tone, and it is noted that the TV viewer is away at the distance of 4 m range from the first image sensor.

Figure 14:
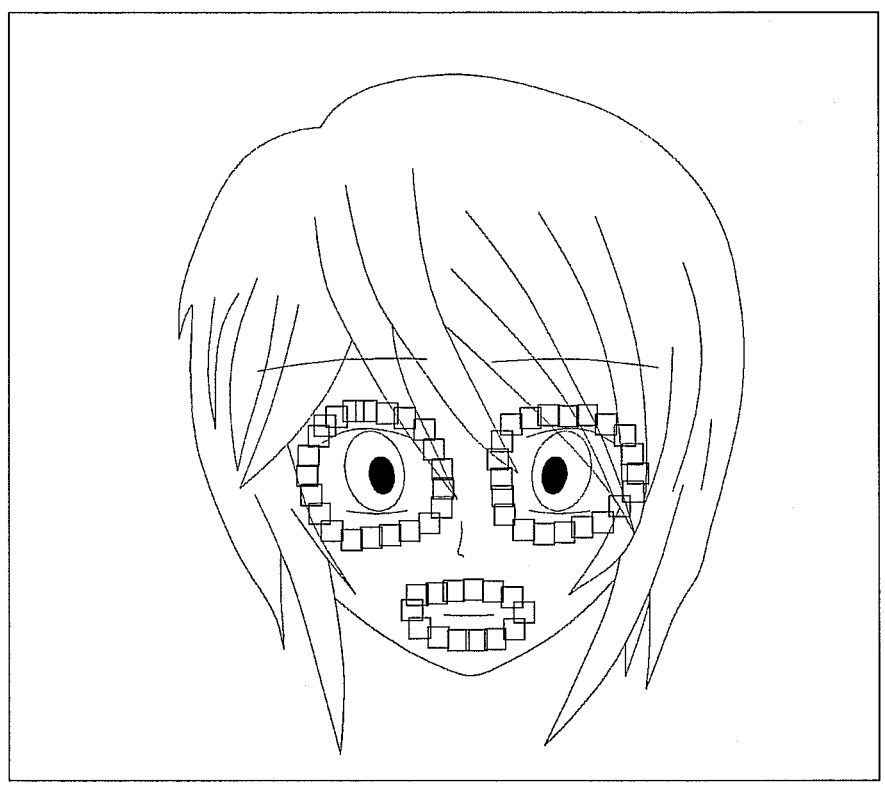
FIG. 14 is a diagram illustrating an image taken by a second image sensor of a plurality of heterogeneous image sensors according to one embodiment of the present invention.

FIG. 14 is a diagram illustrating an image taken by a second image sensor of a plurality of heterogeneous image sensors according to one embodiment of the present invention. Hereinafter, the detailed image taken by a second image sensor of a plurality of heterogeneous image sensors according to one embodiment of the present invention will be described with reference to FIG. 14.

Unlike the first image sensor, since the second image sensor uses bright RGB colors, it is advantageous in that main elements of a face of a user can be identified easily. In particular, as illustrated in FIG. 14, the second image sensor is designed in such a manner that data in the periphery of eyes, nose, and mouse used to identify a person are processed to be used as feature information for face recognition. Although eyes, nose, and mouse are illustrated in FIG. 14, other elements of the face, such as ears, forehead, hair color, wrinkle, skin color, face shape, and face size, may be used.

Figure 15:
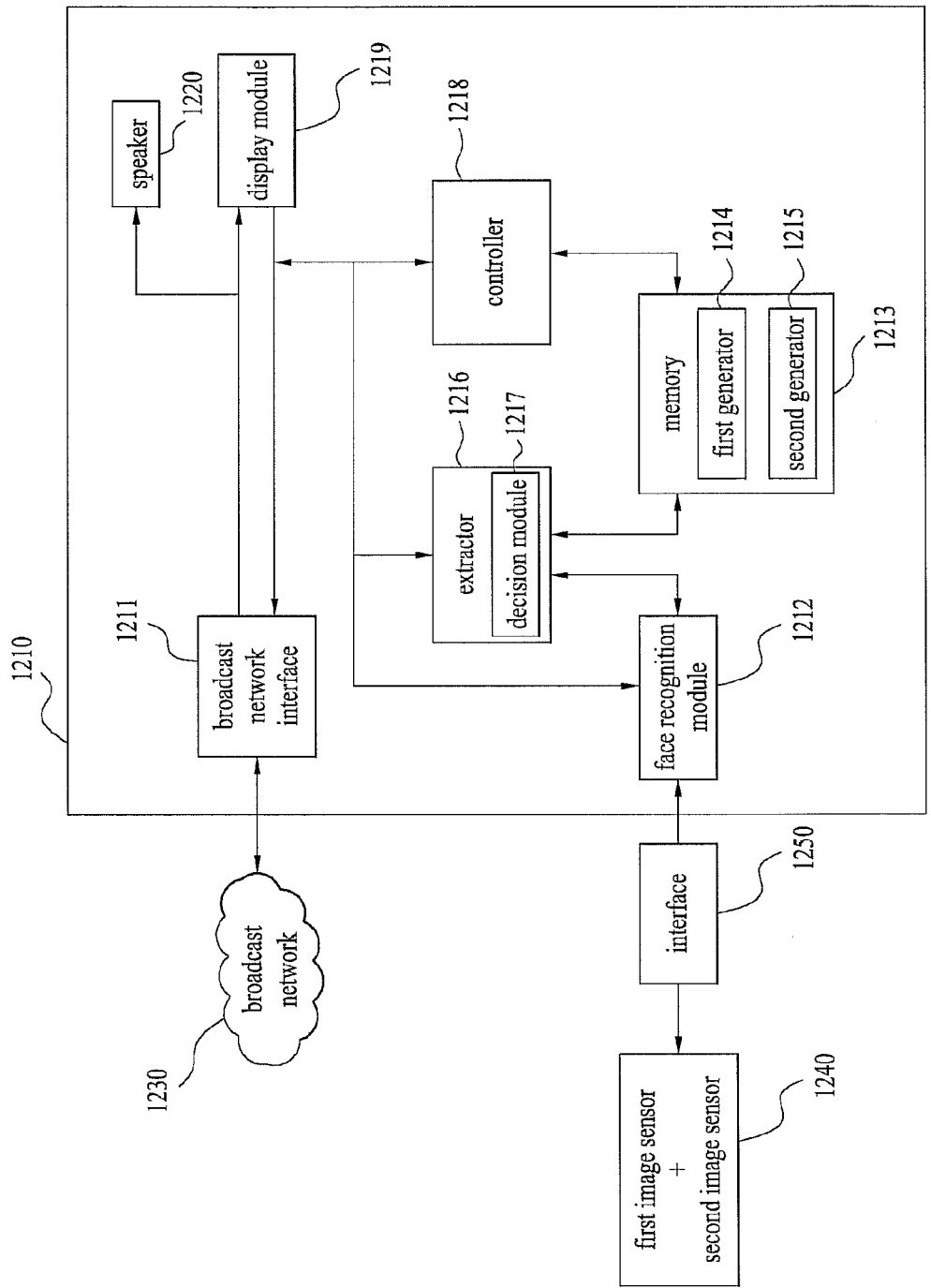
FIG. 15 is a diagram illustrating a detailed block of a multimedia device for providing a preference channel per user/family by using a plurality of heterogeneous image sensors in accordance with one embodiment of the present invention.
Figure 16:
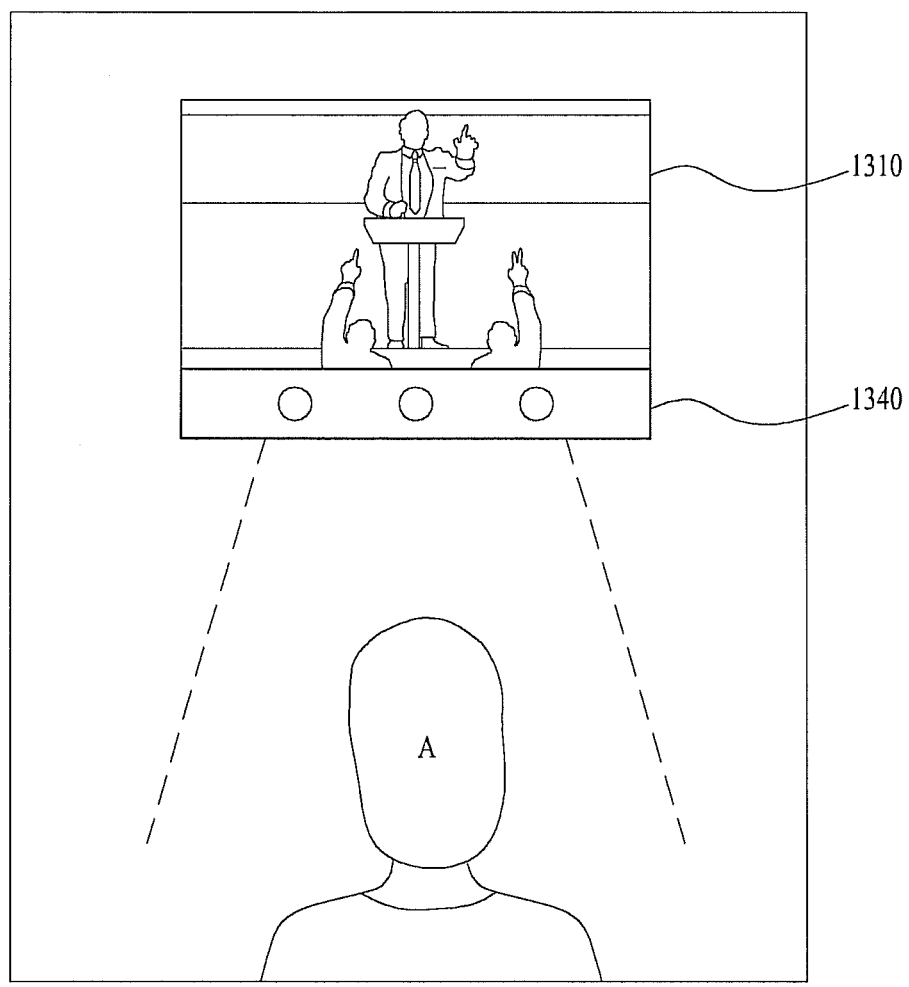
FIG. 16 is a diagram illustrating a first example of a scene where a multimedia device for providing a preference channel per user/family by using a plurality of heterogeneous image sensors automatically selects the preference channel in accordance with one embodiment of the present invention.
Figure 18:
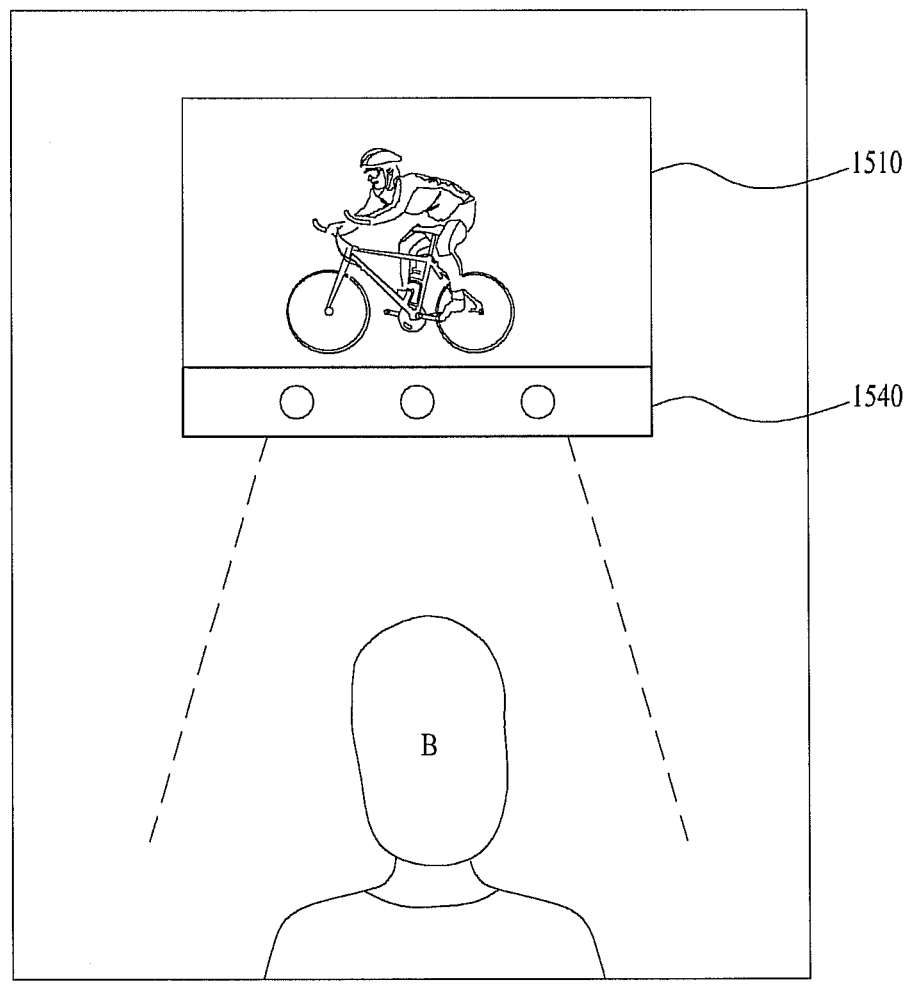
FIG. 18 is a diagram illustrating a second example of a scene where a multimedia device for providing a preference channel per user/family by using a plurality of heterogeneous image sensors automatically selects the preference channel in accordance with one embodiment of the present invention.
Figure 20:
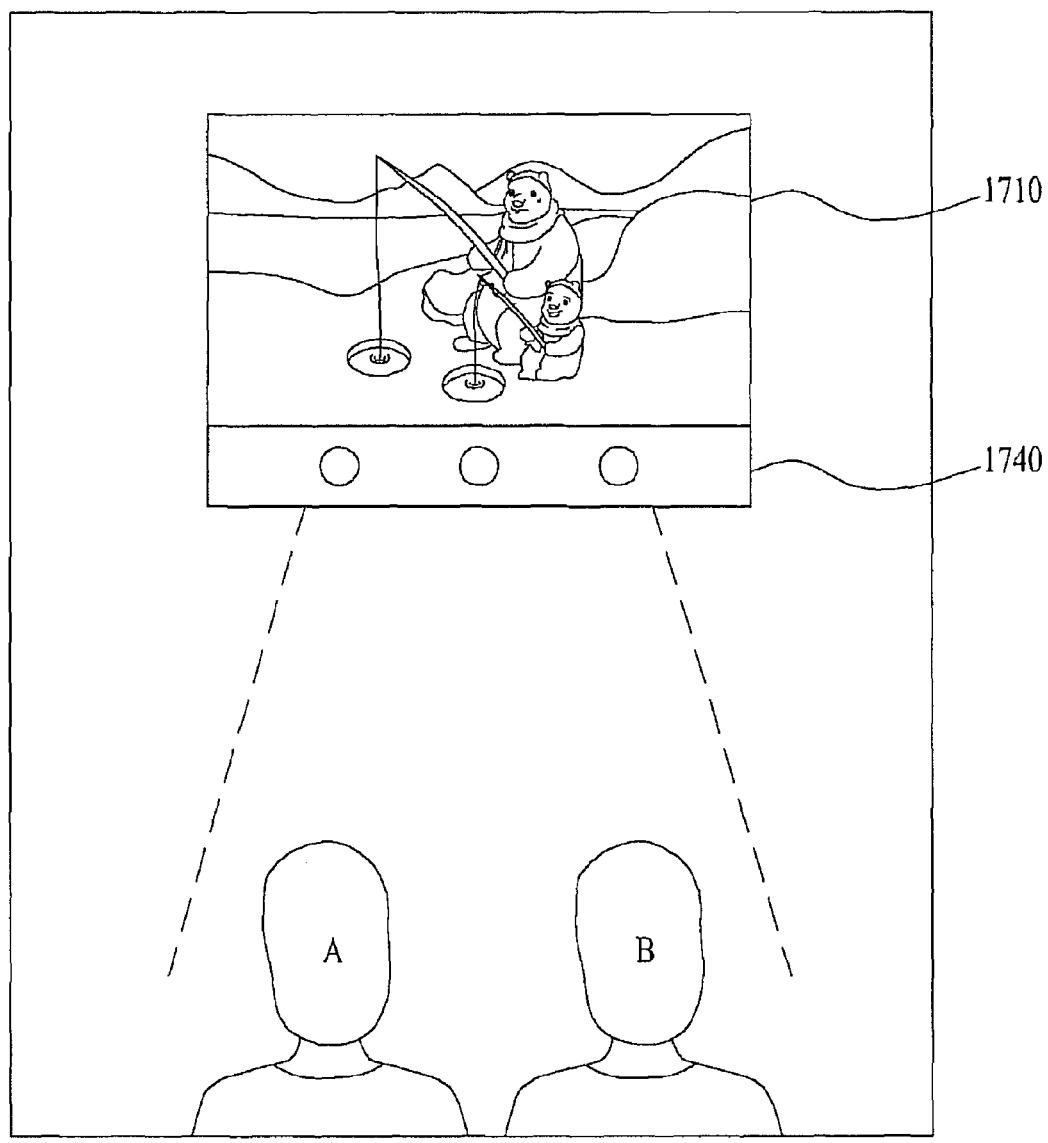
FIG. 20 is a diagram illustrating a third example of a scene where a multimedia device for providing a preference channel per user/family by using a plurality of heterogeneous image sensors automatically selects the preference channel in accordance with one embodiment of the present invention.
Figure 22:
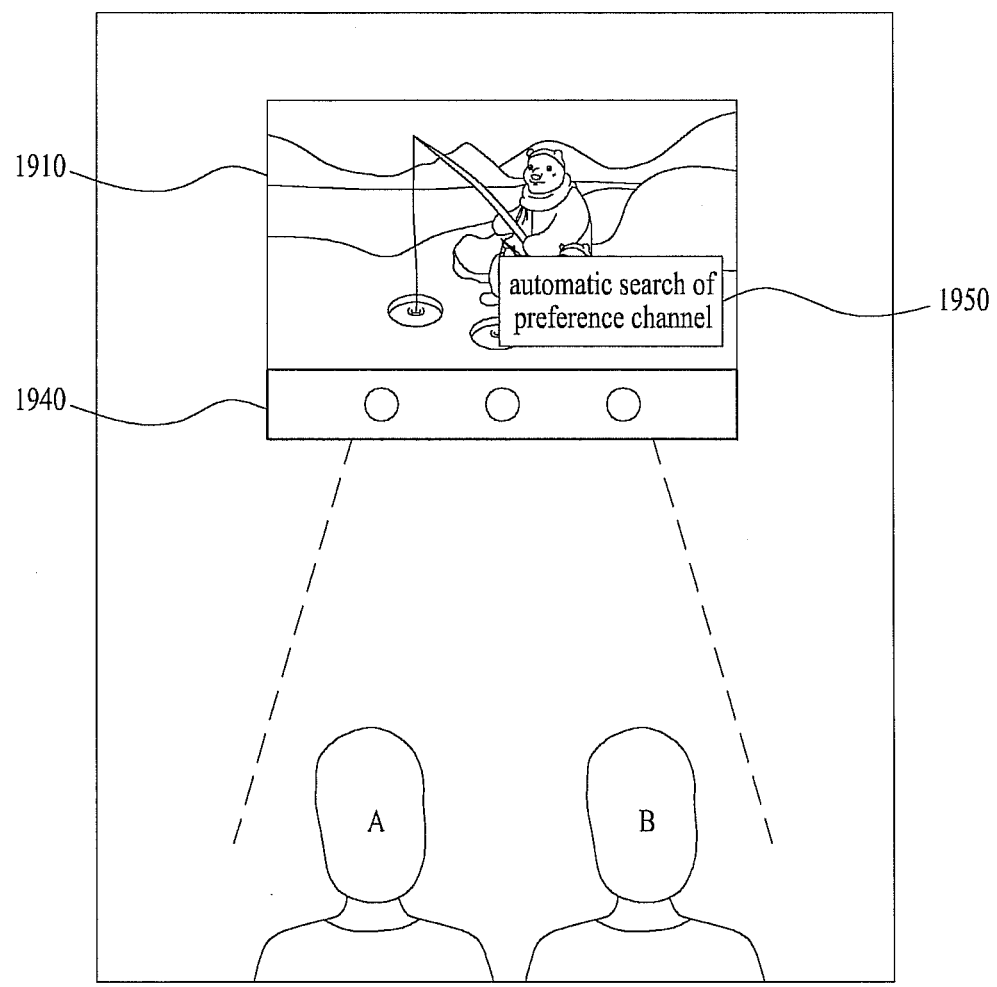
FIG. 22 to FIG. 24 are diagrams illustrating a first example of automatic switching process of a multimedia device for providing a preference channel per user/family by using a plurality of heterogeneous image sensors to the preference channel in accordance with one embodiment of the present invention.
Figure 23:
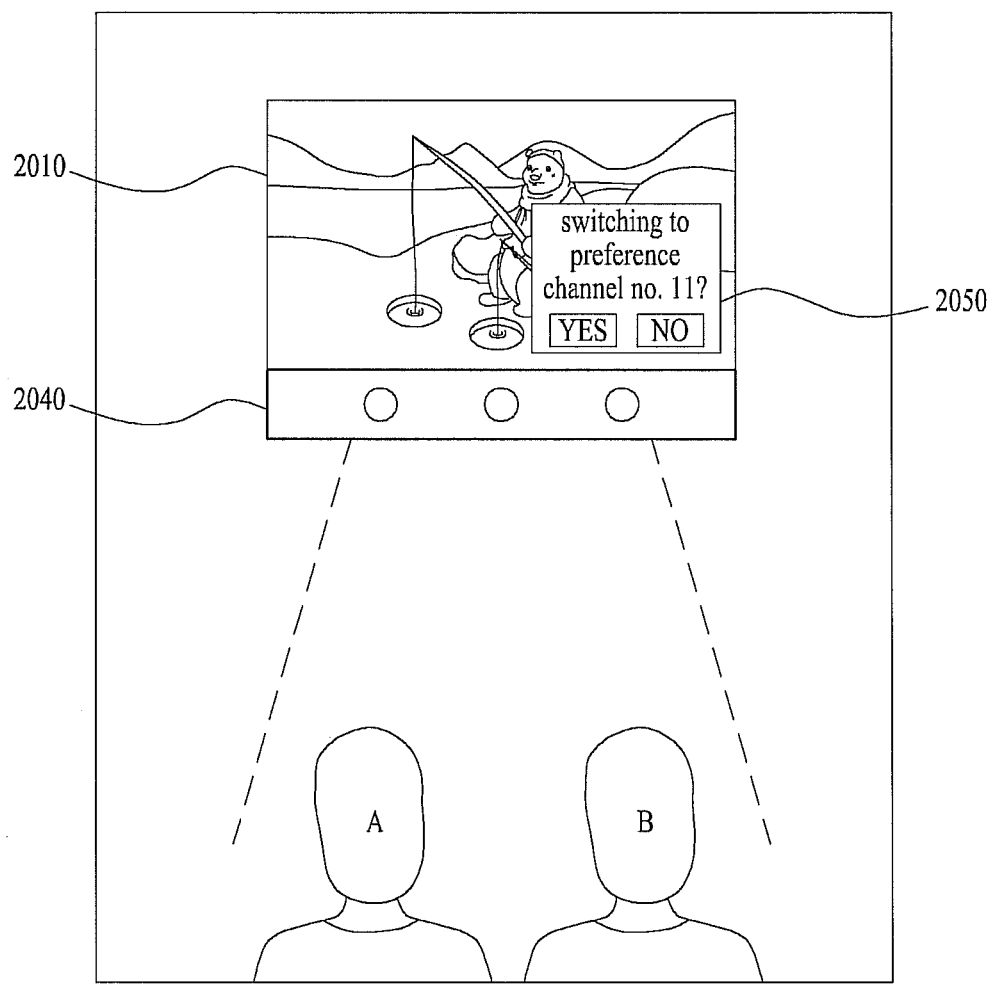
Figure 24:
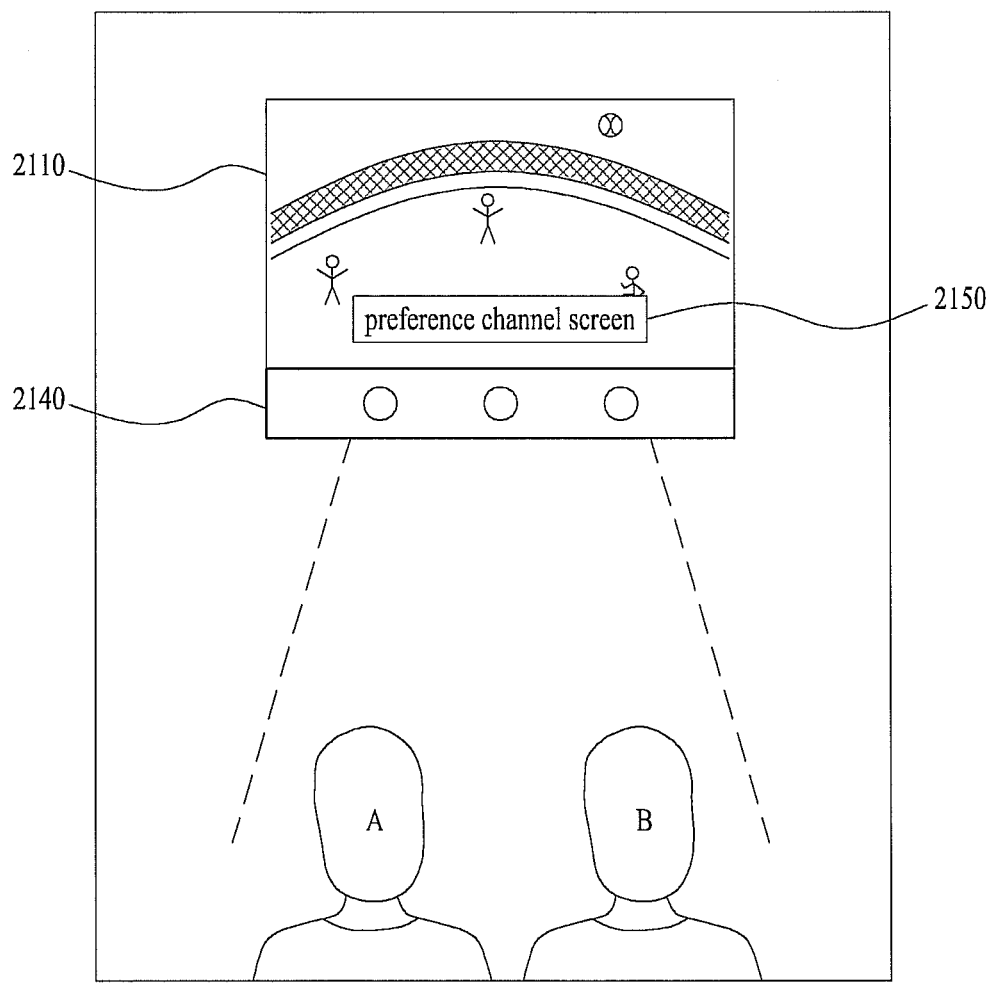
Figure 25:
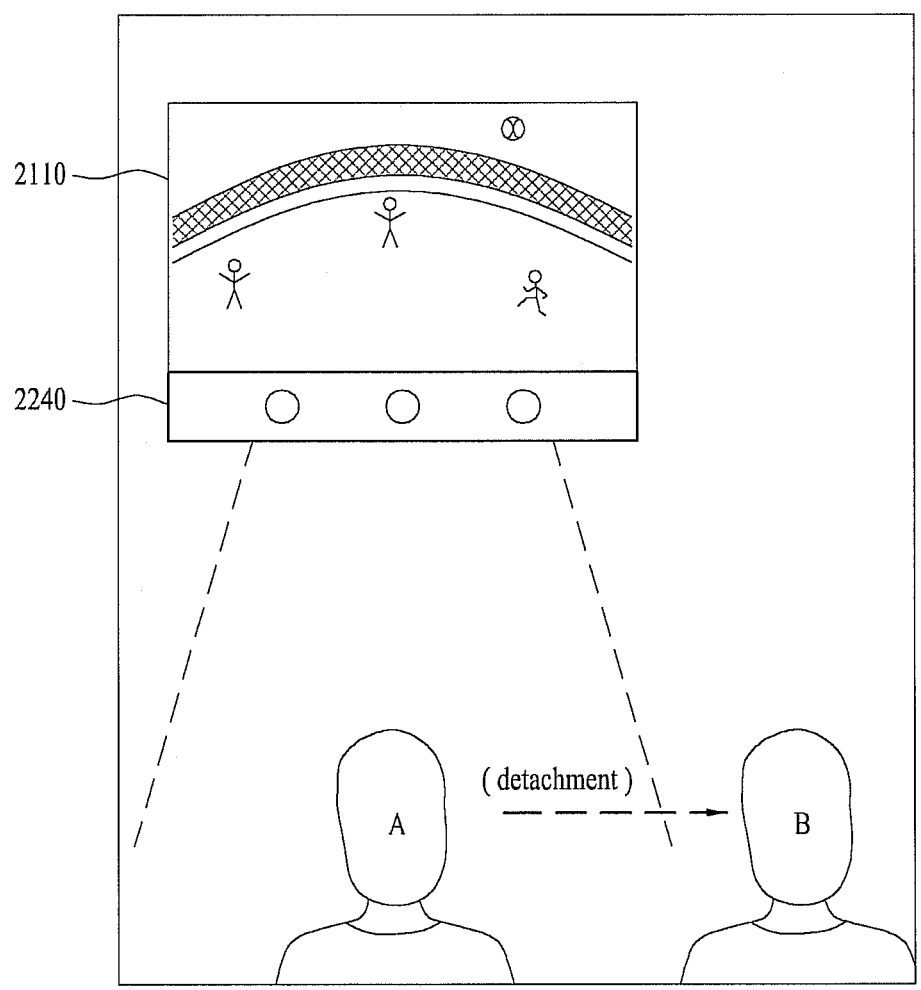
FIG. 25 to FIG. 27 are diagrams illustrating a second example of automatic switching process of a multimedia device for providing a preference channel per user/family by using a plurality of heterogeneous image sensors to the preference channel in accordance with one embodiment of the present invention.
Figure 26:
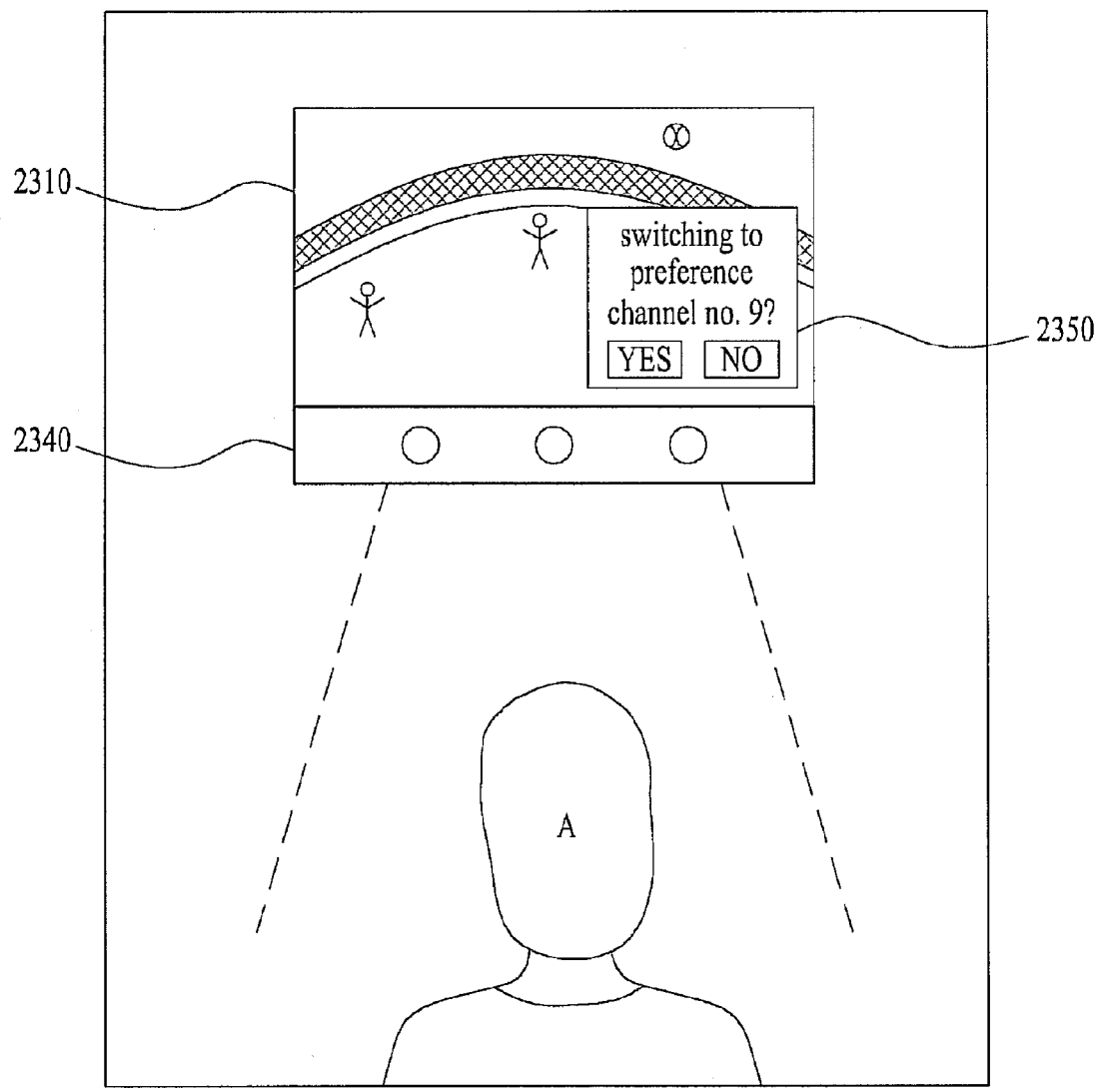
Figure 27:
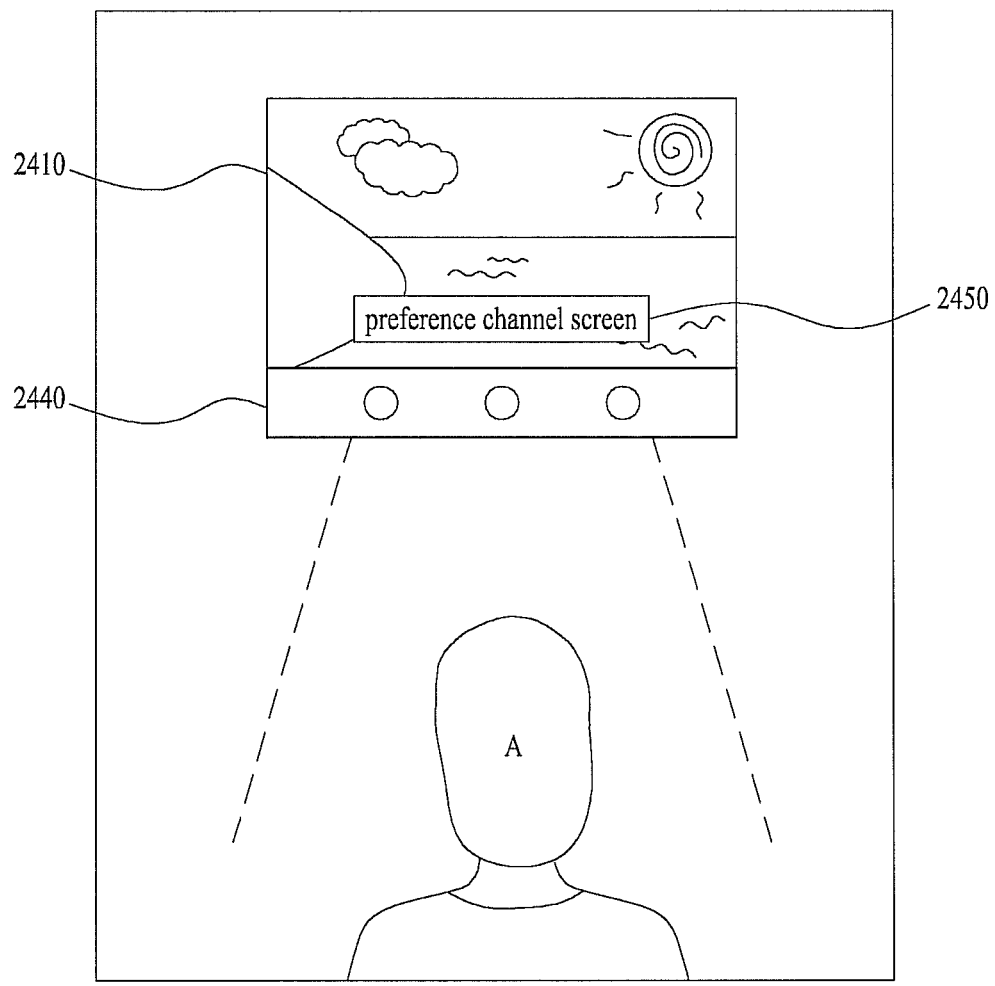
Figure 28:
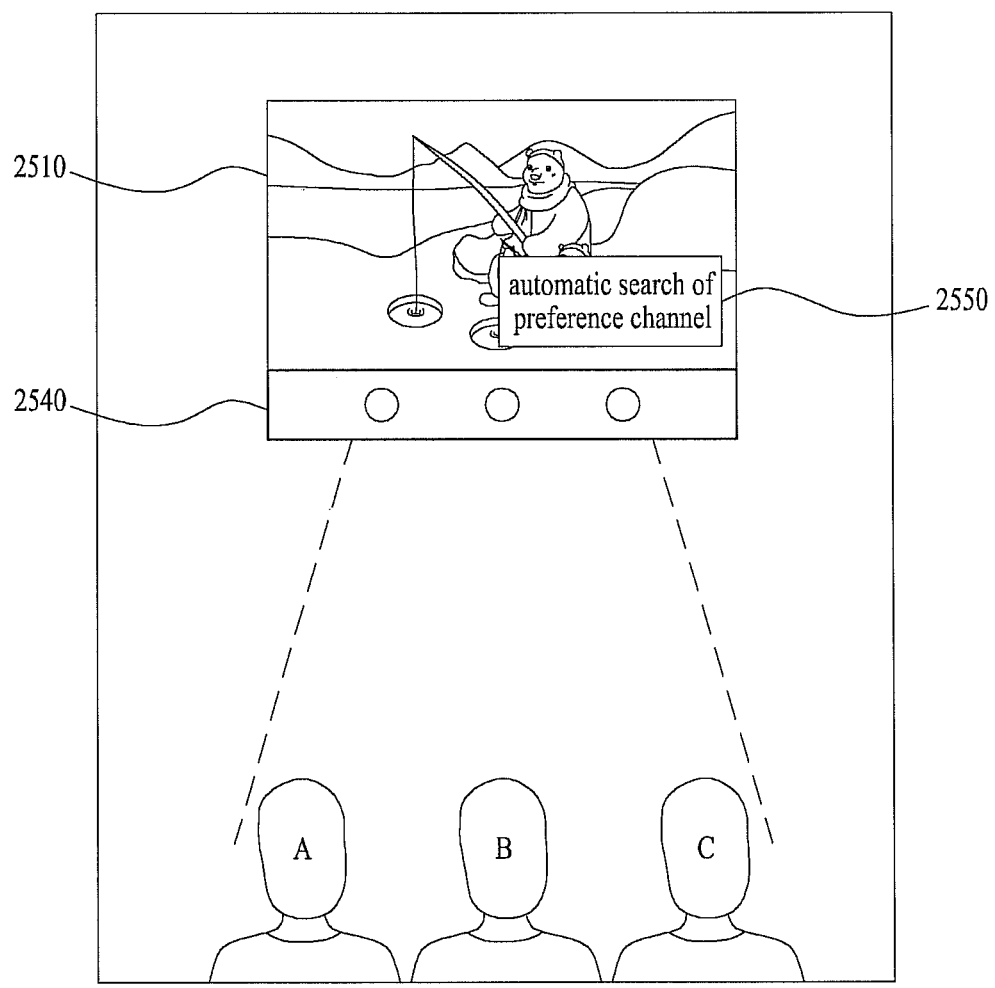
FIG. 28 to FIG. 30 are diagrams illustrating a third example of automatic switching process of a multimedia device for providing a preference channel per user/family by using a plurality of heterogeneous image sensors to the preference channel in accordance with one embodiment of the present invention.
Figure 29:
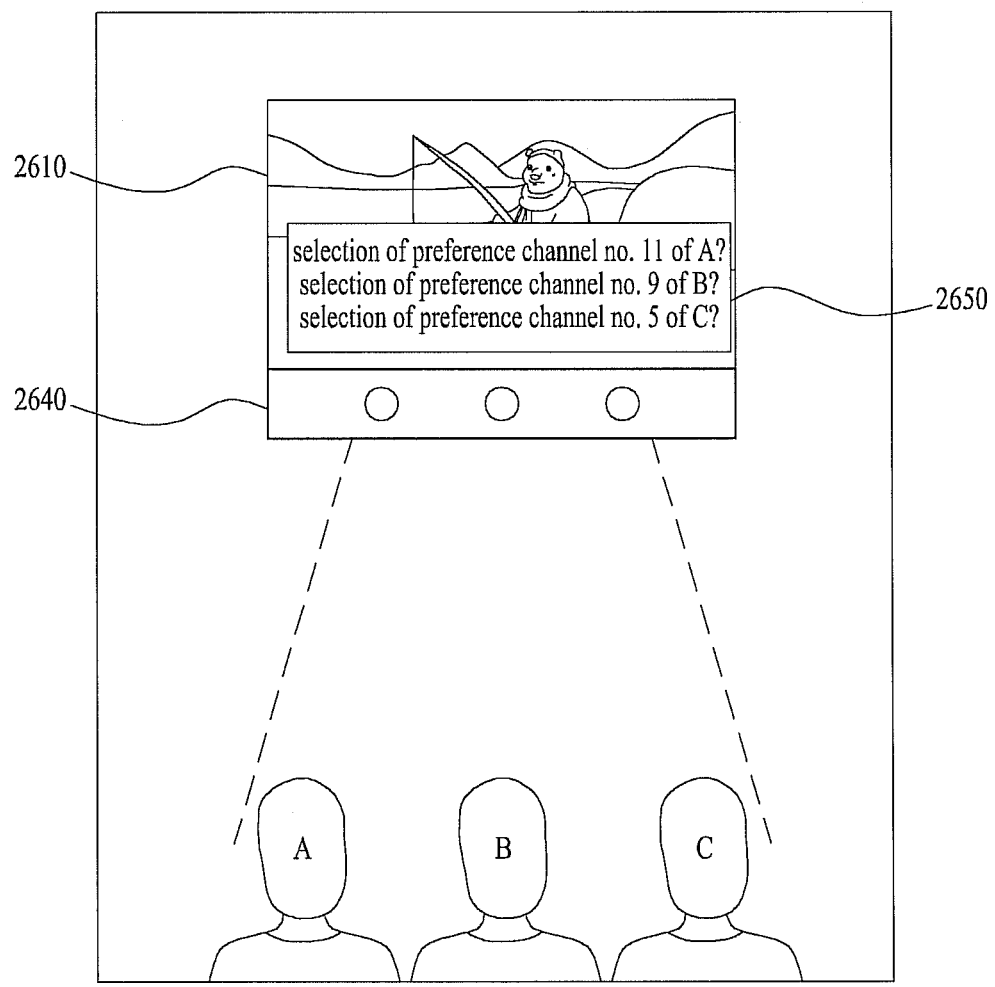
Figure 30:
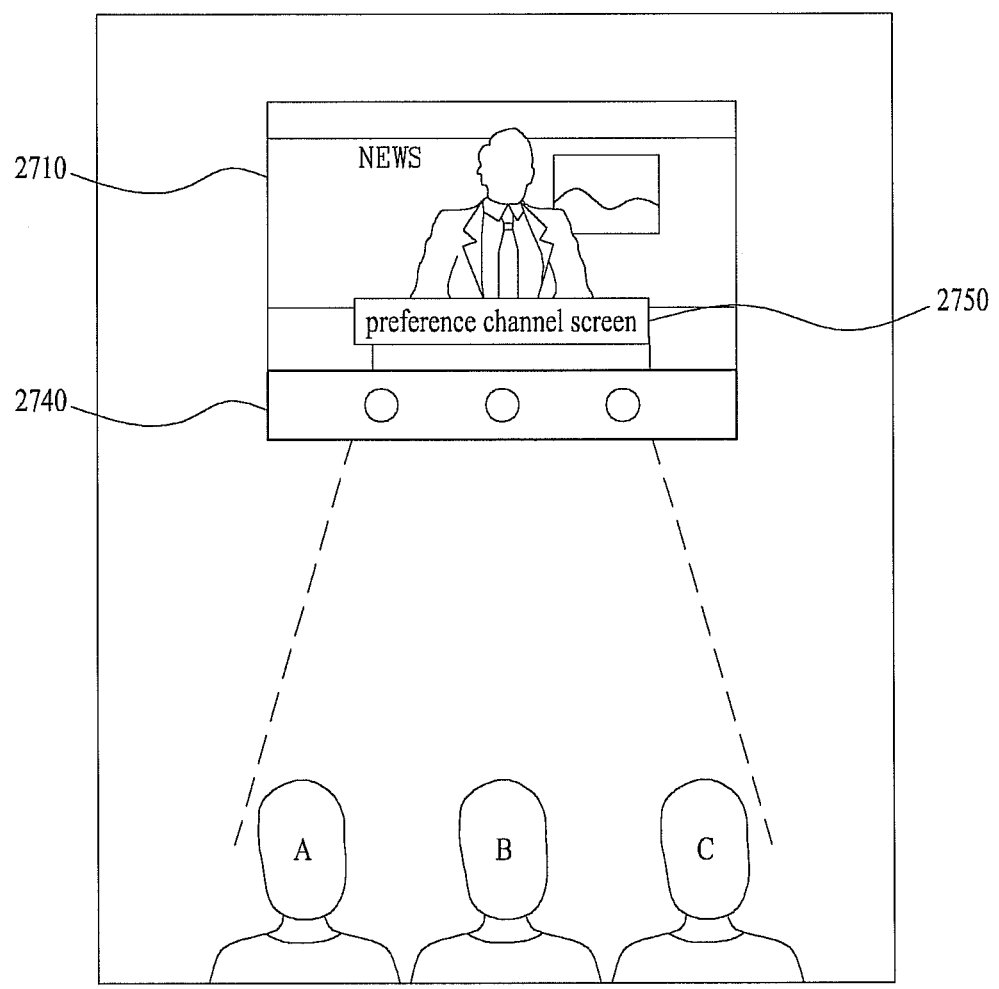
Figure 31:
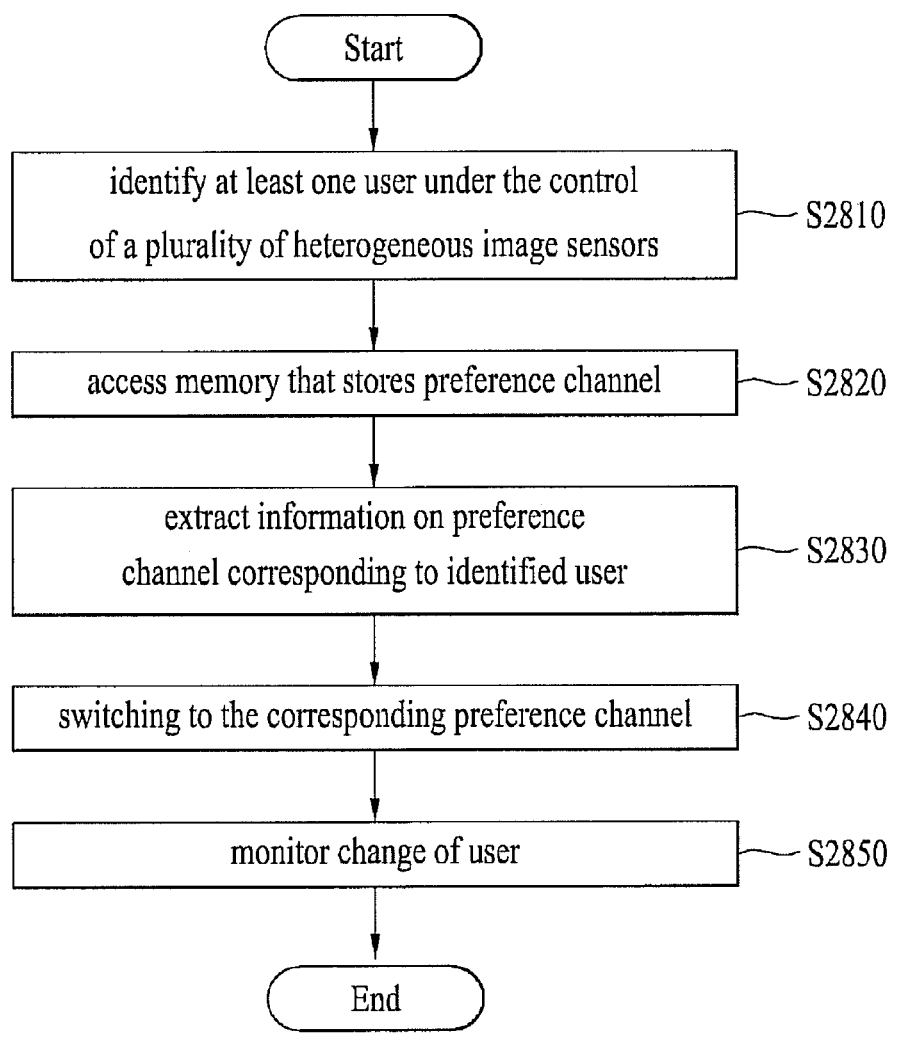
FIG. 31 is a flow chart illustrating a method for providing a preference channel per user/family by using a plurality of heterogeneous image sensors in accordance with one embodiment of the present invention.
Figure 32:
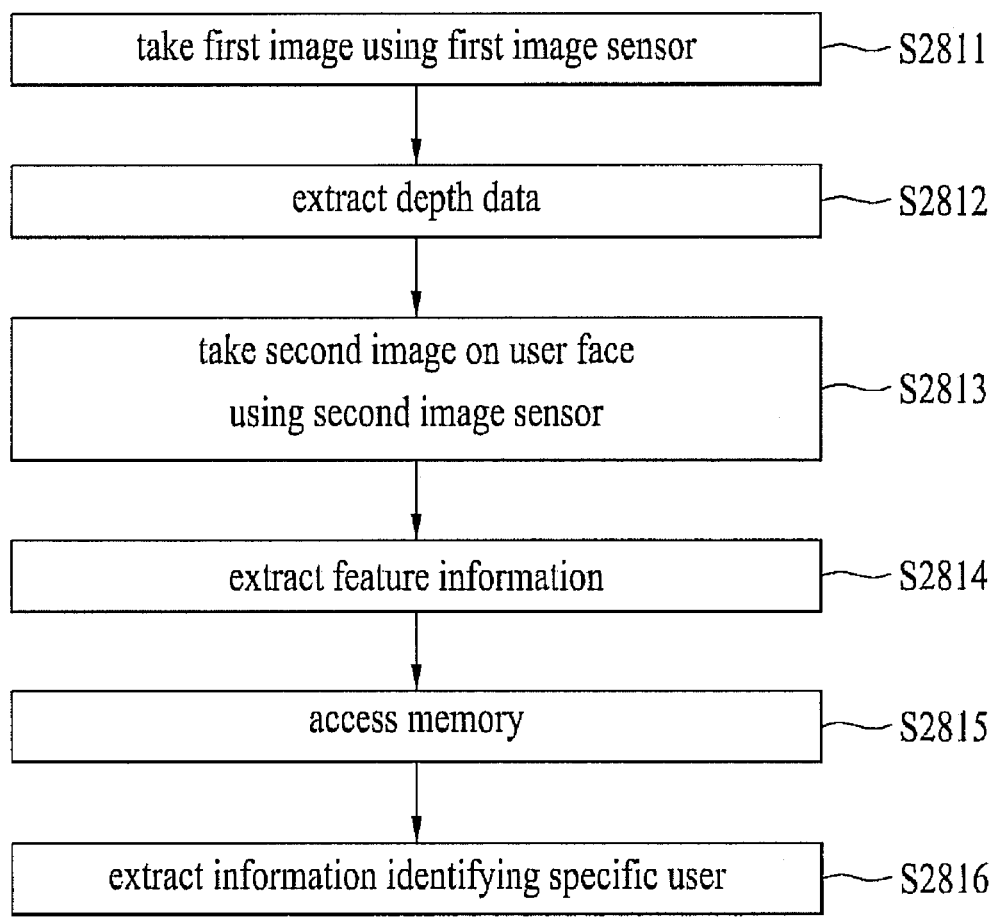
FIG. 32 is a flow chart illustrating a step S2810 illustrated in FIG. 31 in more detail in accordance with one embodiment of the present invention.
Figure 33:
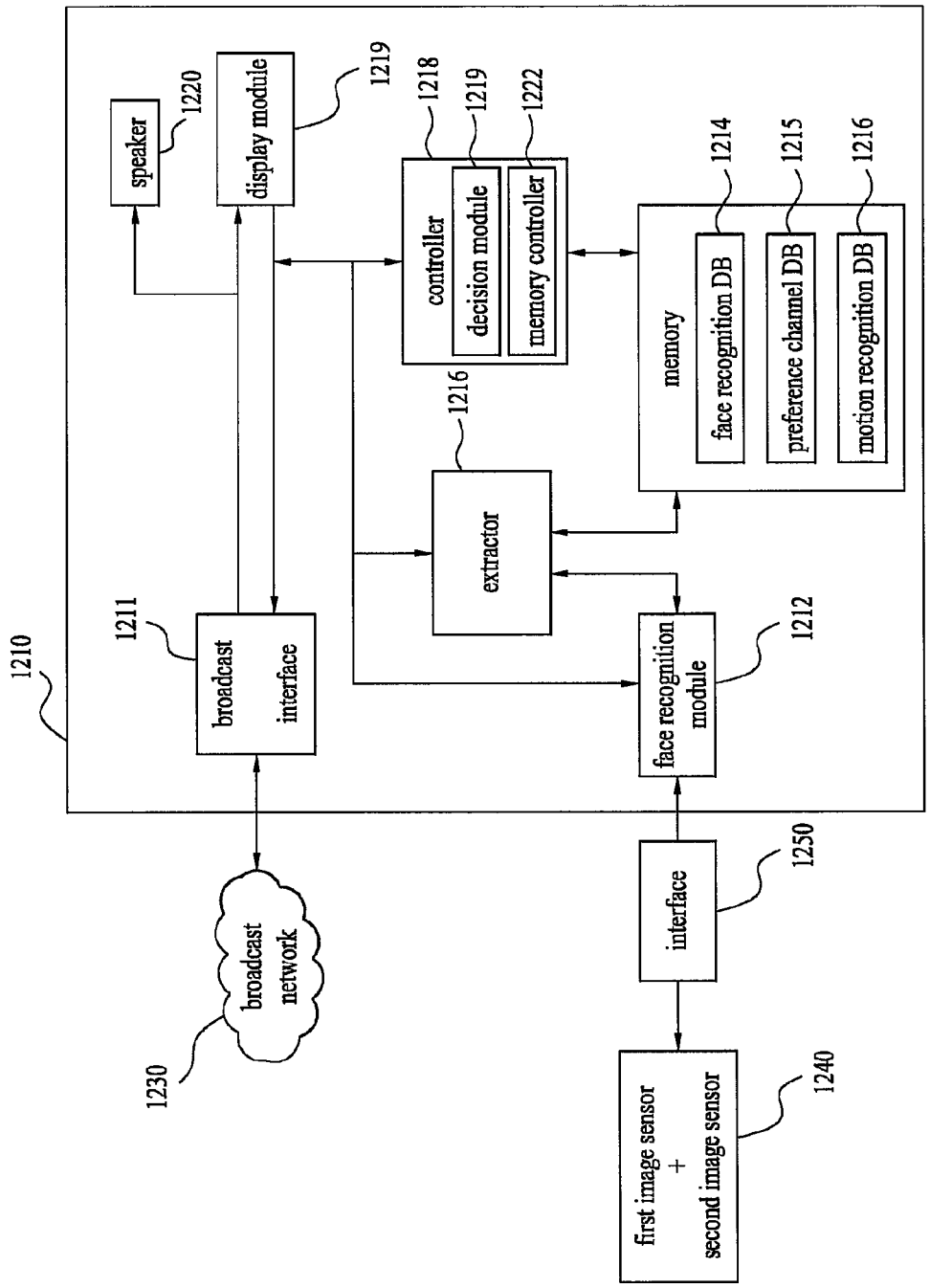
FIG. 33 is a diagram illustrating a detailed block of a multimedia device for automatically storing a preference broadcast program per user by using a plurality of heterogeneous image sensors in accordance with another embodiment of the present invention.
Figure 34:
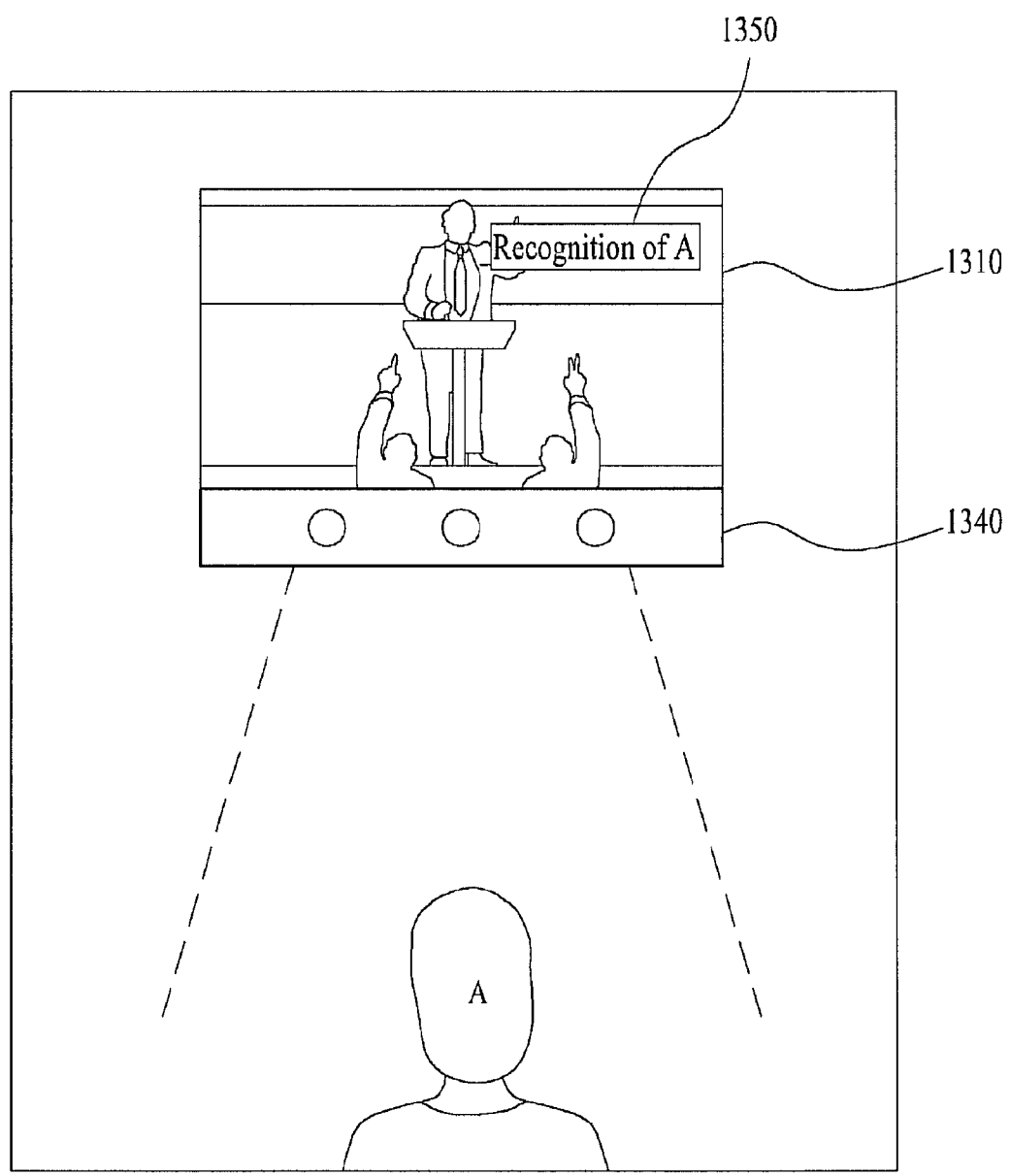
Figure 35:
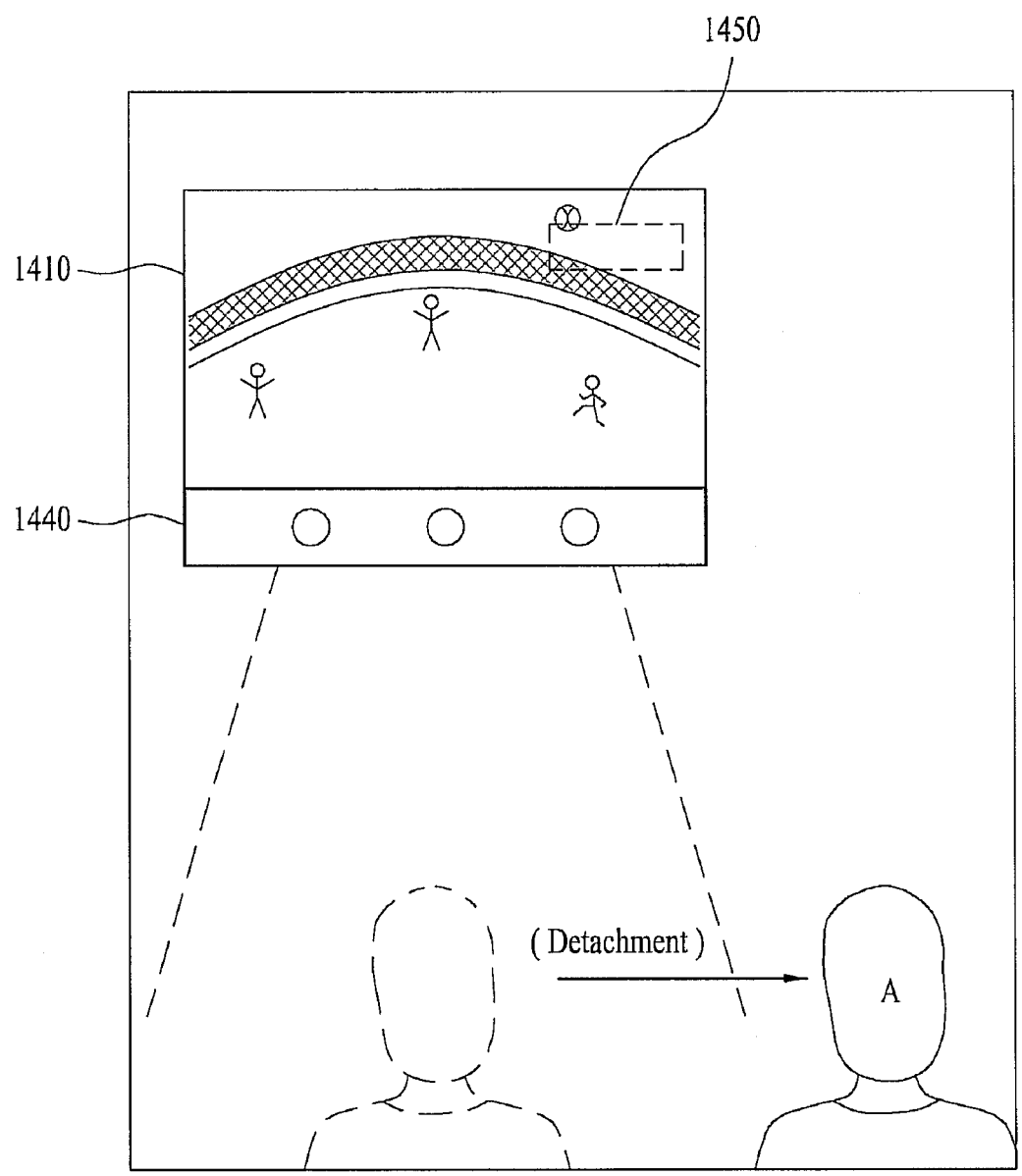
Figure 36:
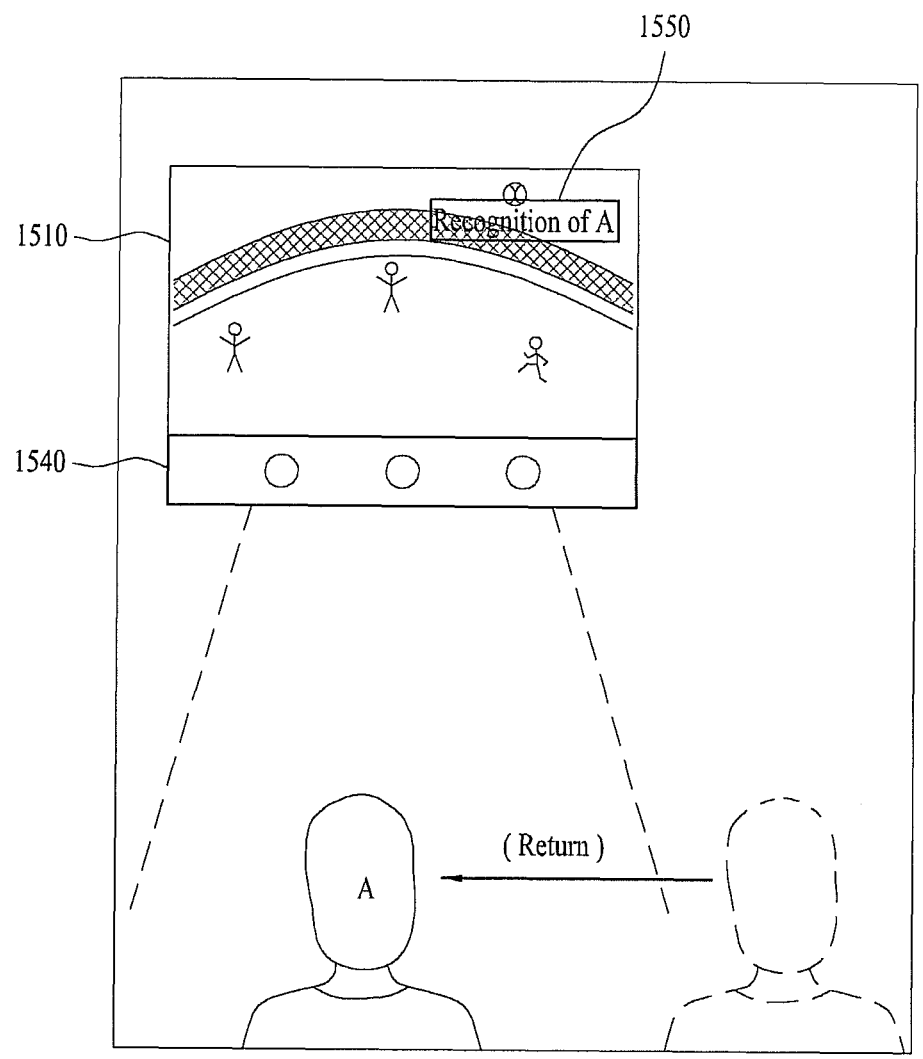
Figure 41:
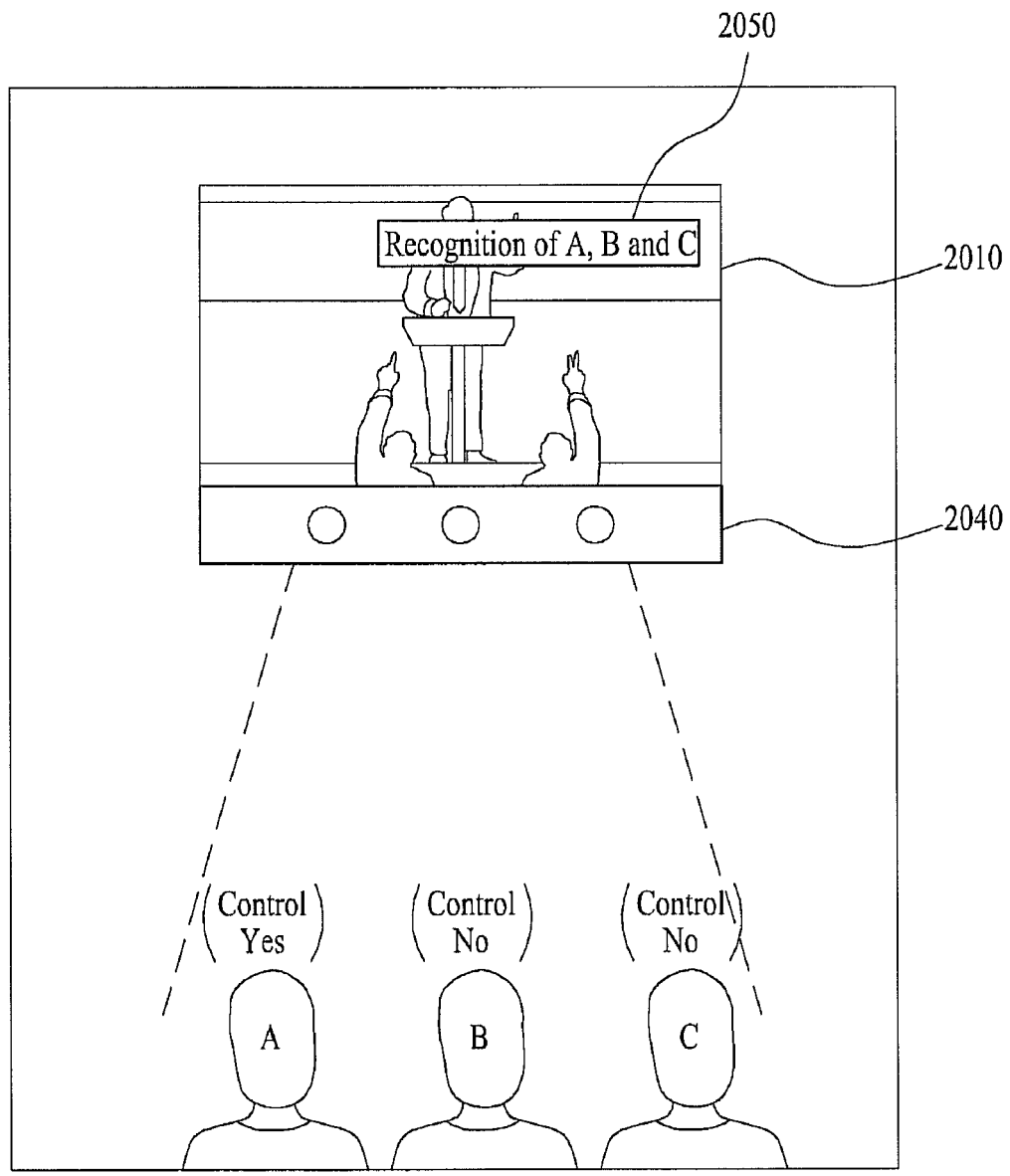
FIG. 41 and FIG. 42 are diagrams illustrating a process of automatically storing and processing a preference channel broadcast program in a multimedia device according to another embodiment of the present invention when a plurality of viewers are watching the broadcast program.
Figure 42:
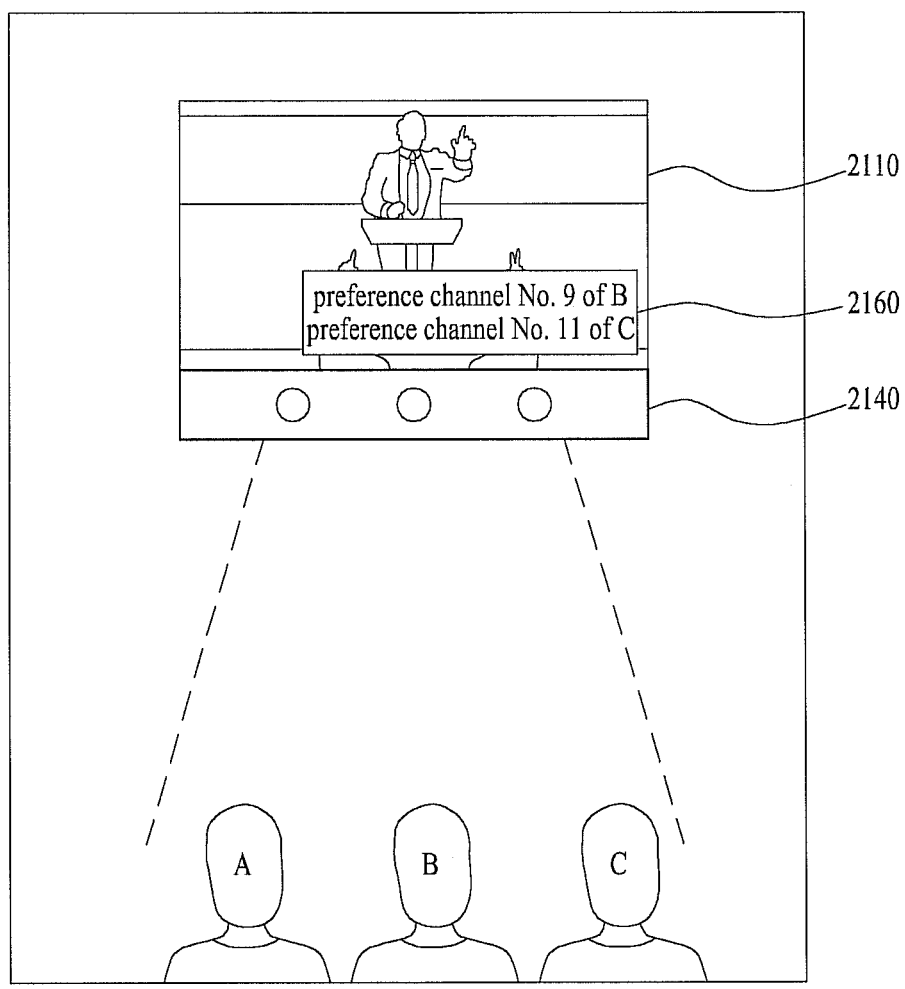
Figure 43:
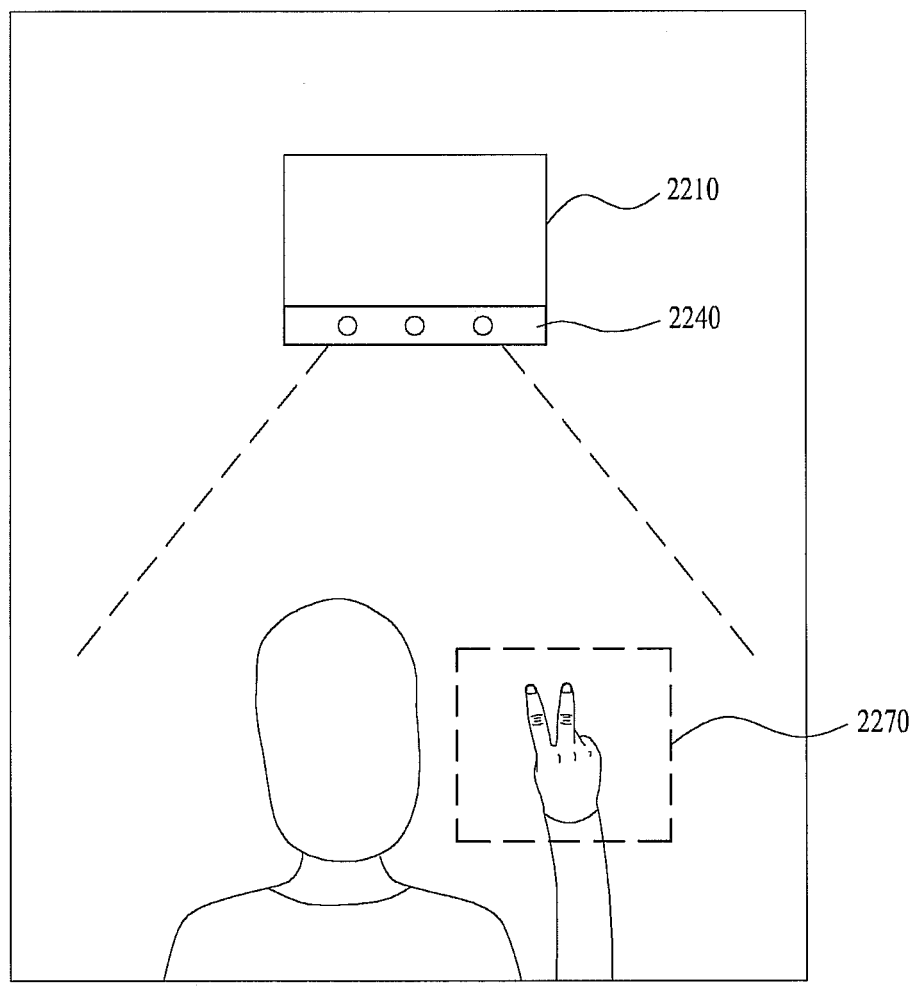
FIG. 43 to FIG. 45 are diagrams illustrating a method for automatically selecting a preference channel in accordance with another embodiment of the present invention.
Figure 44:
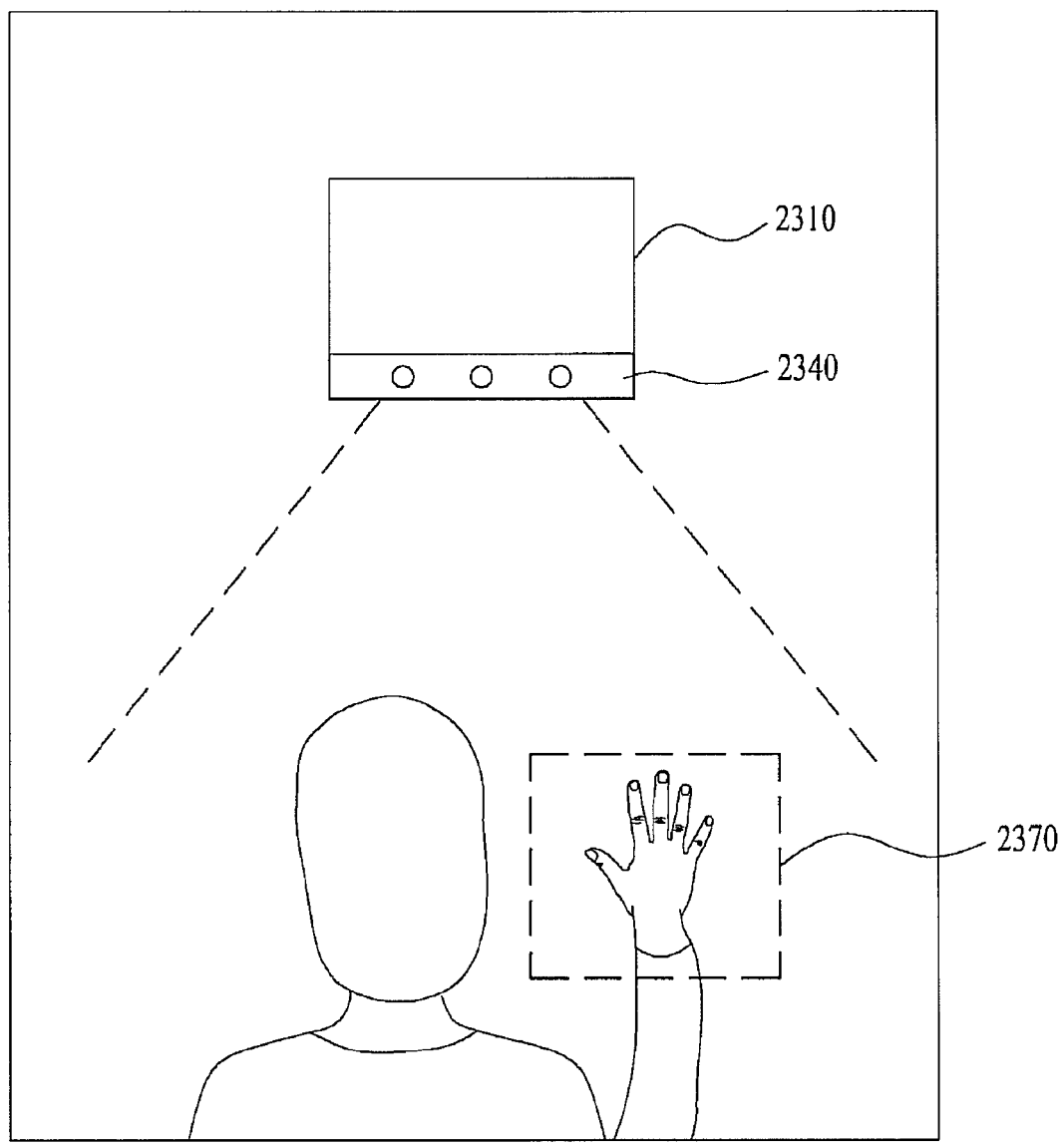
Figure 45:
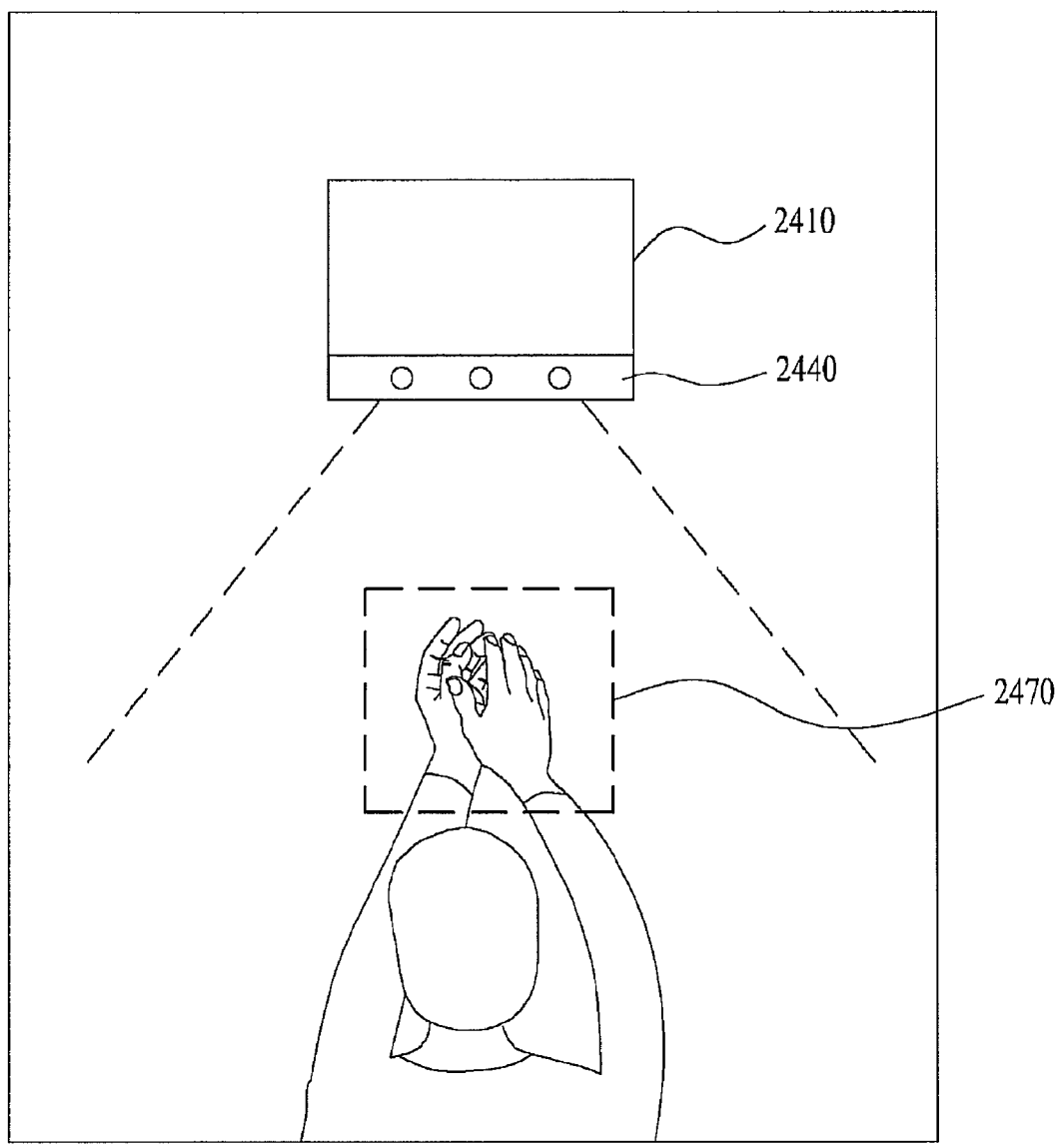
Figure 46:
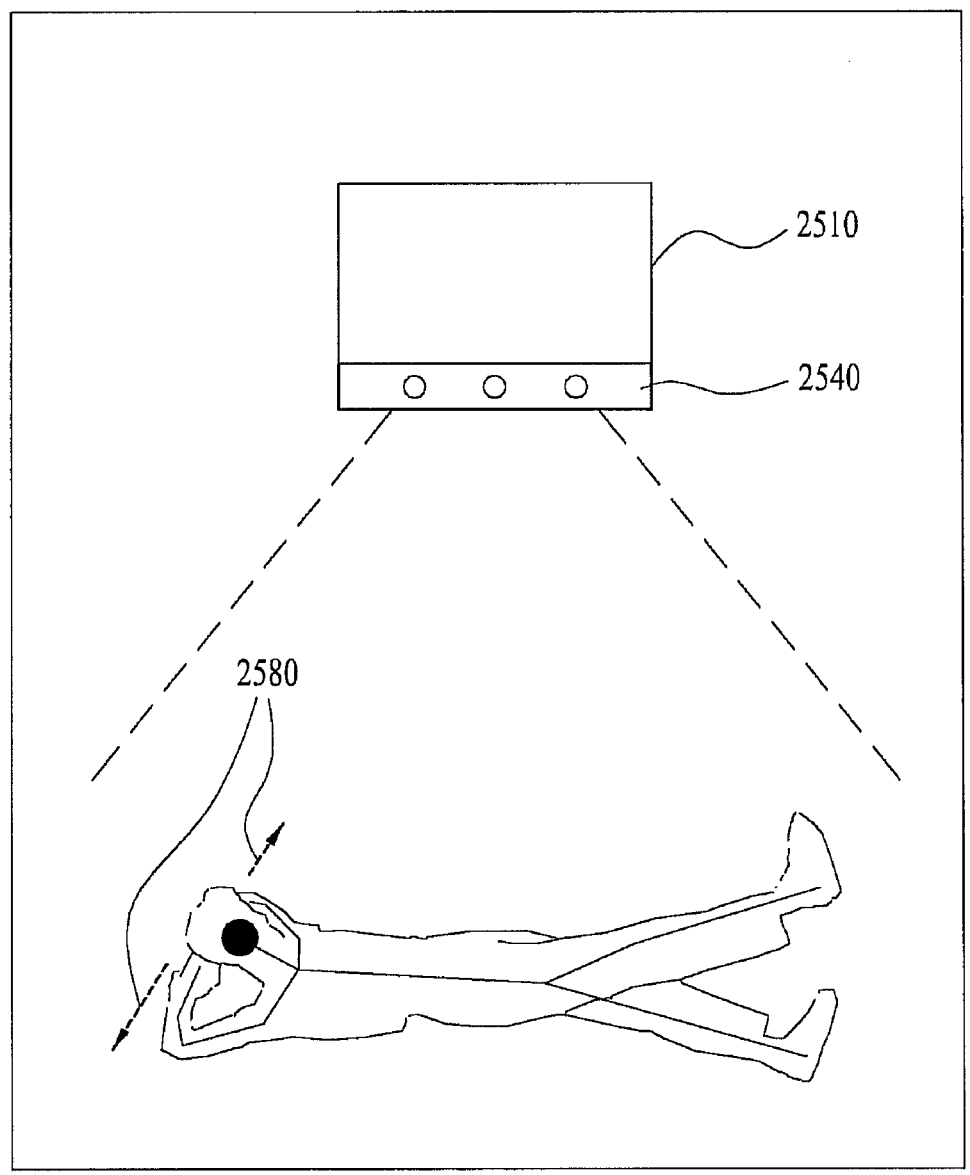
FIG. 46 to FIG. 48 are diagrams illustrating a method for automatically selecting a preference channel in accordance with still another embodiment of the present invention.
Figure 47:
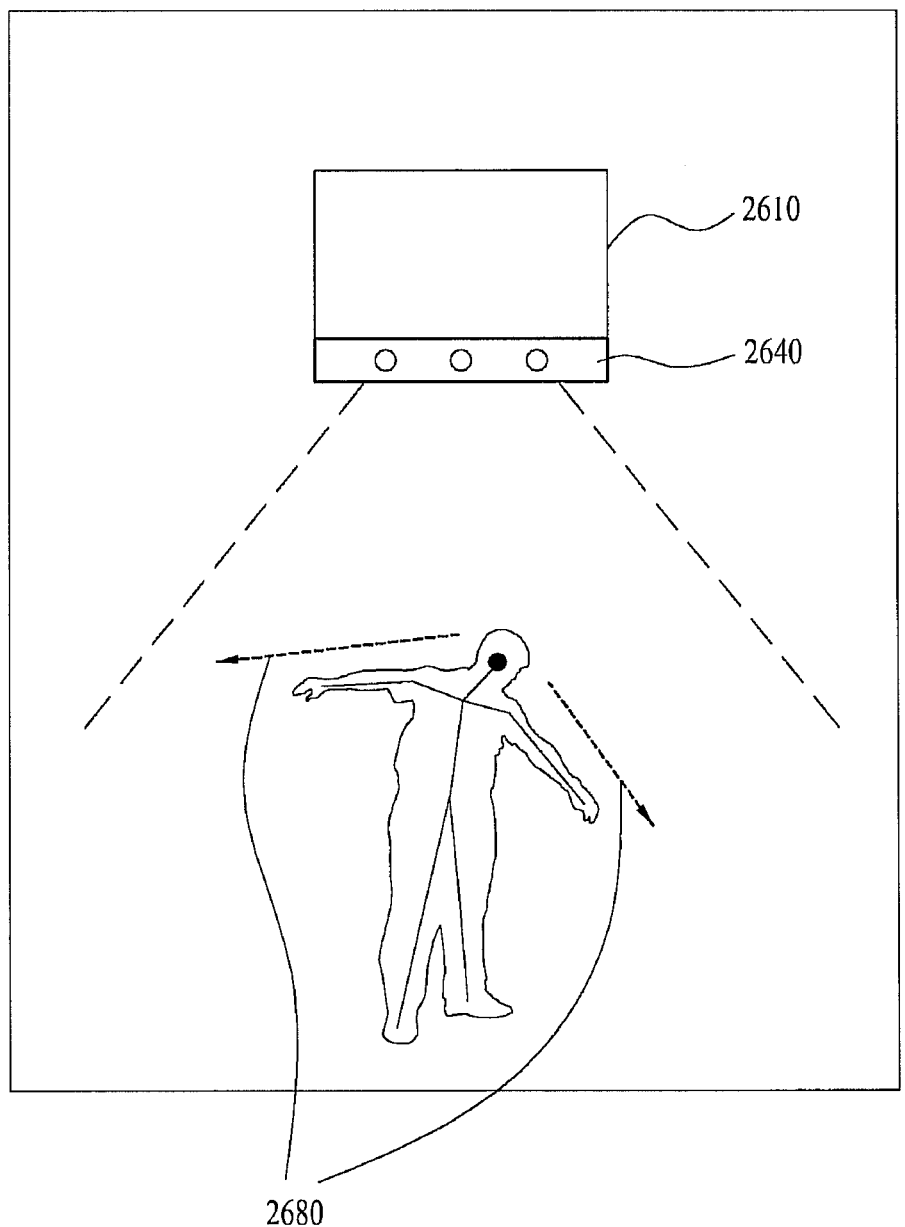
Figure 48:
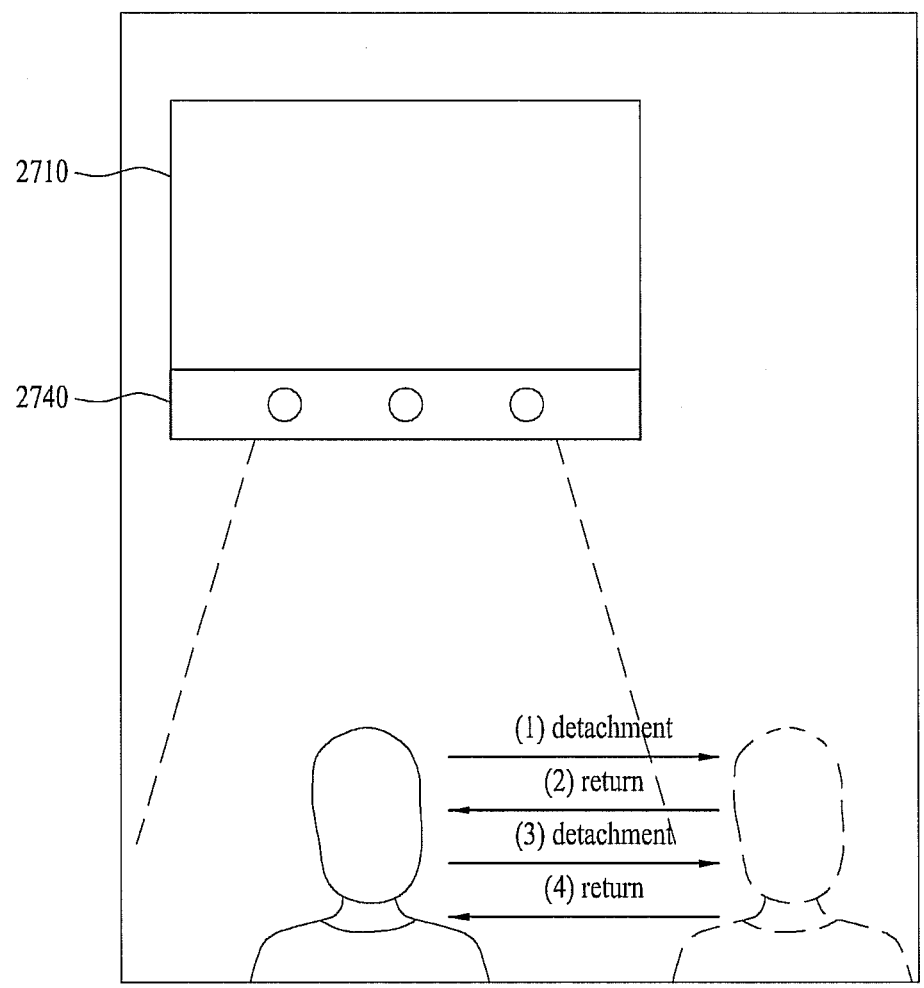
Figure 49:
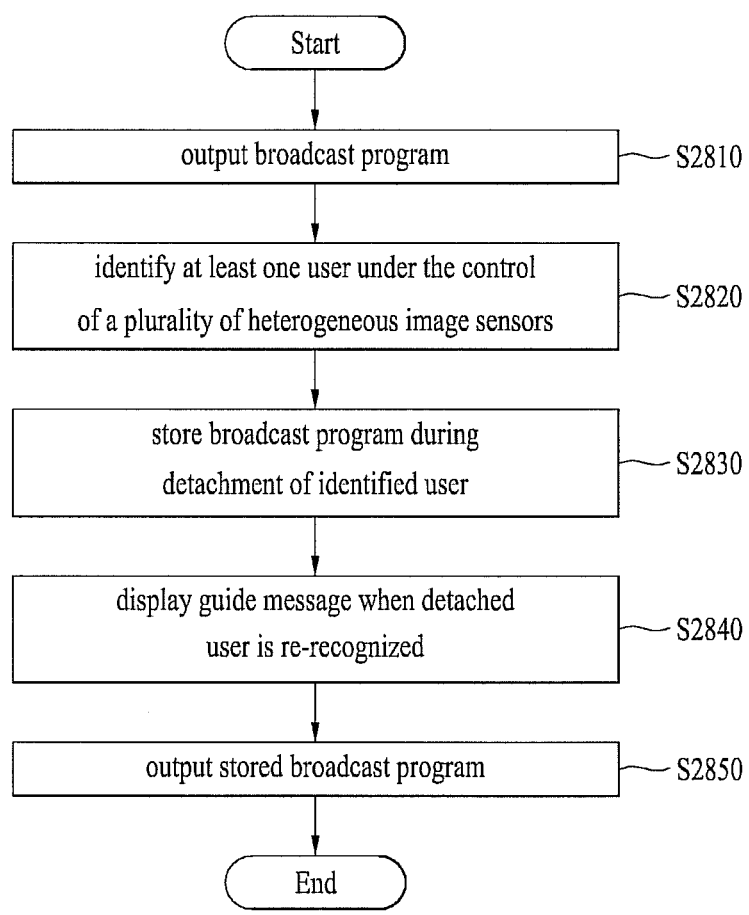
FIG. 49 is a flow chart illustrating a process of automatically storing and processing a specific broadcast program by using a plurality of heterogeneous image sensors in accordance with another embodiment of the present invention.
Figure 50:
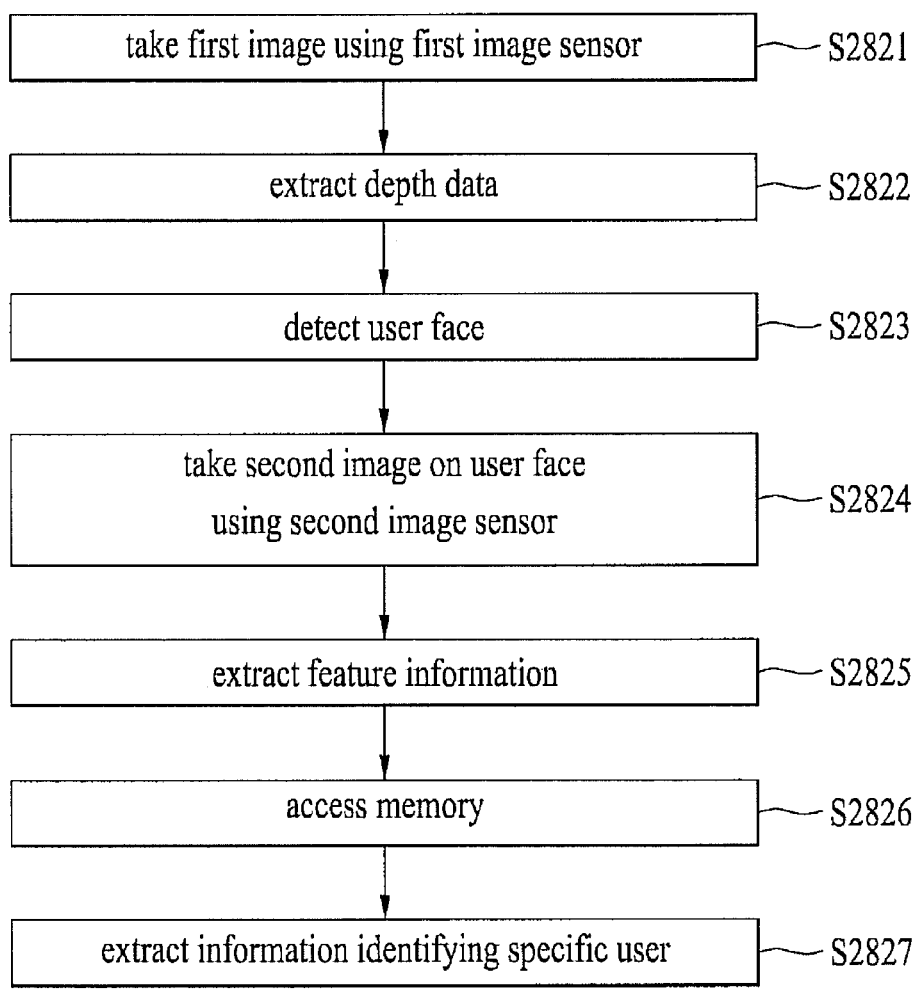
FIG. 50 is a flow chart illustrating a step S2820 illustrated in FIG. 49 in more detail in accordance with another embodiment of the present invention.
Figure 51:
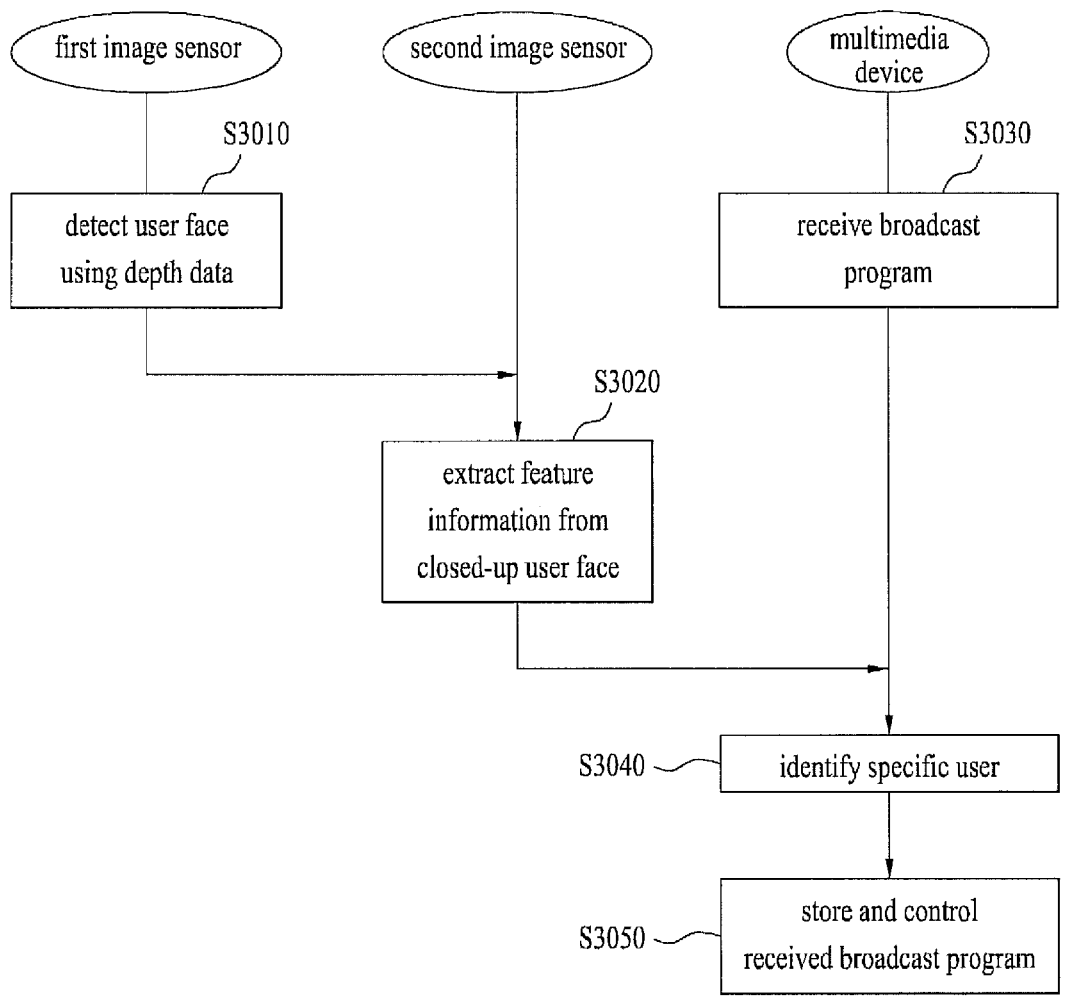
FIG. 51 is a flow chart per device illustrating a process of automatically storing and processing a specific broadcast program by using a plurality of heterogeneous image sensors in accordance with another embodiment of the present invention.
Figure 52:
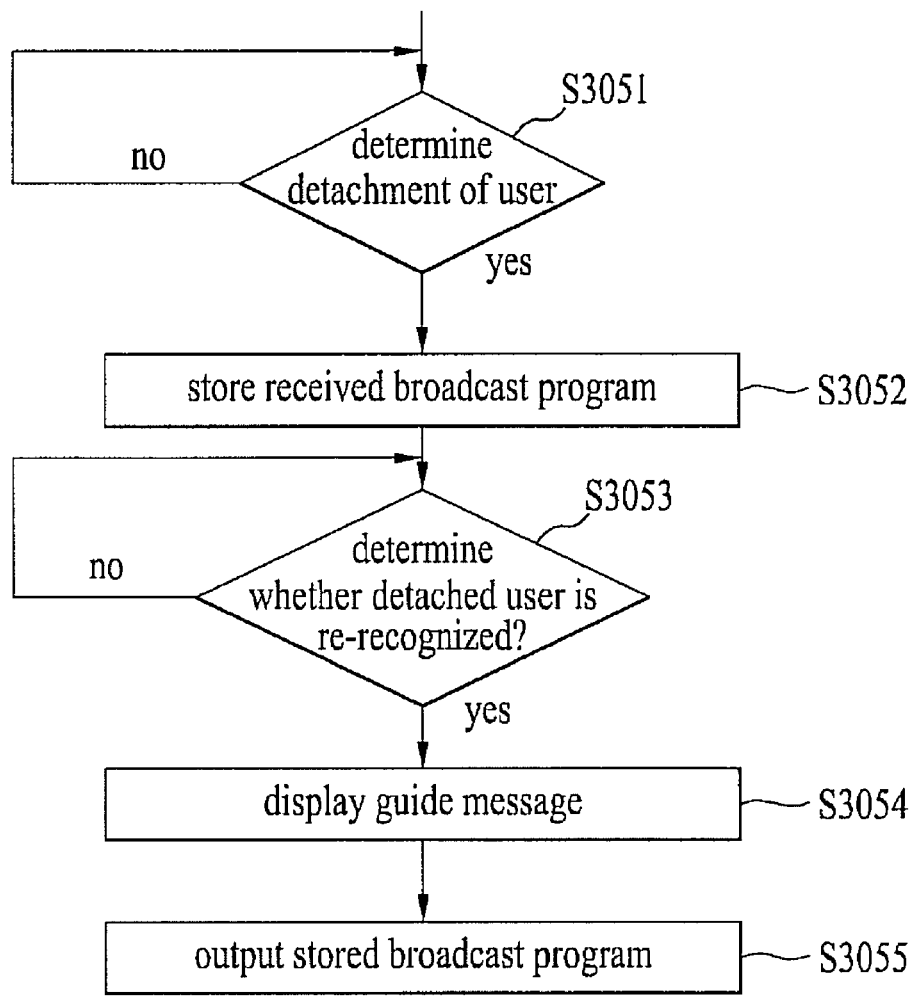
FIG. 52 is a flow chart illustrating a step S3050 illustrated in FIG. 51 in more detail in accordance with another embodiment of the present invention.
Figure 53:
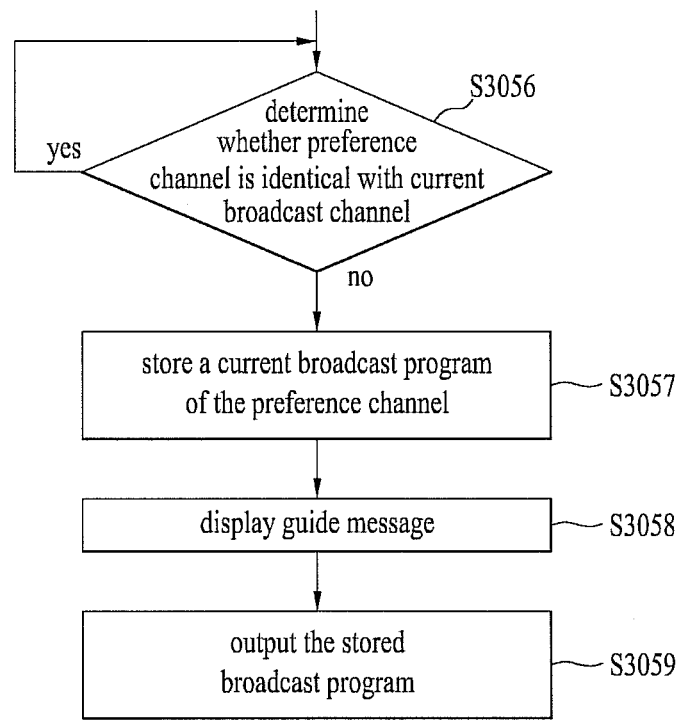
FIG. 53 is a flow chart illustrating a step S3050 illustrated in FIG. 51 in more detail in accordance with still another embodiment of the present invention.

FIG. 15 is a diagram illustrating a detailed block of a multimedia device for providing a preference channel per user/family by using a plurality of heterogeneous image sensors in accordance with one embodiment of the present invention;

FIG. 16 is a diagram illustrating a first example of a scene where a multimedia device for providing a preference channel per user/family by using a plurality of heterogeneous image sensors automatically selects the preference channel in accordance with one embodiment of the present invention;

FIG. 17 is a diagram illustrating an example of a database that stores data acquired by FIG. 16;

FIG. 18 is a diagram illustrating a second example of a scene where a multimedia device for providing a preference channel per user/family by using a plurality of heterogeneous image sensors automatically selects the preference channel in accordance with one embodiment of the present invention;

FIG. 19 is a diagram illustrating an example of a database that stores data acquired by FIG. 18;

FIG. 20 is a diagram illustrating a third example of a scene where a multimedia device for providing a preference channel per user/family by using a plurality of heterogeneous image sensors automatically selects the preference channel in accordance with one embodiment of the present invention;

FIG. 21 is a diagram illustrating an example of a database that stores data acquired by FIG. 20;

FIG. 22 to FIG. 24 are diagrams illustrating a first example of automatic switching process of a multimedia device for providing a preference channel per user/family by using a plurality of heterogeneous image sensors to the preference channel in accordance with one embodiment of the present invention;

FIG. 25 to FIG. 27 are diagrams illustrating a second example of automatic switching process of a multimedia device for providing a preference channel per user/family by using a plurality of heterogeneous image sensors to the preference channel in accordance with one embodiment of the present invention;

FIG. 28 to FIG. 30 are diagrams illustrating a third example of automatic switching process of a multimedia device for providing a preference channel per user/family by using a plurality of heterogeneous image sensors to the preference channel in accordance with one embodiment of the present invention;

FIG. 31 is a flow chart illustrating a method for providing a preference channel per user/family by using a plurality of heterogeneous image sensors in accordance with one embodiment of the present invention;

FIG. 32 is a flow chart illustrating a step S2810 illustrated in FIG. 31 in more detail in accordance with one embodiment of the present invention;

FIG. 33 is a diagram illustrating a detailed block of a multimedia device for automatically storing a preference broadcast program per user by using a plurality of heterogeneous image sensors in accordance with another embodiment of the present invention;

FIG. 34 to FIG. 36 are diagrams illustrating a process of automatically storing a broadcast program in a multimedia device according to another embodiment of the present invention when a single viewer who is watching the broadcast program returns to the original position after leaving the position for a while;

FIG. 37 to FIG. 40 are diagrams illustrating a process of automatically storing a broadcast program in a multimedia device according to another embodiment of the present invention when some of a plurality of viewers who are watching the broadcast program return to the original position after leaving the position for a while;

FIG. 41 and FIG. 42 are diagrams illustrating a process of automatically storing and processing a preference channel broadcast program in a multimedia device according to another embodiment of the present invention when a plurality of viewers are watching the broadcast program;

FIG. 43 to FIG. 45 are diagrams illustrating a method for automatically selecting a preference channel in accordance with another embodiment of the present invention;

FIG. 46 to FIG. 48 are diagrams illustrating a method for automatically selecting a preference channel in accordance with still another embodiment of the present invention;

FIG. 49 is a flow chart illustrating a process of automatically storing and processing a specific broadcast program by using a plurality of heterogeneous image sensors in accordance with another embodiment of the present invention;

FIG. 50 is a flow chart illustrating a step S2820 illustrated in FIG. 49 in more detail in accordance with another embodiment of the present invention;

FIG. 51 is a flow chart per device illustrating a process of automatically storing and processing a specific broadcast program by using a plurality of heterogeneous image sensors in accordance with another embodiment of the present invention;

FIG. 52 is a flow chart illustrating a step S3050 illustrated in FIG. 51 in more detail in accordance with another embodiment of the present invention; and FIG. 53 is a flow chart illustrating a step S3050 illustrated in FIG. 51 in more detail in accordance with still another embodiment of the present invention.

BEST MODE FOR CARRYING OUT THE INVENTION

FIG. 15 is a diagram illustrating a detailed block of a multimedia device for providing a preference channel per user/family by using a plurality of heterogeneous image sensors in accordance with one embodiment of the present invention. A multimedia device 1210 according to one embodiment of the present invention is connected with a plurality of heterogeneous image sensors 1240 through an interface 1250. The interface 1250 corresponds to wire/wireless data transmission and reception connection, for example. In more detail, USB interface can be used as the interface 1250. Moreover, the plurality of heterogeneous image sensors 1240 include a depth camera and a color camera, for example, and may be designed a separate external module of the multimedia device 1210 as illustrated in FIG. 15, or may be embedded in the multimedia device 1210.

Also, the multimedia device 1210 includes a broadcast network interface 1211, a face recognition module 1212, a memory 1213, an extractor 1216, a controller 1218, a display module 1219, and a speaker 1220. According to another embodiment of the present invention, the memory 1213 further includes a first generator 1214 and a second generator 1215, and the extractor 1216 further includes a decision module 1217. However, it is to be understood that the multimedia device illustrated in FIG. 15 corresponds to one embodiment for convenience of description, and the scope of the present invention should basically be defined by claims.

The broadcast network interface 1211 receives broadcast data from the broadcast network 1230. Although not shown, video data of the received broadcast data are video-processed and then output through the display module 1219. Moreover, audio data of the received broadcast data are audio-processed and then output through the speaker 1220.

The face recognition module 1212 identifies one or more users by using information generated under the control of a first image sensor for extracting depth data and a second image sensor for extracting color data. The first image sensor corresponds to the depth camera of the plurality of heterogeneous image sensors 1240 illustrated in FIG. 15, and the second image sensor corresponds to the color camera or RGB camera of the plurality of heterogeneous image sensors 1240 illustrated in FIG. 15.

The memory 1213 stores a preference channel per user, and constructs a database per user or family based on the automatic face recognition result.

The extractor 1216 accesses the memory 1213 and extracts information of preference channels corresponding to one or more users identified by the face recognition module 1212.

The display module 1219 is designed to display a guide message indicating the above preference channels. Moreover, the controller 1218 controls the broadcast network interface 1211 to perform switching to the preference channels if a signal selecting the above preference channels is applied.

In the mean time, the face recognition module 1212 detects and recognizes faces of one or more users from a first image taken by the first image sensor and extracts depth data of the faces of the users. Also, the face recognition module 1212 allows the second image sensor to take a second image of the recognized faces of the users by using the extracted depth data. Also, the face recognition module 1212 extracts feature information of the recognized faces of the users from the second image taken by the first image sensor and identifies a specific user by accessing the memory that stores data corresponding to the extracted feature information. Moreover, the depth data corresponds to information on the distance between the image sensor and the user or coordinate information where the faces of the users are located.

According to another embodiment of the present invention, the extractor 1206 is designed to further include a decision module 1217 that determines whether a single user or a plurality of users have been identified. Moreover, the memory 1213 further includes a first generator 1214 generating a favorite list per user, which stores a broadcast program of a channel viewed by a single user twice or more at a specific time on a specific day, and a second generator 1215 generating a family favorite list that stores a broadcast program simultaneously viewed by a plurality of users twice or more at a specific time on a specific day.

Accordingly, if a single user is identified as a result of the decision module 1217, the extractor 1216 extracts information on a preference channel corresponding to the single user by accessing the memory 1213 that stores the favorite list per user generated by the first generator 1214.

Also, if a plurality of users are identified as a result of the decision module 1217, the extractor 1216 extracts information on preference channels corresponding to the plurality of users by accessing the memory 1213 that stores the family favorite list generated by the second generator 1215.

If the extractor 1216 is designed as above, it is advantageous in that the extractor 1215 can manage the preference channel lists per user/family separately and access the memory more quickly. Also, it is advantageous in that exactness in face recognition and face recognition distance are improved using the plurality of heterogeneous image sensors.

FIG. 16 is a diagram illustrating a first example of a scene where a multimedia device for providing a preference channel per user/family by using a plurality of heterogeneous image sensors automatically selects the preference channel in accordance with one embodiment of the present invention, and FIG. 17 is a diagram illustrating an example of a database that stores data acquired by FIG. 16. As described above, a user A located in the periphery of a multimedia device 1310 is identified by the operation of a plurality of heterogeneous image sensors 1340 illustrated in FIG. 16. Moreover, the multimedia device 1310 and the plurality of heterogeneous image sensors 1340 according to one embodiment of the present invention store records of a specific channel viewed by the user A and generate a favorite list per user as illustrated in FIG. 17 by continuing to monitor the user A.

The favorite list per user may be designed to store a broadcast program of a channel viewed by the user A illustrated in FIG. 17 at least twice or more at a specific time on a specific day. However, if a detail temporarily viewed by the user is stored, an error may occur. Accordingly, the favorite list per user is generated based on an absolute rate (for example, viewing for 30 minutes or more, or viewing for 50 minutes or more) of the viewed time or a relative rate (for example, viewing more than 50% or 79% of a total of hours of a corresponding program) of the viewed time.

FIG. 18 is a diagram illustrating a second example of a scene where a multimedia device for providing a preference channel per user/family by using a plurality of heterogeneous image sensors automatically selects the preference channel in accordance with one embodiment of the present invention. And, FIG. 19 is a diagram illustrating an example of a database that stores data acquired by FIG. 18. As described above, a user B located in the periphery of a multimedia device 1510 is identified by the operation of a plurality of heterogeneous image sensors 1540 illustrated in FIG. 18. Moreover, the multimedia device 1510 and the plurality of heterogeneous image sensors 1540 according to one embodiment of the present invention store records of a specific channel viewed by the user B and generate a favorite list per user as illustrated in FIG. 19 by continuing to monitor the user B. Since the favorite list per user is similar to that of FIG. 16 and FIG. 17, its repeated description will be omitted.

Also, in FIG. 19, a database of the user B is additionally constructed in the database of the user A of FIG. 17. In this case, same programs repeated among preference channels per user may be compared with each other.

FIG. 20 is a diagram illustrating a third example of a scene where a multimedia device for providing a preference channel per user/family by using a plurality of heterogeneous image sensors automatically selects the preference channel in accordance with one embodiment of the present invention, and FIG. 21 is a diagram illustrating an example of a database that stores data acquired by FIG. 20. Unlike the description of FIG. 16 to FIG. 19, a plurality of users, i.e., the user A and the user B located in the periphery of a multimedia device 1710 are identified by the operation of a plurality of heterogeneous image sensors 1740 illustrated in FIG. 20. Moreover, the multimedia device 1710 and the plurality of heterogeneous image sensors 1740 according to one embodiment of the present invention store records of specific channels viewed by the user A and the user B and generate a family favorite list as illustrated in FIG. 21 by continuing to monitor the user A and the user B.

The family favorite list may be designed to store a broadcast program of a channel viewed by the plurality of users, i.e., the user A and the user B illustrated in FIG. 20 twice or more at a specific time on a specific day. However, if a detail temporarily viewed by the users is stored, an error may occur. Accordingly, the family favorite list is generated based on an absolute rate (for example, viewing for 30 minutes or more, or viewing for 50 minutes or more) of the viewed time or a relative rate (for example, viewing more than 50% or 79% of a total of hours of a corresponding program) of the viewed time.

Although FIG. 21 illustrates a family favorite list for combination of the user A and the user B among family members, a family favorite list for combination of users A, B and C among family members, a family favorite list for combination of users B and D, a family favorite list for combination of users A, B, C and D corresponding to all family members can respectively be stored in the DB. Accordingly, it is advantageous in that different preference channel services can be provided depending on combination of family members located in the periphery of the multimedia device according to one embodiment of the present invention.

FIG. 22 to FIG. 24 are diagrams illustrating a first example of automatic switching process of a multimedia device for providing a preference channel per user/family by using a plurality of heterogeneous image sensors to the preference channel in accordance with one embodiment of the present invention. However, it is supposed that a database for preference channels is generated as illustrated in FIG. 16 to FIG. 21. According to another embodiment of the present invention, the DB for preference channels is not automatically generated but may be designed to be set directly by the user.

As illustrated in FIG. 22, if it is identified by the operation of a plurality of heterogeneous image sensors 1940 that the user A and the user B are located in the periphery of a multimedia device 1910, the multimedia device 1910 displays a related feedback screen. For example, as illustrated in 1950 of FIG. 22, a guide message indicating that an automatic preference channel is searched is displayed, or a guide message guiding that the user A and the user B have been recognized is output.

If a channel no. 11 is detected as a preference channel of the user A and the user B illustrated in FIG. 22, a broadcast receiver 2010 outputs a guide message 2050 asking whether to switch to the preference channel no. 11, as illustrated in FIG. 23. Moreover, according to another embodiment of the present invention, a plurality of heterogeneous image sensors illustrated in FIG. 23 are designed to continue to monitor change of the users.

If the guide message 2050 illustrated in FIG. 23 is accepted, a multimedia device 2110 switches to a preference channel screen by controlling the broadcast network interface and outputs a guide message 2150 guiding the channel switching result as illustrated in FIG. 24. Moreover, according to another embodiment of the present invention, a plurality of heterogeneous image sensors 2140 illustrated in FIG. 24 are designed to continue to monitor change of the users. If a plurality of common preference channels of the user A and the user B are provided, a common preference channel list where a plurality of common preference channels are displayed is output, and the current screen is switched to a specific preference channel screen selected by the user A and the user B.

In the mean time, in addition to the common preference channel of a plurality of users according to the embodiment of the present invention, which is classified and provided depending on the channel viewed together by the plurality of users at a specific time as described above, the common preference channel may be classified and provided depending on genre of a broadcast program viewed together by the plurality of users. In other words, if a genre of a broadcast program mainly viewed together by the user A and the user B is "Kids", the broadcast receiver may classify broadcast programs related to the genre "Kids" and provide a list of the classified broadcast programs when the user A and the user B are all recognized.

FIG. 25 to FIG. 27 are diagrams illustrating a second example of automatic switching process of a multimedia device for providing a preference channel per user/family by using a plurality of heterogeneous image sensors to the preference channel in accordance with one embodiment of the present invention. However, it is supposed that a database for preference channels is generated as illustrated in FIG. 16 to FIG. 21. According to another embodiment of the present invention, the DB for preference channels is not automatically generated but may be designed to be set directly by the user.

As illustrated in FIG. 25, it is sensed by the operation of a plurality of heterogeneous image sensors 2240 whether users located in the periphery of a multimedia device 2210 are changed. In other words, if the user B of the user A and the user B, who view a broadcast program together as illustrated in FIG. 25, leaves a certain range which is previously set, a preference channel may be changed.

In this case, the certain range may be defined as a range that the aforementioned heterogeneous image sensors fail to detect the user viewing the broadcast program, and may be associated with a field-of-view (FOV) range of the plurality of heterogeneous image sensors.

In the mean time, an angle A of the FOV is defined as follows:

$$A = 2\theta = 2\tan^{-1}(K/2f)$$

In this case, f means a focal distance, and K means a diagonal length of the image sensor. The angle varied depending on the corresponding focal distance f and the diagonal length K of the sensor can be obtained in accordance with the above formula.

As illustrated in FIG. 26, if a channel no. 9 is detected as a preference channel of the remaining user A, a multimedia device 2310 outputs a guide message 2350 asking whether to switch to the preference channel no. 9. Moreover, according to another embodiment of the present invention, a plurality of heterogeneous image sensors 2340 illustrated in FIG. 26 are designed to continue to monitor whether the users are changed. In other words, if a specific user of the plurality of users who are viewing a broadcast program leaves a previously set certain zone and is not recognized, the multimedia device may provide a common preference channel list by identifying a common preference channel for users remaining in the previously set certain zone. On the other hand, if a new user not the existing user(s) viewing the broadcast program is recognized within the previously set certain zone, the multimedia device according to the embodiment of the present invention may provide a common preference channel list by identifying a common preference channel for all users located within the previously set certain zone.

In the mean time, the common preference channel for a plurality of users according to the embodiment of the present invention is not limited to only the case where the plurality of users view a broadcast program together. For example, even if the user A views a broadcast program C on Monday and Tuesday, the user B views the broadcast program C on Wednesday and Thursday, i.e., the users frequently view the same broadcast program, the common preference channel may be provided for the plurality of users. In other words, users viewing a specific broadcast program are recorded and if the users view the broadcast program as much as the number of times previously set or more, the channel of the corresponding broadcast program may be classified as the common preference channel.

If the guide message 2350 illustrated in FIG. 26 is accepted, a multimedia device 2410 switches to a preference channel screen by controlling the broadcast network interface and outputs a guide message 2450 guiding the channel switching result as illustrated in FIG. 27. FIG. 28 to FIG. 30 are diagrams illustrating a third example of automatic switching process of a multimedia device for providing a preference channel per user/family by using a plurality of heterogeneous image sensors to the preference channel in accordance with one embodiment of the present invention. However, it is supposed that a database for preference channels is generated as illustrated in FIG. 16 to FIG. 21. According to another embodiment of the present invention, the DB for preference channels is not automatically generated but may be designed to be set directly by the user.

As illustrated in FIG. 28, if it is identified by the operation of a plurality of heterogeneous image sensors 2540 that the user A, the user B and the user C are located in the periphery of a multimedia device 2510, the multimedia device 2510 displays a related feedback screen. For example, as illustrated in 2550 of FIG. 28, a guide message indicating that an automatic preference channel is searched is displayed, or a guide message guiding that the user A, the user B and the user C have been recognized is output.

However, as a search result of the family favorite list or the favorite list per user, details of a channel viewed at the same time by the users A, B and C illustrated in FIG. 28 may not exist. In this case, a multimedia device 2610 outputs a guide message 2650 guiding a preference channel per user as illustrated in FIG. 29. Moreover, according to another embodiment of the present invention, a plurality of heterogeneous image sensors 2640 illustrated in FIG. 29 are designed to continue to monitor whether the users are changed.

If a specific preference channel is accepted from the guide message 2650 illustrated in FIG. 29, a multimedia device 2710 switches to a preference channel screen by controlling the broadcast network interface and outputs a guide message 2750 guiding the channel switching result as illustrated in FIG. 29. Moreover, according to another embodiment of the present invention, a plurality of heterogeneous image sensors 2740 illustrated in FIG. 30 are designed to continue to monitor whether the users are changed.

FIG. 31 is a flow chart illustrating a method for providing a preference channel per user/family by using a plurality of heterogeneous image sensors in accordance with one embodiment of the present invention. In the mean time, although FIG. 31 to FIG. 33 relate to the description of a method invention, their description can be analyzed by mutual complementary application with the description of the aforementioned product invention.

A method for controlling a multimedia device using a plurality of heterogeneous image sensors according to one embodiment of the present invention identifies one or more users located in the periphery of the multimedia device under the control of the first image sensor for extracting depth data and the second image sensor for extracting color data (S2810).

Moreover, the multimedia device accesses the memory that stores a preference channel per user (S2820), and extracts information on the preference channels corresponding to the identified one or more users (S2830). Also, the multimedia device switches to the preference channel based on the extracted information (S2840), and monitors whether the users located in the periphery of the multimedia device are changed (S2850).

According to another embodiment of the present invention, the step S2840 further includes displaying a guide message indicating the corresponding preference channel, and switching to the corresponding preference channel if a signal selecting the corresponding preference channel is applied.

According to another embodiment of the present invention, the step S2830 further includes the step of determining whether a single user or a plurality of users are identified. Moreover, the determining step further includes the step of extracting information on a preference channel corresponding to the single user by accessing the memory that stores a favorite list per user if the single user is identified. And, the determining step further includes the step of extracting information on a preference channel corresponding to the plurality of users by accessing the memory that stores a family favorite list if the plurality of users are identified.

Also, the favorite list per user stores a broadcast program of a channel viewed twice or more by the single user at a specific time on a specific day. The family favorite list stores a broadcast program of a channel viewed twice or more by the plurality of users at a specific time on a specific day.

FIG. 32 is a flow chart illustrating a step S2810 illustrated in FIG. 31 in more detail in accordance with one embodiment of the present invention.

According to one embodiment of the present invention, the step S2810 illustrated in FIG. 31 is designed to include steps S2811 to S2816 illustrated in FIG. 32.

First of all, the step 2810 includes taking a first image located in the periphery of the multimedia device (S2811), and extracting depth data related to the distance and location information of the user from the taken first image (S2812).

If a face zone of the user is closed-up by using the extracted depth data, the multimedia device controls the second image sensor to take a second image on the face of the user (S2813), and extracts feature information on the face of the user from the taken second image (S2814).

The multimedia device is designed to access the memory that stores data corresponding to the extracted feature information (S2815) and extract information recognizing a specific user stored in the memory (S2816).

FIG. 33 is a diagram illustrating a detailed block of a multimedia device for automatically storing a preference broadcast program per user by using a plurality of heterogeneous image sensors in accordance with another embodiment of the present invention. A multimedia device 1210 according to another embodiment of the present invention is connected with a plurality of heterogeneous image sensors 1240 through an interface 1250.

The interface 1250 corresponds to wire/wireless data transmission and reception connection, for example. In more detail, USB interface can be used as the interface 1250. Moreover, the plurality of heterogeneous image sensors 1240 include a depth camera and a color camera, for example, and may be designed as a separate external module of the multimedia device 1210 as illustrated in FIG. 33, or may be embedded in the multimedia device 1210.

Also, the multimedia device 1210 includes a broadcast network interface 1211, a face recognition module 1212, a memory 1213, an extractor 1217, a controller 1218, a display module 1220, and a speaker 1221. According to another embodiment of the present invention, the memory 1213 further includes a face recognition DB 1214, a preference channel DB 1215, and a motion recognition DB 1216. The controller 1218 further includes a decision module 1219. However, it is to be understood that the broadcast receiver illustrated in FIG. 33 corresponds to one embodiment for convenience of description, and the scope of the present invention should basically be defined by claims.

The broadcast network interface 1211 receives broadcast data from the broadcast network 1230. Although not shown in FIG. 33, video data of the received broadcast data are video-processed and then output through the display module 1220. Moreover, audio data of the received broadcast data are audio-processed and then output through the speaker 1221.

The face recognition module 1212 identifies one or more users by using information received from the first image sensor for extracting depth data and the second image sensor for extracting color data. The first image sensor corresponds to the depth camera of the plurality of heterogeneous image sensors 1240 illustrated in FIG. 33, and the second image sensor corresponds to the color camera or RGB camera of the plurality of heterogeneous image sensors 1240 illustrated in FIG. 33.

Moreover, while the broadcast program received through the broadcast network interface 1211 is being output, the face recognition module 1212 determines from the multimedia device 1210 whether the identified user leaves the previously set certain range. If the user leaves the previously set certain range, the broadcast program is stored in the memory 1213 under the control of the controller 1218 from the time when the user leaves the previously set certain range. In this case, previously set certain range may be defined as a range that the aforementioned heterogeneous image sensors fail to detect the user viewing the broadcast program, and may be associated with a field-of-view (FOV) range of the plurality of heterogeneous image sensors.

In the mean time, an angle A of the FOV is defined as follows:

$$A = 2\theta = 2\tan^{-1}(K/2f)$$

In this case, f means a focal distance, and K means a diagonal length of the image sensor. The angle varied depending on the corresponding focal distance f and the diagonal length K of the sensor can be obtained in accordance with the above formula.

Also, if the first image sensor and/or the second image sensor re-recognizes the left user, the multimedia device 1210 ends a storing action of the broadcast program which is being stored from the time when the left user is re-recognized. Then, the multimedia device 1210 may display through the display module 1220 that a broadcast program which is not viewed by the user has been stored.

Also, the controller 1218 controls the display module 1220 to display a message guiding whether to output the stored broadcast program. In this case, the message displayed by the multimedia device 1210, for example, imperfect viewing message may have various formats. In other words, the imperfect viewing message may be provided in the format of the number of times of imperfect viewing or a total of hours of imperfect viewing per day, per broadcasting station, and per broadcasting genre. Also, the imperfect viewing message may be displayed by the request of the user at any time, or may be displayed immediately after the broadcast program corresponding to the imperfect viewing status is ended. In particular, it is preferable that the imperfect viewing message displayed immediately after the broadcast program corresponding to the imperfect viewing status is ended relates to a broadcast program ended immediately before the imperfect viewing message is displayed.

If an imperfect viewing broadcast program desired to view again is selected through motion of the user taken through the heterogeneous multiple cameras, the remote controller, or the mobile phone, the controller 1218 controls the memory 1213 to output the imperfect viewing broadcast program stored in the memory 1213 through the display module 1220.

In the mean time, imperfect viewing contents according to the embodiment of the present invention may be stored and their storing action may be ended by a predetermined buffer interval. In other words, it is more preferable that imperfect viewing contents are stored in the memory from the time earlier than the time when recognition failure occurs than that imperfect viewing contents are stored in the memory from the time when recognition failure occurs. Also, it is more preferable that the storing action of the imperfect viewing contents is ended from the time later than the time when re-recognition occurs than that the storing action of the imperfect viewing contents is ended from the time when re-recognition occurs. In this way, if a predetermined buffer interval is provided for storage of the imperfect viewing contents and the action for ending storage of the imperfect viewing contents, the viewer can identify the plot of the contents more easily when again viewing the imperfect viewing contents.

In the mean time, the face recognition module 1212 takes a first image located in the periphery of the multimedia device through the first image sensor, extracts depth data from the taken first image, and detects the face of the one or more users by using the extracted depth data. Also, the face recognition module 1212 takes a second image on the face of the detected user through the second image sensor, and extracts feature information from the taken second image. In the mean time, the controller 1218 performs a control operation to store the extracted feature information in the memory 1213 or extract the feature information stored in the memory 1213.

Moreover, according to another embodiment of the present invention, if the decision module 1219 calculates the time when the identified user leaves the multimedia device 1210 for a certain range and the calculated time is within a certain time range, the controller 1218 can perform a control operation to end the storing action of the broadcast program. For example, if a storage process is performed even in case that the user leaves the multimedia device for a short time, it is not good in view of efficiency in use of the memory. However, the certain time range may be set randomly by the user, or may be set by a TV manufacturer.

According to another embodiment of the present invention, the memory 1213 of the multimedia device 1210 stores a preference channel per user. The extractor 1217 extracts information on preference channels corresponding to the identified one or more users by accessing the memory 1213. Moreover, the controller 1218 performs a control operation to store a broadcast program of the preference channel in the memory 1213 if a channel of current broadcast data is not identical with the preference channel corresponding to the identified user. In this case, even though the user does not view the preference channel in error, the broadcast program of the preference channel is automatically stored in the memory 1213. Accordingly, it is advantageous in that the user can later identify only the preference channel which is not viewed by himself/herself, even though he/she does not input a specific storage command to the multimedia device.

In other words, if the user does not view the preference channel in error, or cannot view the preference channel due to the relation with other users, it is advantageous in that the preference channel is automatically stored in the memory even though the user does not take a specific action. Also, the controller 1218 includes a decision module 1219 determining whether a single user or a plurality of users are identified by the face recognition module 1212, and a memory controller 1222 storing the broadcast program of the preference channel in the memory 1213 only if the plurality of users are identified. According to this embodiment, if the single user views other broadcast program not the preference channel, it is likely that the user is not willing to view the preference channel. However, if the plurality of users view other broadcast program not the preference channel, it is likely that the users are willing to view the preference channel.

Also, the face recognition module 1212 monitors a single first action and a plurality of second actions of the identified user. In case of the first action, the face recognition module 1212 immediately registers the current broadcast program as the preference channel of the memory. In case of the second actions, the face recognition module 1212 determines whether to register the current broadcast program as the preference channel of the memory depending on time-variable motion.

The first action corresponds to a specific hand action, for example, and the second actions correspond to motions related to change of joints of the identified user or detachment of the identified user from the broadcast receiver. The first action will be described in more detail with reference to FIG. 43 to FIG. 45, and the second actions will be described in more detail with reference to FIG. 46 to FIG. 48.

FIG. 34 to FIG. 36 are diagrams illustrating a process of automatically storing a broadcast program in a multimedia device according to another embodiment of the present invention when a single viewer who is watching the broadcast program returns to the original position after leaving the position for a while.

As illustrated in FIG. 34, a plurality of heterogeneous image sensors 1340 according to one embodiment of the present invention can identify the user A located in the periphery of a multimedia device 1310, and a guide message 1350 indicating that the specific user A has been identified is displayed.

In the mean time, as illustrated in FIG. 35, if the specific user A illustrated in FIG. 34 leaves a certain range, a plurality of heterogeneous image sensors 1440 cannot detect and identify the user A any more. Accordingly, a multimedia device 1410 displays the current broadcast screen only and cannot display the recognized user as illustrated in 1450 of FIG. 35 unlike the guide message illustrated in FIG. 34. If the specific user A leaves the certain range, the multimedia device 1410 is designed to store a broadcast program which is being played from the time when the specific user A leaves the certain range. If the specific user A again returns to the previously set certain zone as illustrated in FIG. 36, a plurality of heterogeneous image sensors 1540 can again recognize and identify the user A. Accordingly, the multimedia device 1510 ends a storing action of the broadcast program stored from the time when the specific user A leaves the certain zone.

In the mean time, according to the aforementioned embodiment of the present invention, a broadcast program transmitted in real-time is stored depending on the recognition state of the specific user, the impossible recognition state (user detachment), and the re-recognition state. However, the scope of the present invention is not limited to this embodiment. According to another embodiment of the present invention, the multimedia device performs a monitoring process for the specific user while playing contents not the real-time broadcast program. For example, the contents means data received through Internet or stored in an internal/external memory of the multimedia device.

If the multimedia device according to another embodiment of the present invention senses that the specific user who is viewing the contents leaves the previously set range while playing the contents, it is designed to automatically end playing the contents and output a guide message guiding that playing of the contents is automatically ended. However, the multimedia device is designed such that the play process of the contents is not completely ended but switched to a background process, whereby the contents temporarily disappear from the screen.

The multimedia device according to another embodiment of the present invention temporarily switches to a previously set specific channel, a preference channel, or a previous channel, and if the specific user who has left the previously set range is re-recognized, the multimedia device enters the contents play mode. Moreover, the multimedia device according to another embodiment of the present invention is designed to play the contents from the time when the play process of the contents is ended. Hereinafter, in this specification, change depending on user recognition is described in detail while a real-time broadcast program is being output. However, the present invention may be applied to the case where random contents are played, as well as the real-time broadcast program.

FIG. 37 to FIG. 40 are diagrams illustrating a process of automatically storing a broadcast program in a multimedia device according to another embodiment of the present invention when some of a plurality of viewers who are watching the broadcast program return to the original position after leaving the position for a while.

Figure 37:
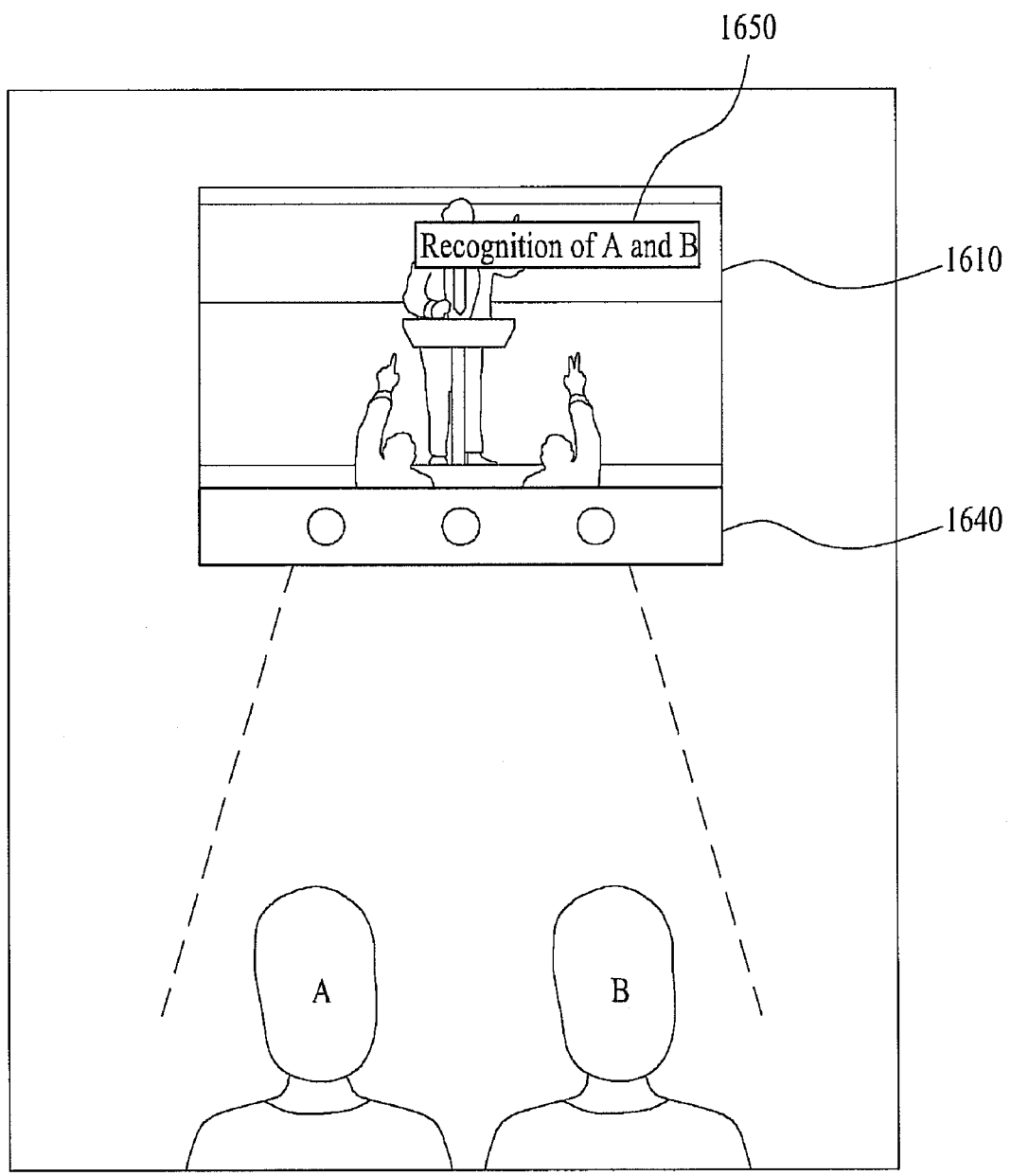

As illustrated in FIG. 37, a plurality of heterogeneous image sensors 1640 according to one embodiment of the present invention can identify users A and B who are a plurality of users located in the periphery of a multimedia device 1610, and a guide message 1650 indicating that the specific user A and the specific user B have been identified is displayed.

Figure 38:
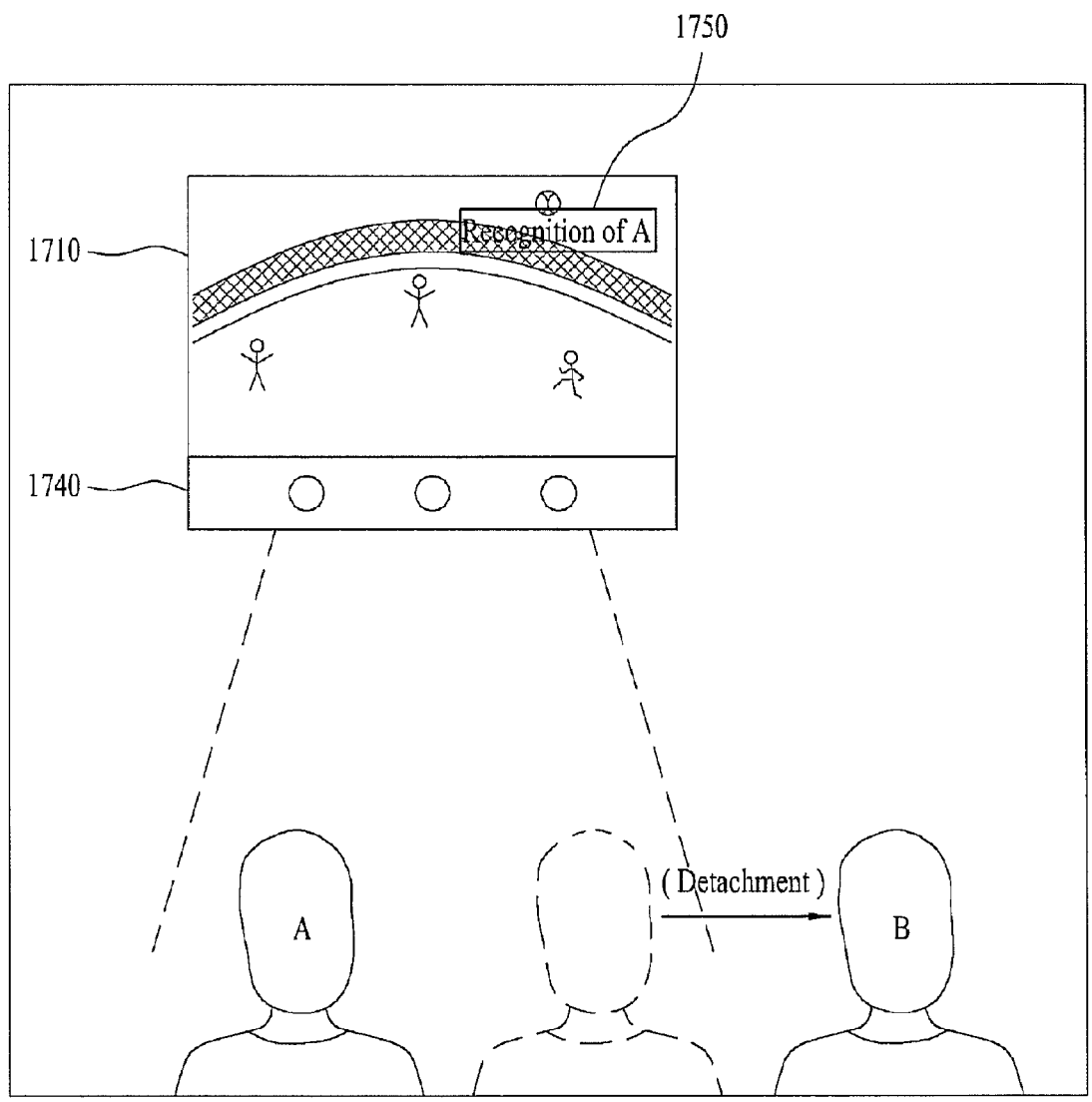

In the mean time, as illustrated in FIG. 38, if the specific user B of the plurality of users illustrated in FIG. 37 leaves a certain range, a plurality of heterogeneous image sensors 1740 cannot detect and identify the user B any more. Accordingly, a multimedia device 1710 displays a guide message 1750 indicating that only the user A has been identified while displaying the current broadcast screen. However, if the specific user B leaves the certain range, the multimedia device 1710 is designed to store a broadcast program which is being played from the time when the specific user B leaves the certain range. As described above, if the plurality of users leave the certain zone in the periphery of the multimedia device which is playing contents, the multimedia device can store the contents, which are being played, per user who leaves the certain range. In other words, if recognition failure of the specific user occurs for a certain time while the multimedia device according to the embodiment of the present invention is recognizing faces of the plurality of users who are viewing contents, the multimedia device stores the contents in association with information on the user whose recognition is failed.

Figure 39:
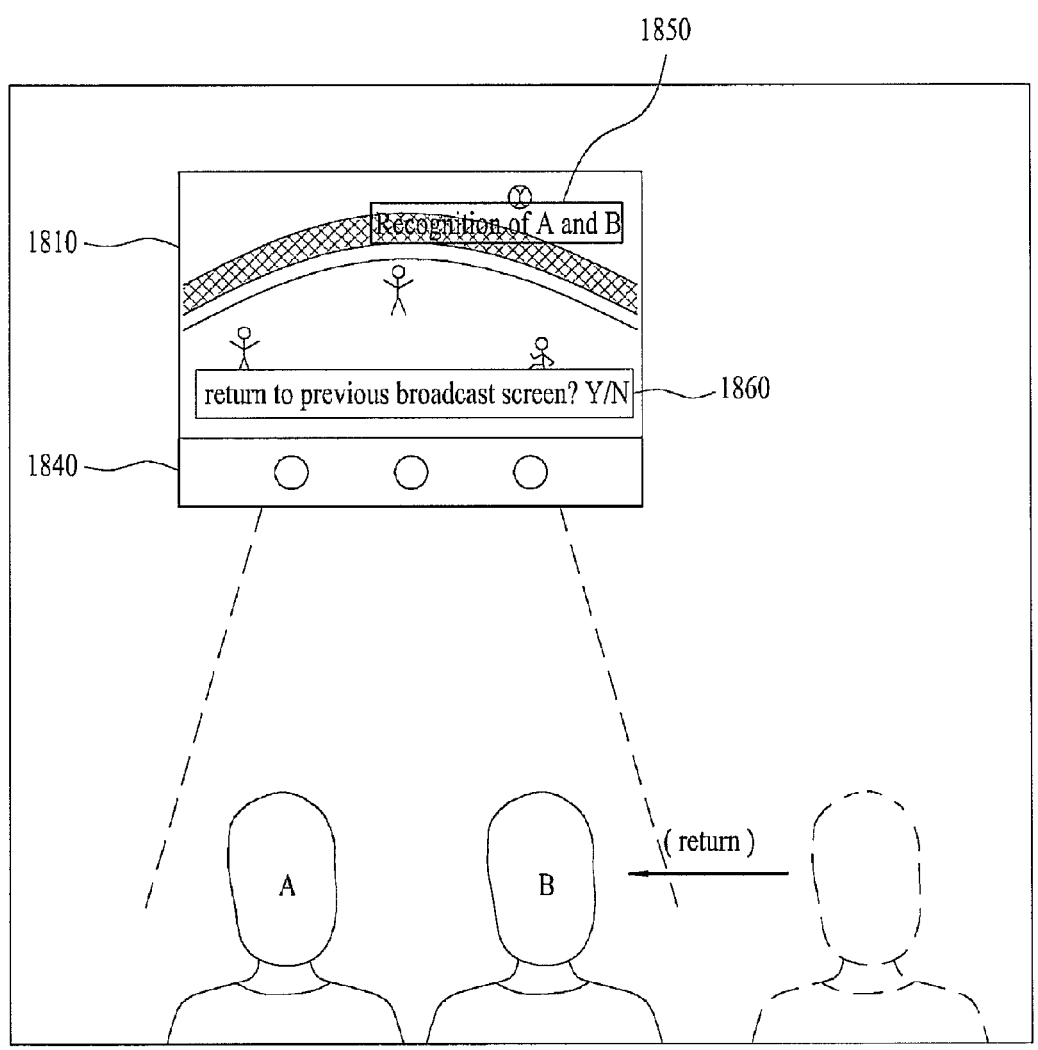

If the specific user B returns to the previously set certain zone as illustrated in FIG. 39, a plurality of heterogeneous image sensors 1840 can recognize and identify the user B. Accordingly, a guide message 1850 guiding that the user A and the user B have been recognized is displayed, and a guide message 1860 is output, which asks whether the user B will again view the broadcast program stored from the time when the user B leaves the certain zone.

Storage of contents which are being played by the multimedia device based on user detachment illustrated in FIG. 34 to FIG. 39, an operation for ending storage of the contents, and display of an imperfect viewing message can include the method described in FIG. 33 in respect of storage of contents, the operation for ending storage of the contents and display of the imperfect viewing message.

Figure 40:
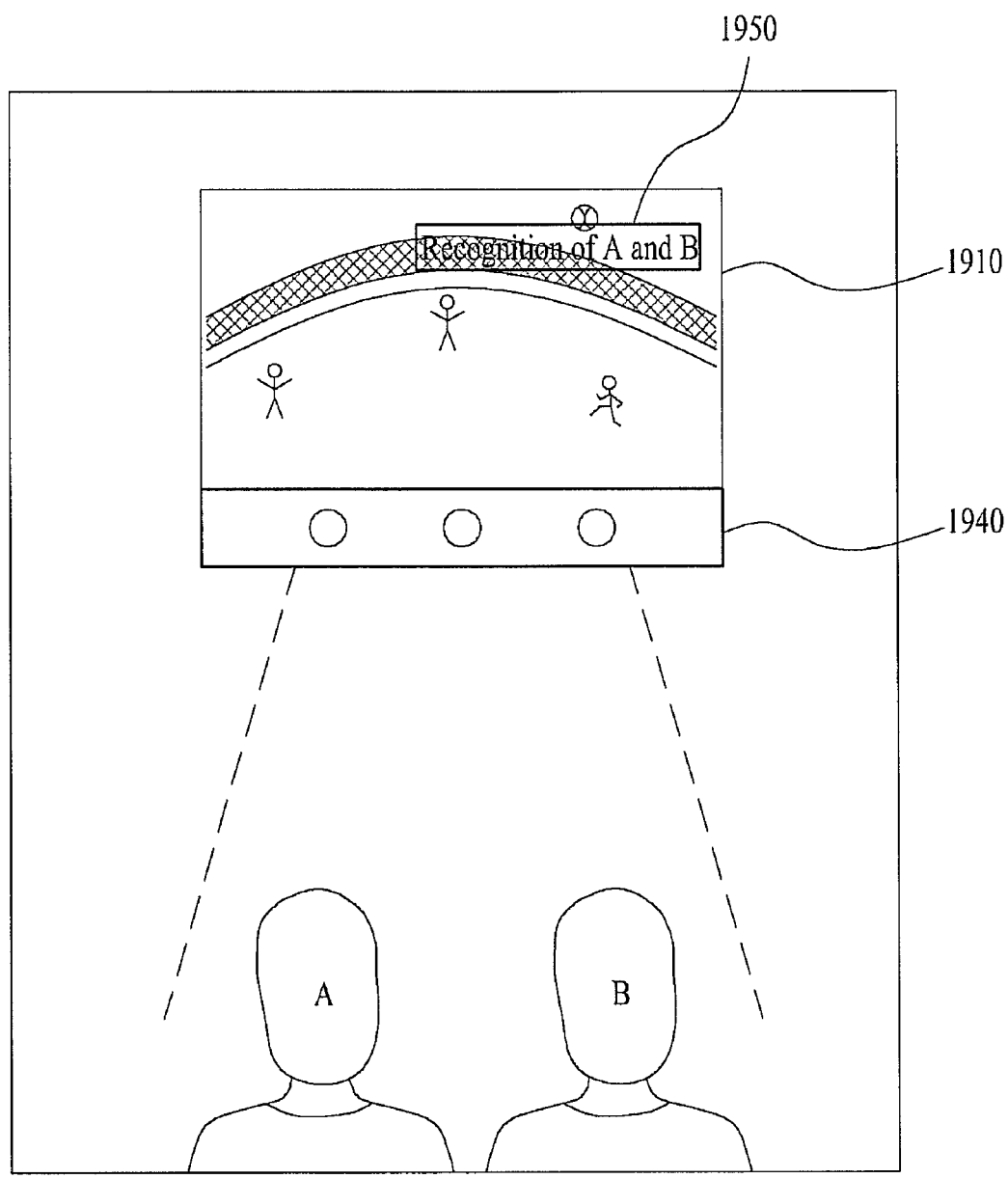

If a signal accepting the message 1860 illustrated in FIG. 39 is applied, as illustrated in FIG. 40, a multimedia device 1910 automatically plays the broadcast program stored from the time when the specific user B leaves the certain zone. Moreover, a plurality of heterogeneous image sensors 1940 may be designed to continue to monitor the users and display result information on the recognized users in the form of a message 1950.

FIG. 41 and FIG. 42 are diagrams illustrating a process of automatically storing and processing a preference channel broadcast program in a multimedia device according to another embodiment of the present invention when a plurality of viewers are watching the broadcast program. As illustrated in FIG. 41, a plurality of heterogeneous image sensors 2040 according to another embodiment of the present invention can identify users A, B and C located in the periphery of a multimedia device 2010, and the result of the recognized user is output in the form of a message 2050. As a search result of the DB for preference channels previously stored in the memory, the channel output in the broadcast screen illustrated in FIG. 23 is the preference channel of the user A but may not be the preference channel of the other users. In other words, it is likely that the users B and C who views a channel not the preference channel may view an unwanted channel in accordance with the request of the user A.

Accordingly, as illustrated in FIG. 42, a multimedia device 2110 is designed to display information 2160 on the preference channel of the specific users B and C who currently view a channel not the preference channel. Moreover, the multimedia device 2110 may be designed to automatically store the broadcast program of the preference channel of the specific users B and C in the memory. In the mean time, a plurality of heterogeneous image sensors 2140 according to one embodiment of the present invention continue to take and monitor users located in the periphery of the multimedia device 2110.

FIG. 43 to FIG. 45 are diagrams illustrating a method for automatically selecting a preference channel in accordance with another embodiment of the present invention.

According to the related art, a problem occurs in that the user should search for a menu registering a preference channel and input required information several times. However, in order to solve the problem, the preference channel can be selected more simply by using heterogeneous multiple cameras according to one embodiment of the present invention. As illustrated in FIG. 43 to FIG. 45, parts 2270, 2370 and 2470 of the hand of the user located before multimedia devices 2210, 2310 and 2410 can be recognized by the operation of a plurality of heterogeneous image sensors 2240. If the user desires to register a random channel as the preference channel while viewing the random channel, he/she makes a V shape using two fingers, unfolds five fingers, or clasps hands as illustrated in FIG. 43 to FIG. 45. If the plurality of users view the broadcast receiver, hand action of each user is recognized, whereby a preference channel per user may be registered.

Data indicating that each hand shape or hand gesture corresponds to a command signal indicating that a current broadcast channel should be registered as a preference channel is previously stored in the databases of the multimedia devices 2210, 2310 and 2410.

Although FIG. 43 to FIG. 45 illustrates specific hand shapes only, the scope of the present invention is not limited to the examples of FIG. 43 to FIG. 45, and the preference channel may be registered by using other body parts.

FIG. 46 to FIG. 48 are diagrams illustrating a method for automatically selecting a preference channel in accordance with still another embodiment of the present invention.

Although small gestures of the user are required in FIG. 43 to FIG. 45, the embodiments of FIG. 46 to FIG. 48 are advantageous in that no gesture of the user for registration of the preference channel is required.

As illustrated in FIG. 46, a plurality of heterogeneous image sensors 2540 according to another embodiment of the present invention take a user located in the periphery of a multimedia device 2510. In particular, the plurality of heterogeneous image sensors 2540 can monitor a joint motion 2580 of the user by using a depth camera. If there is little change in motion for a certain time like the motion 2580 illustrated in FIG. 46, it may be assumed that the user concentrates in the corresponding channel. Accordingly, the multimedia device 2510 is designed to automatically register the current broadcast channel as the preference channel if there is relatively little change in motion of the taken user.

Moreover, as illustrated in FIG. 47, a plurality of heterogeneous image sensors 2640 according to one embodiment of the present invention take a user located in the periphery of a multimedia device 2610. Unlike FIG. 46, joint motion 2580 of the user frequently occurs in FIG. 47. In this case, it may be assumed that the user does not concentrate in the broadcast program output from the current channel. Accordingly, the multimedia device 2610 is designed not to register the current broadcast channel as the preference channel if there is relatively change in motion of the taken user.

In the mean time, as illustrated in FIG. 48, as a result of taking users located in the periphery of a multimedia device 2710 through a plurality of heterogeneous image sensors 2740 according to one embodiment of the present invention, if (1) detachment, (2) return, (3) detachment, and (4) return are repeated several times, it is not required to register the current broadcast channel as the preference channel. However, if detachment/return of the users located before the broadcast receiver is not performed several times, the multimedia device is designed to automatically register the current broadcast channel as the preference channel. Moreover, the embodiment designed in FIG. 48 may be implemented in combination with the embodiments of FIG. 46 and FIG. 47, or may be implemented as a separate embodiment.

In other words, preference channel registration according to the embodiment of the present invention may be performed automatically by the multimedia device based on action pattern and change in face expression of the user in the middle of viewing a broadcast program. In more detail, the multimedia device analyzes the action pattern and change in face expression of the user who is viewing the broadcast program, by using heterogeneous image sensing modules, and automatically registers the current broadcast program as the preference channel if the analyzed result corresponds to the previously set action pattern or face expression. In other words, if the user rarely leaves the multimedia device in the middle of viewing the broadcast program, if change in face expression of the user seriously or frequently occurs, or if the user shows a viewing pattern such as clasping hands, crying, smiling, and doze, the multimedia device registers the current broadcast channel as the preference channel. Preferably, the multimedia device performs preference channel registration based on the action pattern and change in face expression of the user by determining whether the action pattern or the change in face expression departs from the previously set reference range. Also, preference channel registration based on the action pattern and change in face expression of the user may have lower reliability than that the preference channel is directly registered by the user. In this case, the multimedia device may register the current broadcast channel as a preliminary preference channel without immediate registration as the preference channel. Accordingly, the multimedia device provides a preliminary preference channel list to the user, and is operated to register channels only selected by the user as the preference channels.

FIG. 49 is a flow chart illustrating a process of automatically storing and processing a specific broadcast program by using a plurality of heterogeneous image sensors in accordance with another embodiment of the present invention. Although FIG. 49 to FIG. 53 relate to the description of a method invention, their description can be analyzed by mutual complementary application with the product invention described through the aforementioned drawings.

The multimedia device outputs a broadcast program received through the device broadcast network (S2810). Moreover, the multimedia device identifies one or more users, who are located in the periphery of the multimedia device, under the control of the first image sensor for extracting depth data and the second image sensor for extracting color data (S2820).

If the identified user leaves a certain range from the broadcast receiver while the broadcast program is being output, the multimedia device stores the broadcast program from the time when the user leaves a certain range (S2830). If the user who has left a certain range is re-recognized under the control of the first image sensor and the second image sensor, the multimedia device displays a message guiding whether to output the stored broadcast program (S2840).

The multimedia device performs a control operation to output the stored broadcast program (S2850).

Also, according to another embodiment of the present invention, the multimedia device is designed to display the broadcast program in the first zone, and to display information indicating the user recognized by the first image sensor and the second image sensor in the second zone. Since this has been described with reference to FIG. 34 to FIG. 37, the repeated description will be omitted.

Also, according to still another embodiment of the present invention, the step S2830 further includes counting the time when the identified user leaves a certain range from the broadcast receiver and performing a control operation to stop storage of the broadcast program if the counted time is within a certain time range.

FIG. 50 is a flow chart illustrating a step S2820 illustrated in FIG. 49 in more detail in accordance with another embodiment of the present invention.

According to another embodiment of the present invention, the step S2820 illustrated in FIG. 49 further includes steps S2821 to S2827.

First of all, the multimedia device takes a first image located in the periphery of the multimedia device by using the first image sensor (S2821), extracts depth data from the taken first image (S2822), and detects the face of the one or more users by using the extracted depth data (S2823). Moreover, the multimedia device takes a second image on the face of the detected user by using the second image sensor (S2824), and extracts feature information from the taken second image (S2825).

The multimedia device is designed to access the memory that stores data corresponding to the extracted feature information (S2826), and to extract information identifying a specific user stored in the memory (S2827).

FIG. 51 is a flow chart per device illustrating a process of automatically storing and processing a specific broadcast program by using a plurality of heterogeneous image sensors in accordance with another embodiment of the present invention. As described above, a plurality of heterogeneous image sensors according to one embodiment of the present invention includes a first image sensor and a second image sensor. The first image sensor corresponds to a depth camera, for example, and the second image sensor corresponds to a color camera or RGB camera, for example. The plurality of heterogeneous image sensors may be embedded in the multimedia device, or may be designed as a separate external module.

The first image sensor detects a user face zone by using the depth data extracted from the taken image (S3010). Moreover, the second image sensor takes the face zone acquired by the first image sensor through close-up, and extracts feature information from the taken user face (S3020).

The multimedia device according to one embodiment of the present invention receives a broadcast program transmitted through the current broadcast network (S3030), and recognizes a specific user by using the feature information acquired by the second image sensor (S3040). The multimedia device starts to store and control the received broadcast program (S3050). The step S3050 will be described in more detail with reference to FIG. 52 or FIG. 53. In the mean time, FIG. 52 and FIG. 53 may be separate embodiments, or may be used as one embodiment in combination.

FIG. 52 is a flow chart illustrating a step S3050 illustrated in FIG. 51 in more detail in accordance with another embodiment of the present invention.

The multimedia device according to another embodiment of the present invention determines whether the detected and recognized user has left a certain range (for example, zone covered by a plurality of heterogeneous image sensors) (S3051). As a result, if the user has left a certain range, the multimedia device stores the current broadcast program from the time when the user has left a certain range (S3052). However, in order to store the current broadcast program, the initially recognized and left user needs to be mapped with the broadcast program.

The multimedia device determines whether the left user has been re-recognized (S3053). As a result, if the left user has been re-recognized, the multimedia device displays a guide message asking whether to output the broadcast program stored from the time when the user has left (S3054).

If a confirm signal of the guide message displayed in the step S3054 is applied, the multimedia device performs a control operation to output the stored broadcast program (S3055).

FIG. 53 is a flow chart illustrating a step S3050 illustrated in FIG. 51 in more detail in accordance with still another embodiment of the present invention. The multimedia device according to still another embodiment of the present invention determines whether the preference channel of the detected and recognized user is identical with the current broadcast channel (S3056). As a result, if the preference channel of the detected and recognized user is not identical with the current broadcast channel, the multimedia device stores the current broadcast channel as the preference channel of the user (S3057).

Also, the multimedia device displays a guide message asking whether to output the program of the automatically stored preference channel (S3058). In this case, as described above, it is preferable that a non-preference channel which is being played is automatically registered as the preference channel when action pattern or change in face expression of the user satisfies the previously set condition after the broadcast receiver determines the action pattern or change in face expression of the user.

If a confirm signal of the guide message displayed in the step S3058 is applied, the multimedia device performs a control operation to output the stored broadcast program (S3059).

According to the embodiments of the present invention as designed above, it is advantageous in that performance of face recognition, data processing speed, and long distance recognition are all improved through mutual complementary of the 3d depth camera and the 2D color camera.

In this specification, both the product invention and the method invention are disclosed, and the description of both of them can be applied complementarily as the case may be.

The method according to the present invention can be implemented in a program instruction type that can be performed through various computer means and can be recorded in a computer readable recording medium. The computer readable recording medium can include program instructions, data files, and data structures, alone or in combination. The program instructions recorded in the computer readable recording medium are designed specially for the present invention but may be well known to those skilled in the computer software. Examples of the computer readable recording medium include magnetic media such as hard disks, floppy disks, and magnetic tapes, optical media such as CD-ROM and DVD, magneto-optical media such as floppy disks, and a hardware device such as ROM, RAM, and flash memory, which is especially configured to store and perform program instructions. Examples of the program instructions include a machine language code made by a compiler and a high-level language code implemented using an interpreter by a computer. The hardware device can be configured as at least one software module to perform the operation of the present invention, and vice versa.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for managing information in a display device, comprising:
    acquiring a first image;
    acquiring a second image;
    detecting a person in the first image;
    determining coordinate information of the person in the first image;
    extracting a feature of the person from the second image based on the coordinate information;
    comparing the extracted feature to reference information;
    recognizing the person based on the comparison;
    determining whether a single user or a plurality of users have been identified;
    extracting information on a preference channel corresponding to the single user by accessing a memory that stores a favorite list per user when the single user is determined to have been identified, wherein the favorite list per user includes information regarding a broadcast program of a channel viewed twice or more by the single user at a specific time on a specific day; and
    performing a control operation for switching to the preference channel based on the extracted information.

2. The method as claimed in claim 1, further comprising:
    taking the first image located in a periphery of the display device by using a first image sensor;
    extracting depth data from the taken first image;
    detecting a face of the user by using the extracted depth data;
    taking the second image on the detected face of the user by using a second image sensor;
    extracting feature information from the taken second image;
    accessing a memory that stores data corresponding to the extracted feature information; and
    extracting information identifying a specific user stored in the memory.

3. The method as claimed in claim 1, further comprising:
    displaying a guide message indicating the preference channel; and
    switching to the preference channel when a signal selecting the preference channel is applied.

4. A multimedia device that uses a plurality of heterogeneous image sensors, the multimedia device comprising:
    a first image sensor to acquire a first image;
    a second image sensor to acquire a second image;
    a processor to detect a person in the first image and to extract a feature of the person from the second image, wherein the processor determines coordinate information of the person in the first image and extracts the feature of the person in the second image based on the coordinate information, wherein the first and second image sensors have overlapping fields of view, the coordinate information provides an indication of a distance to the person, and the processor compares the extracted feature to reference information and recognizes the person based on the comparison, and wherein the processor includes a decision module to determine whether a single user has been identified or a plurality of users have been identified; a memory to store a preference channel per user, wherein the memory includes:
        a first generator for generating a favorite list per user, which stores a broadcast program of a channel viewed twice or more by the single user at a specific time on a specific day, and
        a second generator for generating a family favorite list that stores a broadcast program of a channel viewed twice or more by the plurality of users at a specific time on a specific day;
    a display module for displaying a guide message indicating the corresponding preference channel; and
    a controller for performing a control operation for switching to the corresponding preference channel when a signal selecting the corresponding preference channel is applied.

5. The multimedia device as claimed in claim 4, wherein the first image sensor corresponds to a depth camera, and the second image sensor corresponds to an RGB camera.

6. The multimedia device as claimed in claim 4, wherein the processor extracts information on a preference channel corresponding to the single user by accessing a memory that stores a favorite list per user generated by the first generator when the single user has been identified in accordance with the determined result of the decision module.

7. The multimedia device as claimed in claim 4, wherein the processor extracts information on a preference channel corresponding to the plurality of users by accessing a memory that stores the family favorite list generated by the second generator when the plurality of users have been identified in accordance with the determined result of the decision module.

8. The multimedia device as claimed in claim 4, wherein the first image sensor and the second image sensor are embedded in the multimedia device, or the first image sensor and the second image sensor are designed as a separate external module.

9. The multimedia device as claimed in claim 8, wherein when the first image sensor and the second image sensor are embedded in the multimedia device,
    the processor takes a first image located in a periphery of the multimedia device by using the first image sensor, extracts depth data from the taken first image, detects a face of the user by using the extracted depth data, takes a second image on the detected face of the user by using the second image sensor, extracts feature information from the taken second image, accesses a memory that stores data corresponding to the extracted feature information, and extracts information identifying a specific user stored in the memory.

10. A method for managing information in a display device, comprising:

acquiring an image;

detecting a person in the image;

determining coordinate information of the person in the image;

extracting a feature of the person from the image based on the coordinate information;

comparing the extracted feature to reference information;

recognizing the person based on the comparison, determining whether a single user or a plurality of users have been identified;

extracting information on a preference channel corresponding to a plurality of users by accessing a memory that stores a family favorite list when a plurality of users have been identified, wherein the family favorite list includes info nation regarding a broadcast program of a channel viewed twice or more by the plurality of users at a specific time on a specific day; and performing a control operation for switching to the preference channel based on the extracted information.

* * * * *